(12) United States Patent
Bond et al.

(10) Patent No.: US 6,782,346 B2
(45) Date of Patent: Aug. 24, 2004

(54) AIRCRAFT SYNTHESIS AND SYSTEMS EVALUATION METHOD FOR DETERMINING AND EVALUATING ELECTRICAL POWER GENERATION AND DISTRIBUTION SYSTEM COMPONENTS

(75) Inventors: Robert M. Bond, Auburn, WA (US); Merle W. Peak, Seattle, WA (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 09/900,522

(22) Filed: Jul. 6, 2001

(65) Prior Publication Data

US 2002/0165696 A1 Nov. 7, 2002

Related U.S. Application Data

(60) Provisional application No. 60/289,088, filed on May 7, 2001.

(51) Int. Cl.[7] .............................................. G06F 15/00
(52) U.S. Cl. ........................................ 702/183; 244/13
(58) Field of Search ............................. 702/57, 60–63, 702/115, 117, 181–185, 187, 188; 244/6, 13, 17.3, 17.15, 201, 203, 134 D, 139; 701/15; 322/22–25, 27, 28

(56) References Cited

U.S. PATENT DOCUMENTS

| | | | | |
|---|---|---|---|---|
| 4,110,605 A | * | 8/1978 | Miller | 701/124 |
| 4,837,695 A | * | 6/1989 | Baldwin | 701/15 |
| 5,075,881 A | * | 12/1991 | Blomberg et al. | 703/2 |
| 5,184,317 A | * | 2/1993 | Pickett | 708/446 |
| 5,285,147 A | * | 2/1994 | Rashid | 322/28 |
| 5,325,043 A | * | 6/1994 | Parro | 322/23 |
| 5,539,867 A | * | 7/1996 | Handa et al. | 345/440 |
| 6,038,540 A | * | 3/2000 | Krist et al. | 705/8 |
| 6,199,078 B1 | * | 3/2001 | Brittan et al. | 715/503 |
| 6,442,459 B1 | * | 8/2002 | Sinex | 701/29 |
| 6,553,333 B1 | * | 4/2003 | Shenk | 702/182 |

* cited by examiner

*Primary Examiner*—Marc S. Hoff
*Assistant Examiner*—Mohamed Charioui
(74) *Attorney, Agent, or Firm*—Harness Dickey & Pierce P.L.C.

(57) ABSTRACT

A system and method for facilitating design and analysis of a selected component, subsystem, system, or structure of an aircraft. In one embodiment the system and method analyzes an aircraft's electrical power generation and distribution system (EPGDS). The system and method autonomously estimates all screen variables from two inputs, those being the number of engines and maximum takeoff weight, and further allows a designer to override any variables relating to the EPGDS of the aircraft, including the configuration of the EPGDS. Variables can be locked in by the designer such that the system will use those locked in variables in subsequent calculations. The invention enables the designer to quickly predict the system attributes of dependability cost, reliability and maintainability at the same time the normal mass properties of weight and body station center of gravity are estimated for a wide range of components and subsystems of the EPGDS, in addition to the overall EPGDS itself.

19 Claims, 87 Drawing Sheets

AC Electrical Load Characterization

52

Number of Fans  X.X
Recirculation Fans  X.X
Number of E/E Cooling Vent Fans  X.X
Number of E/E Cooling Supply Fans  X.X
Number of TRUs  X.X
Number of ACMPs  X.X
Number of Window/Windshield Heaters  X.X
Number of Lavatories  X.X Number of Wide Body Pumps  X.X
Number of Wide Body Boost Pumps  X.X
Number of Wide Body Override Pumps  X.X
Number of Wide Body Jettison Pumps  X.X Number of Narrow Body Pumps  X.X
Number of Narrow Body Boost Pumps  X.X
Number of Narrow Body Override Pumps  X.X
Number of Narrow Body Jettison Pumps  X.X

*ASSET EPGDS Method*

FIG. 6

AC Load Summary by Flight Phase

| ATA Subsystems | --Passenger Loading-- | | --Engine Start-- | | --Taxi Out-- | |
|---|---|---|---|---|---|---|
| | (kVA) | (PF) | (kVA) | (PF) | (kVA) | (PF) |
| 21 Air Conditioning | XX.XX | X.XX | XX.XX | X.XX | XX.XX | X.XX |
| 22 Auto Flight | X.XX | X.XX | X.XX | X.XX | X.XX | X.XX |
| 23 Communications | X.XX | X.XX | X.XX | X.XX | X.XX | X.XX |
| 24 Electrical Power | X.XX | X.XX | X.XX | X.XX | X.XX | X.XX |
| 25 Equipment/Furnishings | XX.XX | X.XX | XX.XX | X.XX | XX.XX | X.XX |
| 26 Fire Protection | X.XX | X.XX | X.XX | X.XX | X.XX | X.XX |
| 27 Flight Control | X.XX | X.XX | X.XX | X.XX | X.XX | X.XX |
| 28 Fuel | X.XX | X.XX | X.XX | X.XX | X.XX | X.XX |
| 29 Hydraulic Power System | X.XX | X.XX | X.XX | X.XX | X.XX | X.XX |
| 30 Ice/Rain Protection | X.XX | X.XX | X.XX | X.XX | X.XX | X.XX |
| 31 Instruments | X.XX | X.XX | X.XX | X.XX | X.XX | X.XX |
| 32 Landing Gear | X.XX | X.XX | X.XX | X.XX | X.XX | X.XX |

Maximum Flight Phase Load ◇ XXX.XX KVA ◇ X.XX PF

ASSET EPGDS Method  54

FIG. 7A

AC Load Summary by Flight Phase

| ATA Subsystems | Passenger Loading (kVA) | (PF) | Engine Start (kVA) | (PF) | Taxi Out (kVA) | (PF) |
|---|---|---|---|---|---|---|
| 32 Landing Gear | X.XX | X.XX | X.XX | X.XX | X.XX | X.XX |
| 33 Lights | XXX.XX | X.XX | X.XX | X.XX | X.XX | X.XX |
| 34 Navigation | X.XX | X.XX | X.XX | X.XX | X.XX | X.XX |
| 35 Oxygen | X.XX | X.XX | X.XX | X.XX | X.XX | X.XX |
| 36 Pneumatics | X.XX | X.XX | X.XX | X.XX | X.XX | X.XX |
| 38 Water/Waste | X.XX | X.XX | X.XX | X.XX | X.XX | X.XX |
| 46 Electronic Library | X.XX | X.XX | X.XX | X.XX | X.XX | X.XX |
| 48 Airplane Auxiliary Power | X.XX | X.XX | X.XX | X.XX | X.XX | X.XX |
| 52 Doors | X.XX | X.XX | X.XX | X.XX | X.XX | X.XX |
| 57 Folding Wing | X.XX | X.XX | X.XX | X.XX | X.XX | X.XX |
| 73 Engine Fuel Control | X.XX | X.XX | X.XX | X.XX | X.XX | X.XX |
| 74 Ignition | X.XX | X.XX | X.XX | X.XX | X.XX | X.XX |

Maximum Flight Phase Load ◇ XXX.XX kVA ◇ X.XX PF

ASSET EPGDS Method

FIG. 7B

AC Load Summary by Flight Phase

| ATA Subsystems | --Take-off & Climb-- | | ---Cruise--- | | ---Descent & Land--- | |
|---|---|---|---|---|---|---|
| | (kVA) | (PF) | (kVA) | (PF) | (kVA) | (PF) |
| 32 Landing Gear | X.XX | X.XX | X.XX | X.XX | X.XX | X.XX |
| 33 Lights | X.XX | X.XX | X.XX | X.XX | X.XX | X.XX |
| 34 Navigation | X.XX | X.XX | X.XX | X.XX | X.XX | X.XX |
| 35 Oxygen | X.XX | X.XX | X.XX | X.XX | X.XX | X.XX |
| 36 Pneumatics | X.XX | X.XX | X.XX | X.XX | X.XX | X.XX |
| 38 Water/Waste | X.XX | X.XX | X.XX | X.XX | X.XX | X.XX |
| 46 Electronic Library | X.XX | X.XX | X.XX | X.XX | X.XX | X.XX |
| 49 Airplane Auxiliary Power | X.XX | X.XX | X.XX | X.XX | X.XX | X.XX |
| 52 Doors | X.XX | X.XX | X.XX | X.XX | X.XX | X.XX |
| 57 Folding Wing | X.XX | X.XX | X.XX | X.XX | X.XX | X.XX |
| 73 Engine Fuel Control | X.XX | X.XX | X.XX | X.XX | X.XX | X.XX |
| 74 Ignition | X.XX | X.XX | X.XX | X.XX | X.XX | X.XX |

Maximum Flight Phase Load  XXX.XX  KVA  X.XX  PF

*ASSET EPGDS Method*

FIG. 7C

AC Load Summary by Flight Phase

| ATA Subsystems | Take-off & Climb | | | | Cruise | | | | Descent & Land | | | |
|---|---|---|---|---|---|---|---|---|---|---|---|---|
| | (kVA) | | (PF) | | (kVA) | | (PF) | | (kVA) | | (PF) | |
| ... ...ings | XX.XX | | X.XX | | XX.XX | | X.XX | | XX.XX | | X.XX | |
| 73 Engine Fuel Control | X.XX | | X.XX | | X.XX | | X.XX | | X.XX | | X.XX | |
| 74 Ignition | X.XX | | X.XX | | X.XX | | X.XX | | X.XX | | X.XX | |
| 75 Air | X.XX | | X.XX | | X.XX | | X.XX | | X.XX | | X.XX | |
| 76 Engine Controls | X.XX | | X.XX | | X.XX | | X.XX | | X.XX | | X.XX | |
| 77 Engine Indicating | X.XX | | X.XX | | X.XX | | X.XX | | X.XX | | X.XX | |
| 78 Exhaust | XXX.XX | | X.XX | | XXX.XX | | X.XX | | XXX.XX | | X.XX | |
| 79 Oil | XX.XX | | X.XX | | XXXX.XX | | X.XX | | XXXX.XX | | X.XX | |
| 80 Starting | XXX.XX | | X.XX | | XXXX.XX | | X.XX | | XXXX.XX | | X.XX | |
| Flight Phase Subtotals | | | | | | | | | | | | |
| Error/Growth Factor( 15%) | | | | | | | | | | | | |
| Flight Phase Totals | | | | | | | | | | | | |

Maximum Flight Phase Load    XXX.XX  KVA    X.XX  PF

*ASSET EPGDS Method*

FIG. 7D

DC Electrical Load Characterization

Number of Main Landing Gear Wheels  X.X
Number of APU Generators  X.X
Number of Doors  X.X
Number of Tanks  X.X

*ASSET EPGDS Method*

FIG. 10

DC Load Summary by Flight Phase

| ATA Subsystems | Pass Loading (Amps) | Engine Start (Amps) | Taxi-Out (Amps) | Take-off & Climb (Amps) | Cruise (Amps) | Descent & Land (Amps) |
|---|---|---|---|---|---|---|
| 21 Air Conditioning | XX.XX | XX.XX | XX.XX | XX.XX | XX.XX | XX.XX |
| 22 Auto Flight | X.XX | X.XX | X.XX | XX.XX | XX.XX | XX.XX |
| 23 Communications (IFE, AVOD) | X.XX | X.XX | X.XX | X.XX | X.XX | X.XX |
| 24 Electrical Power | X.XX | X.XX | X.XX | X.XX | X.XX | X.XX |
| 25 Equipment/Furnishings | XX.XX | XX.XX | XX.XX | XX.XX | XX.XX | XX.XX |
| 26 Fire Protection | X.XX | X.XX | X.XX | X.XX | X.XX | X.XX |
| 27 Flight Control | X.XX | X.XX | X.XX | X.XX | X.XX | X.XX |
| 28 Fuel | X.XX | X.XX | X.XX | X.XX | X.XX | X.XX |
| 29 Hydraulic Power System | X.XX | X.XX | X.XX | X.XX | X.XX | X.XX |
| 30 Ice/Rain Protection | X.XX | X.XX | X.XX | XX.XX | XX.XX | XX.XX |
| 31 Instruments | XX.XX | XX.XX | XX.XX | XX.XX | XX.XX | XX.XX |

Maximum Flight Phase Direct Current Load  XXX.XX  AMPS

*ASSET EPGDS Method*

FIG. 11A

DC Load Summary by Flight Phase

| ATA Subsystems | Pass Loading (Amps) | Engine Start (Amps) | Taxi-Out (Amps) | Take-off & Climb (Amps) | Cruise (Amps) | Descent & Land (Amps) |
|---|---|---|---|---|---|---|
| 31 Instruments | XX.XX | XX.XX | XX.XX | XX.XX | XX.XX | XX.XX |
| 32 Landing Gear | X.XX | X.XX | X.XX | X.XX | X.XX | X.XX |
| 33 Lights | X.XX | XX.XX | X.XX | XX.XX | XX.XX | XX.XX |
| 34 Navigation | X.XX | X.XX | X.XX | X.XX | X.XX | X.XX |
| 35 Oxygen | X.XX | X.XX | X.XX | X.XX | X.XX | X.XX |
| 36 Pneumatics | X.XX | X.XX | X.XX | X.XX | X.XX | X.XX |
| 38 Water/Waste | X.XX | X.XX | X.XX | X.XX | X.XX | X.XX |
| 46 Electronic Library | X.XX | X.XX | X.XX | X.XX | X.XX | X.XX |
| 49 Airplane Auxiliary Power | X.XX | X.XX | X.XX | X.XX | X.XX | X.XX |
| 52 Doors | X.XX | X.XX | X.XX | X.XX | X.XX | X.XX |
| 57 Folding Wing | X.XX | X.XX | X.XX | X.XX | X.XX | X.XX |

Maximum Flight Phase Direct Current Load XXX.XX AMPS

ASSET EPGDS Method

FIG. 11B

DC Load Summary by Flight Phase

| ATA Subsystems | Pass Loading (Amps) | Engine Start (Amps) | Taxi-Out (Amps) | Take-off & Climb (Amps) | Cruise (Amps) | Descent & Land (Amps) |
|---|---|---|---|---|---|---|
| 52 Doors | X.XX | X.XX | X.XX | X.XX | X.XX | X.XX |
| 57 Folding Wing | X.XX | X.XX | X.XX | X.XX | X.XX | X.XX |
| 73 Engine Fuel Control | X.XX | X.XX | X.XX | X.XX | X.XX | X.XX |
| 74 Ignition | X.XX | X.XX | X.XX | X.XX | X.XX | X.XX |
| 75 Air | X.XX | X.XX | X.XX | X.XX | X.XX | X.XX |
| 76 Engine Controls | X.XX | X.XX | X.XX | X.XX | X.XX | X.XX |
| 77 Engine Indicating | X.XX | X.XX | X.XX | X.XX | X.XX | X.XX |
| 78 Exhaust | X.XX | X.XX | X.XX | X.XX | X.XX | X.XX |
| 79 Oil | X.XX | X.XX | X.XX | X.XX | X.XX | X.XX |
| 80 Starting | X.XX | X.XX | X.XX | X.XX | X.XX | X.XX |
| Flight Phase Totals | XXX.XX | XXX.XX | XXX.XX | XXX.XX | XXX.XX | XXX.XX |

Maximum Flight Phase Direct Current Load  XXX.XX  AMPS

*ASSET EPGDS Method*

Wire Type & Weight

Show Data for: [Xxxxx ▶]

| Wire Type, Feeder 1: | ◇ | XXX XX-XX Xxxx X | ▶ | | Feeder 1: | ◇ | XX.X | LB |
| Wire Type, Neutral 1: | ◇ | XXX XX-XX Xxxx X | ▶ | | Neutral 1: | ◇ | X.X | LB |
| Wire Type, Feeder 2: | ◇ | XXX XX-XX Xxxx X | ▶ | | Feeder 2: | ◇ | XX.X | LB |
| Wire Type, Neutral 2: | ◇ | XXX XX-XX Xxxx X | ▶ | | Neutral 2: | ◇ | X.X | LB |
| Wire Type, Feeder 3: | ◇ | XXX XX-XX Xxxx X | ▶ | | Feeder 3: | ◇ | XX.X | LB |
| Wire Type, Neutral 3: | ◇ | XXX XX-XX Xxxx X | ▶ | | Neutral 3: | ◇ | XX.X | LB |
| Wire Type, Feeder 4: | ◇ | XXX XX-XX Xxxx X | ▶ | | Feeder 4: | ◇ | XX.X | LB |
| Wire Type, Neutral 4: | ◇ | XXX XX-XX Xxxx X | ▶ | | Neutral 4: | ◇ | XX.X | LB |
| Wire Type, Feeder 5: | ◇ | XXX XX-XX Xxxx XX | ▶ | | Feeder 5: | ◇ | X.X | LB |
| Wire Type, Neutral 5: | ◇ | XXX XX-XX Xxxx XX | ▶ | | Neutral 5: | ◇ | X.X | LB |

TRU Feeder Weight [X.X] LB

Total Wire Weight [XX.X] LB

*ASSET EPGDS Method*

Common Dependability Cost Inputs

| | | |
|---|---|---|
| Number of Main Generators per Airplane | X | |
| Average Number of Flights per Year per Airplane | XXXX. | |
| Average Flight Hours per Flight | XXX.X | HRS |
| Airplane Feet Size | XX | |
| Length of System Life in Years (1 – 30 Yrs.) | XX | YEARS |
| Average Non-fuel Inflation Rate beyond Present Year | X.XXX | % |
| Minimum Attractive Rate of Return | X.XX | % |

ASSET EPGDS Method

FIG. 36

Fuel Costs

| | | |
|---|---|---|
| Fuel cost per Gallon, Base Year | X.XX | DOLLARS |
| Lbs Fuel Burned/Flight Hour/Lb Additional Weight | X.XXXX | HRS^-1 |
| System Weight (per airplane) | XXX.X | LB |
| System Direct Horsepower Requirement (per airplane) | X. | HP |
| System Drag Horsepower Requirement (per airplane) | X. | HP |
| System Cooling Horsepower Requirement | X. | HP |
| System Pound of Fuel per Block Trip (per airplane) | X. | LB |
| Average Fuel Inflation Rate Beyond Present Year | X.XXX | % |

| | | |
|---|---|---|
| Fuel Cost (NPV of Life Cycle Cost) | XXXXXX. | DOLLARS |
| Fuel Cost per Airplane per Year | XXXX. | DOLLARS |

*ASSET EPGDS Method*

FIG. 38

Spares Costs

| Field | Value | Unit |
|---|---|---|
| Cost/Spare Unit, Base Year | XXXXXX. | DOLLARS |
| Spares Holding Factor | X.XX | % |
| Shop Turnaround Time in Days | XX.X | DAYS |
| Main Base Fill Rate (must be less than 1) | X.XX | |
| Mean Time Between Unscheduled Removals | XXXXX. | HRS |
| Mean Time Between Overhauls | X. | HRS |

Number of Spares Required: X.

| Field | Value | Unit |
|---|---|---|
| Initial Spares Cost | XXXXXXX. | DOLLARS |
| Spares Holding Cost (NPV of Life Cycle Cost) | XXXXXXX. | DOLLARS |
| Spares Cost (NPV of Life Cycle Cost) | XXXXXXX. | DOLLARS |
| Spares Cost per Airplane per Year | XXXX. | DOLLARS |

ASSET EPGDS Method

FIG. 39

| File Run Goto Report | | Help |
|---|---|---|

Line Maintenance Costs

| | | |
|---|---|---|
| Direct Labor Rate per Hour | XX.XX | DOLLARS/HOUR |
| Maintenance Labor Burden Factor | X.X | |
| Mean Time Between Unscheduled Removals | XXXXX. | HRS |
| Line Labor Hours Required per Removal | X.X | HRS |
| Line Labor Hours per Maintenance Action (Non-Removal) | X.X | HRS |
| Maintenance Actions per 1000 Flight Hours (Non-Removal) | X.XX | HRS^-1 |

| | | |
|---|---|---|
| Line Maintenance Cost (NPV of Life Cycle Cost) | XXXXX. | DOLLARS |
| Line Maintenance Cost per Airplane per Year | XXX. | DOLLARS |

*ASSET EPGDS Method*

FIG. 40

Shop Maintenance Costs

| Field | Value | Unit |
|---|---|---|
| Direct Labor Rate per Hour | XX.XX | DOLLARS/HOUR |
| Maintenance Labor Burden Factor | X.X | |
| Mean Time Between Unscheduled Removals | XXXXX. | HRS |
| Main Generator Mean Time Between Failures | XXXXX. | HRS |
| Mean Time Between Overhauls | X. | HRS |
| Shop Labor Man-Hours per Unconfirmed Failure (Test Time) | X.X | HRS |
| Shop Labor Man-Hours per Failure (Repair and Test) | XX.X | HRS |
| Shop Labor Hours per Overhaul | X.X | HRS |
| Average Shop Material Cost per Failure, base year | XXXXX. | DOLLARS |
| Overhaul Materials Cost per Overhaul | X. | DOLLARS |

| Field | Value | Unit |
|---|---|---|
| Shop Maintenance Cost (NPV of Life Cycle Cost) | XXXXXXX. | DOLLARS |
| Shop Maintenance Cost per Airplane per Year | XXXXX. | DOLLARS |

ASSET EPGDS Method

FIG. 41

File Run Goto Report | Help

Scheduled Maintenance Costs

| Field | Value | Unit |
|---|---|---|
| Direct Labor Rate per Hour | XX.XX | DOLLARS/HOUR |
| Maintenance Labor Burden Factor | X.X | |
| Mean Time Between Unscheduled Removals | XXXXX. | HRS |
| Schedule Maintenance Inspection Man Hours per 1000 Flight Hours | X.X | |
| Rectification Man Hours per 1000 Flight Hours | X.X | |
| Scheduled Maintenance Material Dollars per 1000 Flight Hours | X.XX | $HRS^{-1}$ |
| Scheduled Maintenance Cost (NPV of Life Cycle Cost) | XXXXXXX. | DOLLARS |
| Scheduled Maintenance Cost per Airplane per Year | XXXX. | DOLLARS |

ASSET EPGDS Method

FIG. 42

Schedule Interruption Costs

Average Delay Cost per Delay Hour    XXXXX.   DOLLARS/HOUR
Average Cancellation Cost per Cancellation    XXXXX.   DOLLARS
Average Air Turnback Cost per Turnback    XXXXX.   DOLLARS
Average Diversion Cost per Diversion    XXXXX.   DOLLARS Number of Delays per 100 Departures    X.XXXX
Average Delay Time (Hours)    X.XX   HRS
Number of Cancellations per 100 Departures    X.XXXX
Number of Air Turnbacks per 100 Departures    X.XXXX
Number of Diversions per 100 Departures    X.XXXX Schedule Interruptions Cost (NPV of Life Cycle Cost)    XXXXXX.   DOLLARS
Schedule Interruptions Cost per Airplane per Year    XXXX.   DOLLARS ASSET EPGDS Method

FIG. 43

Maintenance Times

Frequency (Flight Hours)

| | Unscheduled Removals | Servicing | Alignment & Adjustment |
|---|---|---|---|
| Mean Time Between Unscheduled Removals | ◇ XXXXX 🗎 | | |
| Maintenance Interval | | ◇ XXX. 🗎 | ◇ XXXX 🗎 |

Maintenance Corrective Times (Flight Hours)

| | Unscheduled Removals | Servicing | Alignment & Adjustment |
|---|---|---|---|
| Main Generator Unscheduled Removal Access Time | X.XX 🗎 | ◇ X.XX 🗎 | ◇ X.XX 🗎 |
| Main Generator Unscheduled Removal Fault Isolation Time | X.XX 🗎 | | |
| Main Generator Unscheduled Removal Repair / Removal & Replace Time | X.XX 🗎 | | |
| Main Generator Unscheduled Removal Servicing Time | X.XX 🗎 | ◇ X.XX 🗎 | |
| Main Generator Unscheduled Removal Alignment & Adjustment Time | X.XX 🗎 | | ◇ X.XX 🗎 |
| Main Generator Unscheduled Removal Checkout / Verification Time | X.XX 🗎 | | ◇ X.XX 🗎 |
| Main Generator Unscheduled Removal Closing UpTime | X.XX 🗎 | | ◇ X.XX 🗎 |
| Main Generator Unscheduled Removal Mean Corrective Time | X. 🗎 | ◇ X. 🗎 | ◇ X. 🗎 |

90  ASSET EPGDS Method

FIG. 52

24-09, Electrical Power Distribution

| Component # | | Component Designation | | Quantity | | Unit Wt. | | Subtotal | |
|---|---|---|---|---|---|---|---|---|---|
| P100 | ◊ | Left Primary Power Panel | | X | ◊ | XX.X | LB ◊ | XX.X | LB |
| P110 | ◊ | Left Mgmt Power Panel | | X | ◊ | XXX.X | LB ◊ | XXX.X | LB |
| P200 | ◊ | Right Primary Power Panel | | X | ◊ | XX.X | LB ◊ | XX.X | LB |
| P210 | ◊ | Right Mgmt Power Panel | | X | ◊ | XXX.X | LB ◊ | XXX.X | LB |
| P300 | ◊ | Auxiliary Power Panel | | X | ◊ | XXX.X | LB ◊ | XXX.X | LB |
| P310 | ◊ | Stby Power Mgmt Panel | | X | ◊ | XX.X | LB ◊ | XX.X | LB |
| P320 | ◊ | Ground Hdlg/Svs Distribution Panel | | X | ◊ | XX.X | LB ◊ | XX.X | LB |
| | ◊ | | | X | ◊ | X.X | LB ◊ | X.X | LB |
| | ◊ | | | X | ◊ | X.X | LB ◊ | X.X | LB |
| | ◊ | | | X | ◊ | X.X | LB ◊ | X.X | LB |
| | ◊ | | | X | ◊ | X.X | LB ◊ | X.X | LB |
| | ◊ | | | X | ◊ | X.X | LB ◊ | X.X | LB |

ATA 24-09, Electrical Power Distribution    XXXX.X   LB

ASSET EPGDS Method

FIG. 56

24-10, Generator Drive

| Component # | | Component Designation | Quantity | Unit Wt. | Subtotal |
|---|---|---|---|---|---|
| QAD | ◇ | Quick Attach/Detach, L | X | X.X LB◇ | X.X LB |
| QAD | ◇ | Quick Attach/Detach, R | X | X.X LB◇ | X.X LB |
| QAD APU | ◇ | Quick Attach/Detach, APU | X | X.X LB◇ | X.X LB |
| Heat XC | ◇ | Generator Cooling, L | X | XX.X LB◇ | XX.X LB |
| Heat XC | ◇ | Generator Cooling, R | X | XX.X LB◇ | XX.X LB |
| ◇ | ◇ | | X | X.X LB◇ | X.X LB |
| ◇ | ◇ | | X | X.X LB◇ | X.X LB |
| ◇ | ◇ | | X | X.X LB◇ | X.X LB |
| ◇ | ◇ | | X | X.X LB◇ | X.X LB |
| ◇ | ◇ | | X | X.X LB◇ | X.X LB |
| ◇ | ◇ | | X | X.X LB◇ | X.X LB |
| ◇ | ◇ | | X | X.X LB◇ | X.X LB |

ATA 24-10, Generator Drive     XXXX.X LB

*ASSET EPGDS Method*

FIG. 57

24-21, Power and Regulation

| Component # | | Component Designation | Quantity | | Unit Wt. | | Subtotal | |
|---|---|---|---|---|---|---|---|---|
| M24001 | | Main Generator, INBD R | X | | XXX.X | LB | XXX.X | LB |
| M24001 | | Main Generator, INBD L | X | | XXX.X | LB | XXX.X | LB |
| M24003 | | APU Generator | X | | X.X | LB | X.X | LB |
| | | | X | | XX.X | LB | XX.X | LB |
| | | | X | | X.X | LB | X.X | LB |
| | | | X | | X.X | LB | X.X | LB |
| | | | X | | X.X | LB | X.X | LB |
| | | | X | | X.X | LB | X.X | LB |
| | | | X | | X.X | LB | X.X | LB |
| | | | X | | X.X | LB | X.X | LB |
| | | | X | | X.X | LB | X.X | LB |
| | | | X | | X.X | LB | X.X | LB |

ATA 24-21, Power and Regulation   XXX.X   LB

*ASSET EPGDS Method*

FIG. 58

24-22, Controls and Indication

| Component: # | | Component Designation | Quantity | | Unit Wt. | | Subtotal | |
|---|---|---|---|---|---|---|---|---|
| M24x05 | ⌸ | Generator Control Unit, INBD R | X | ⌸ | X.X | ⌸ LB | X.X | ⌸ LB |
| M24x05 | ⌸ | Generator Control Unit, INBD L | X | ⌸ | X.X | ⌸ LB | X.X | ⌸ LB |
| M24y05 | ⌸ | APU Generator Control Unit | X | ⌸ | X.X | ⌸ LB | X.X | ⌸ LB |
| | ⌸ | | X | ⌸ | X.X | ⌸ LB | X.X | ⌸ LB |
| | ⌸ | | X | ⌸ | X.X | ⌸ LB | X.X | ⌸ LB |
| | ⌸ | | X | ⌸ | X.X | ⌸ LB | X.X | ⌸ LB |
| | ⌸ | | X | ⌸ | X.X | ⌸ LB | X.X | ⌸ LB |
| | ⌸ | | X | ⌸ | X.X | ⌸ LB | X.X | ⌸ LB |
| | ⌸ | | X | ⌸ | X.X | ⌸ LB | X.X | ⌸ LB |
| | ⌸ | | X | ⌸ | X.X | ⌸ LB | X.X | ⌸ LB |
| | ⌸ | | X | ⌸ | X.X | ⌸ LB | X.X | ⌸ LB |
| | ⌸ | | X | ⌸ | X.X | ⌸ LB | X.X | ⌸ LB |

ATA 24-22, Controls and Indication     XX.X ⌸ LB

*ASSET EPGDS Method*

FIG. 59

24-25, Back-up Generator

| Component # | | Component Designation | Quantity | | Unit Wt. | | Subtotal | |
|---|---|---|---|---|---|---|---|---|
| M24004 | | PMG Back-up Generator, INBD R | X | | X.X | LB | X.X | LB |
| M24004 | | PMG Back-up Generator, INBD L | X | | X.X | LB | X.X | LB |
| BU_Gen | | VSCF Generator, INBD R | X | | XX.X | LB | XX.X | LB |
| BU_Gen | | VSCF Generator, INBD L | X | | XX.X | LB | XX.X | LB |
| BU_Cvtr | | VSCF Converter, INBD R | X | | XX.X | LB | XX.X | LB |
| BU_Cvtr | | VSCF Converter, INBD L | X | | XX.X | LB | XX.X | LB |
| | | | X | | X.X | LB | X.X | LB |
| | | | X | | X.X | LB | X.X | LB |
| | | | X | | X.X | LB | X.X | LB |
| | | | X | | X.X | LB | X.X | LB |
| | | | X | | X.X | LB | X.X | LB |
| | | | X | | X.X | LB | X.X | LB |

ATA 24-25, Back-up Generators     XXXX.X  LB

ASSET EPGDS Method

FIG. 60

24-28, Feeders

| Component # | | Component Designation | | Quantity | | Unit Wt. | | Subtotal | |
|---|---|---|---|---|---|---|---|---|---|
| Gen_Fdrs | | Main Generator Feeders, R | | X | | XX.X | | XX.X | LB |
| Gen_Fdrs | | Main Generator Feeders, L | | X | | XX.X | | XX.X | LB |
| Gen_I | | Main Generator Feeders, Installation R | | X | | XX.X | | XX.X | LB |
| Gen_I | | Main Generator Feeders, Installation L | | X | | XX.X | | XX.X | LB |
| Gen_C | | Main Generator Feeders, Connectors, R | | X | | XX.X | | XX.X | LB |
| Gen_C | | Main Generator Feeders, Connectors, L | | X | | XX.X | | XX.X | LB |
| APU_Fdrs | | APU Feeders | | X | | XX.X | | XX.X | LB |
| APU_C | | APU Feeders Connectors | | X | | X.X | | X.X | LB |
| APU_I | | APU Feeders Installation | | X | | X.X | | X.X | LB |

ATA 24-28, Feeders  XXX.X  LB

ASSET EPGDS Method

24-33, Emergency Generator

| Component # | Component Designation | Quantity | Unit Wt. | Subtotal |
|---|---|---|---|---|
| M24016 | Static Inverter Unit | X | XX.X LB | XX.X LB |
| M24017 | RAT Generator | X | XX.X LB | XX.X LB |
| M24018 | RAT Generator GCU | X | X.X LB | X.X LB |
| RAT_Fdrs | RAT Generator Feeders | X | X.X LB | X.X LB |
| RAT_I&C | RAT Gen Fdrs Install & Conn | X | X.X LB | X.X LB |
| | | X | X.X LB | X.X LB |
| | | X | X.X LB | X.X LB |
| | | X | X.X LB | X.X LB |
| | | X | X.X LB | X.X LB |
| | | X | X.X LB | X.X LB |
| | | X | X.X LB | X.X LB |
| | | X | X.X LB | X.X LB |

ATA 24-33, Emergency Generator    XXXX.X LB

ASSET EPGDS Method

FIG. 64

24-35, Flight-Control DC Power

| Component # | Component Designation | Quantity | Unit Wt. | | Subtotal | |
|---|---|---|---|---|---|---|
| M24*01 | Power Supply Unit (PSA) | X | XX.X | LB | XXX.X | LB |
| FCDC Batt | FCDC Battery | X | XX.X | LB | XX.X | LB |
| Wire | Fly-by-Wire(FBW) Distribution Wire | X | XX.X | LB | XX.X | LB |
| Conn | Fly-by-Wire(FBW) Distribution Wire Con | X | X.X | LB | X.X | LB |
| Install | PSA Installation | X | XX.X | LB | XX.X | LB |
| TRU_Batt | L2 ACE TRU | X | X.X | LB | X.X | LB |
| | | X | X.X | LB | X.X | LB |
| | | X | X.X | LB | X.X | LB |
| | | X | X.X | LB | X.X | LB |
| | | X | X.X | LB | X.X | LB |
| | | X | X.X | LB | X.X | LB |

ATA 24-35, Flight-Control DC Power XXXX.X LB

ASSET EPGDS Method

24-51, AC Power Distribution

| Component # | | Component Designation | | Quantity | | Unit Wt. | | Subtotal | |
|---|---|---|---|---|---|---|---|---|---|
| 28 Xfmr | | AC to DC Auto Transformer | | X | | X.X | LB | XX.X | LB |
| Wire | | AC Distribution Wire | | X | | XX.X | LB | XX.X | LB |
| Conn | | AC Distribution Connectors | | X | | XX.X | LB | XX.X | LB |
| | | | | X | | X.X | LB | X.X | LB |
| | | | | X | | X.X | LB | X.X | LB |
| | | | | X | | X.X | LB | X.X | LB |
| | | | | X | | X.X | LB | X.X | LB |
| | | | | X | | X.X | LB | X.X | LB |
| | | | | X | | X.X | LB | X.X | LB |
| | | | | X | | X.X | LB | X.X | LB |
| | | | | X | | X.X | LB | X.X | LB |
| | | | | X | | X.X | LB | XX | LB |

ATA 24-51, AC Power Distribution   XXX.X   LB

*ASSET EPGDS Method*

FIG. 67

24-60, DC Power Distribution

| Component # | Component Designation | Quantity | Unit Wt. | Subtotal |
|---|---|---|---|---|
| GND TRU | Ground Handling TRU | X | X.X LB | X.X LB |
| P11 | Overhead Panel | X | XX.X LB | XX.X LB |
| Wire | DC Distribution Wire | X | XX.X LB | XX.X LB |
| Conn | DC Distribution Connectors | X | X.X LB | X.X LB |
| | | X | X.X LB | X.X LB |
| | | X | X.X LB | X.X LB |
| | | X | X.X LB | X.X LB |
| | | X | X.X LB | X.X LB |
| | | X | X.X LB | X.X LB |
| | | X | X.X LB | X.X LB |
| | | X | X.X LB | X.X LB |
| | | X | X.X LB | X.X LB |
| | | X | X.X LB | X.X LB |

ATA 24-60, DC Power Distribution    XX.X  LB

*ASSET EPGDS Method*

FIG. 68

WW-01, Wiring Provision

| Component # | Component Designation | Quantity | Unit Wt. | Subtotal |
|---|---|---|---|---|
| Wire | Airframe Lighting (18%) | X | XX. | LB◇ XX.X LB |
| Installation | Engine/Strut Wiring Installation | X | XX. | LB◇ XX.X LB |
| Feeder Supports | Generator Feeders/Control Supts (18%) | X | XX. | LB◇ XX.X LB |
| AC Supports | AC Distribution Supts (18%) | X | XX. | LB◇ XX.X LB |
| DC Supports | DC Distribution Supts (18%) | X | X. | LB◇ XX.X LB |
| FBW Supports | FBW Supports (18%) | X | XX. | LB◇ XX.X LB |
| APU Feeder Supports | APU Feeders/Controls Supts (18%) | X | X. | LB◇ X.X LB |
| | | X | X. | LB◇ X.X LB |
| | | X | X. | LB◇ X.X LB |
| | | X | X. | LB◇ X.X LB |
| | | X | X. | LB◇ X.X LB |

WW-01, Wiring Provision XXX.X LB

ASSET EPGDS Method

FIG. 69

ATA Chapter 24 Weight Totals

| | | |
|---|---|---|
| ATA 24-09, Electrical Power Distribution | XXX.X | LB |
| ATA 24-10, Generator Drive | XXX.X | LB |
| ATA 24-21, Power and Regulation | XXX.X | LB |
| ATA 24-22, Controls and Indication | XX.X | LB |
| ATA 24-25, Back-up Generators | XXX.X | LB |
| ATA 24-28, Feeders | XXX.X | LB |
| ATA 24-31, Batteries | XXXX.X | LB |
| ATA 24-32, Transformer Rectifier | XX.X | LB |
| ATA 24-33, Emergency Generator | XXX.X | LB |
| ATA 24-35, Flight-Control DC Power | XX.X | LB |
| ATA 24-40, External Power | XXXX.X | LB |
| ATA 24-51, AC Power Distribution | XX.X | LB |
| ATA 24-60, DC Power Distribution | XXX.X | LB |
| WW-01, Wiring Provision | XXXX.X | LB |

Electrical Power Generation & Distribution System    XXXXX.X    LB

*ASSET EPGDS Method*

FIG. 70

Airplane Parameters

Airplane application
Maximum Takeoff Weight  XXXXXX.  LB

ASSET: Report

FC 32 Report

| Component # | Component Designation | Qty | Unit Wt (LB) | Su |
|---|---|---|---|---|
| 32 | Electrical Power Generation & Distribution System | | | |
| 32-01 | AC Power System | | | |
| 32-01-01 | AC POWER GENERATION EQUIPMENT | x | XXX.X | |
| 32-01-01-01 | MAIN AC POWER GENERATORS INSTLD | x | XXX.X | |
| 32-01-01-01-02 | PRIME DRIVE GENERATOR | x | XX.X | |
| 32-01-01-01-03 | QUICK ATTACH DETACH (QAD) | x | X.X | |
| 32-01-01-01-05 | GENERATOR FLUIDS | x | X.X | |
| 32-01-01-01-06 | HARDWARE INSTALLATION | x | X.X | |
| 32-01-01-02 | WIRING INSTALLATION | x | X.X | |
| 32-01-01-06 | GENERATOR CONTROL UNITS | x | X.X | |
| 32-01-05 | BUS POWER CONTROL UNITS | x | X.X | |
| 32-01-05-01 | EROPS-VSCF POWER GENERATION SYSTEM | x | XXX.X | |
| 32-01-05-01-01 | VSCF GENERATORS & OIL | x | XX.X | |
| 32-01-05-01-02 | VSCF GENERATOR | x | XX.X | |
| | VSCF GENERATOR OIL | x | X.X | |

[Return] [send to printer] [save to file]

ASSET Main Module

FIG. 73

AIRCRAFT SYNTHESIS AND SYSTEMS EVALUATION METHOD FOR DETERMINING AND EVALUATING ELECTRICAL POWER GENERATION AND DISTRIBUTION SYSTEM COMPONENTS

CROSS REFERENCE TO RELATED APPLICATIONS

The present application claims priority from U.S. provisional application 60/289,088, filed May 7, 2001.

FIELD OF THE INVENTION

The present invention relates to systems and methods for designing components, subsystems, systems and structure of aircraft, and more particularly to a system and method for predicting and analyzing the needed electrical power generation and distribution system (EPGDS) components, subsystems and systems and the performance of such an EPGDS, for an aircraft in any phase of the design of the aircraft.

REFERENCE TO COMPUTER PROGRAM LISTING

A CDROM with two files including materials forming a portion of a computer program for the present invention is included on a CDROM accompanying the present application. These two files are hereby incorporated by reference into the present application. The first file is "Functional Spec. doc (created May 4, 2001, 2,083,372 bytes) and the second file is "Epgds.doc+" (created May 7, 2001, 19,968 bytes)

BACKGROUND OF THE INVENTION

A recurring challenge faced by aircraft weight engineers is to provide good weight information early in an aircraft aircraft design process. This is necessary in order to be able to influence the aircraft design at relatively low cost and when the opportunity to do so exists.

Present day parametric/statistical weight analysis methods are grossly inadequate in ensuring weight efficiency and weight compliance of aerospace products. These methods produce estimates with large, unexplainable tolerances and are insensitive to key design parameters, thus precluding the ability to adequately discriminate between design variations or perform rapid trade studies. This makes early, effective weight control and design guidance difficult and increases the cycle time for design convergence. Consequently, weight growth of an aircraft under design occurs during the detailed design phase, thus often requiring costly rework and weight reduction programs. This also results in heavier than necessary aircraft empty weights, thus negatively effecting the competitiveness of the products.

In the preliminary or conceptual design phase of an aircraft, many factors are considered involving alternative electrical subsystems which each have many pluses and minuses. Some important trade factors such as reliability, maintainability and/or dependability cost have historically been done by disciplines other than mass properties. Quick assessments of this suite of trade factors, in addition to the mass properties of various electrical components and subsystems, can be extremely useful during the definition phase of the aircraft design process in minimizing the overall weight of the aircraft.

It would therefore be desirable to provide a design approximation system and method which provides sufficient design detail during the definition phase of an aircraft design to calculate not only the mass properties of various component level parts of an aircraft's EPGDS, but also system attributes such as cost, reliability and maintainability through calculations using knowledge-based design principles. It would also be highly desirable to present such information in a format that allows an aircraft designer to easily perform multi-level trade studies to gauge the costs and benefits of alternative designs of subsystems and/or component level items of EPGDS designs.

It would also be desirable to provide such a design approximation tool as described above which is capable of being used with a minimum of as few as two aircraft parameters being input by the aircraft designer or engineer, such as the number of engines and the maximum take off weight (MTOW) of an aircraft.

It would be further desirable to provide such a knowledge-based, design approximation and weight assessment tool which provides early rapid definitive weight determination and control at any stage in a product definition cycle, and which can facilitate early and rapid dependability cost determination and control, as well as provide information on other system attributes such as reliability and maintainability.

SUMMARY OF THE INVENTION

The above and other objectives are provided by a system and method which provides design-based weight analysis of an electrical power generation and distribution system for an aircraft from inputs involving a combination of aircraft level configuration data, as well as from knowledge based algorithms. The system and method of the present invention uses automated knowledge-based algorithms to provide the initial characterization of the EPGDS for the aircraft.

The method and apparatus of the present invention provides for evaluating the electrical power generation and distribution system (EPGDS) of an aircraft from a plurality of perspectives involving weight, body station center of gravity, dependability cost, reliability and maintainability. The invention calculates multiple system attributes of the EPGDS which allows rapid trade study capability in comparison with alternative EPGDS designs. The invention significantly reduces cycle time in the risk assessment process and allows an aircraft designer to more easily control or influence the overall weight of the aircraft.

In one preferred form, the present invention is provided in the form of a user friendly, robust software program. Calculated values for all aircraft and EPGDS parameters are constructed from a minimum of two inputs: the number of engines (NE) to be used on an aircraft and the maximum takeoff weight (MTOW) of the aircraft. Three additional high level parameters/variables that the design engineer can modify are aircraft type, the number of passengers to be accommodated, and the range of the aircraft.

From the above high level parameters input by the designer, the system and method calculates a wide range of information concerning the EPGDS which is presented to the user in a plurality of easily accessible and viewable screens formats in several distinct categories. An Electronic Data Dictionary provides the user with access to the various formulas and other information used by the software in making these calculations and estimates.

The information calculated by the software relates to a plurality of distinct design considerations. These design considerations are categorized as "configuration", "electrical loads", "architecture", "generation", "distribution", "system attributes" and "weight summaries". The "configuration" information includes information pertaining to specific dimensions of components of the aircraft as well as body station location information for various major structural components of the aircraft. It also contains relevant flight control, frequency type, and technology era information. The "electrical loads" information pertains to the AC and DC electrical loads that are expected to be experienced by the aircraft during six flight phases of aircraft operation, as well as the number and types of various pumps, fans, motors, transformers and other electrical components, and the power requirements of such components. The "architecture" information provides the designer with information on the architectures of the major subsystems of the aircraft. The "generation" information provided to the designer is directed to various electrical generation components and their electrical load requirements. The "distribution" information is directed to various power feeder and power panel subsystems and analysis of variables relating to their components. The "systems attributes" information provides the designer with dependability cost, reliability and maintainability information. Each one of these three system attribute submodules further provides a variety of specific information relating to the dependability cost, reliability and maintainability of numerous line replaceable units (LRUs) of the aircraft and the costs and safety probabilities associated with maintaining such component parts and designs.

The Electronic Data Dictionary contains all engineering theory and formulas related to the calculations performed by the method and apparatus of the present invention. The electronic data dictionary allows the designer to review the theoretical equations and associated text explanations associated with each parameter/variable operated on by the software through a "Help" menu function which is displayed on all of the screens of the software program. A "Notes" field is used to provide a simplified explanation of the formula being viewed. A separate functional specification attached as Appendix A, and hereby incorporated by reference, describes the sequence of calculation of the "varnames" in the data dictionary and screen layouts.

The formulas and algorithms used by the method and apparatus of the present invention are applicable to all design phases. This permits seamless use through design phases from preliminary through detailed design, thus avoiding discontinuities caused by switching between various estimation methods. If better knowledge of any one of the numerous plurality of parameters/variables exists, it is possible to override previously input values calculated by the method and to "lock in" those new values for subsequent calculations performed by the invention. Calculations then proceed by the software in a "tumble-down" manner, thus affecting the determination of "downstream" calculations. Having the designer insert known, more accurate values and re-calculate downstream parameters improves the accuracy of downstream parameters/variables. Once a parameter value is locked in by the user, it cannot be changed by the invention by higher-level "upstream" values. Thus, "locking in" better values allows the designer to incrementally improve the accuracy of the information generated by the software as the aircraft design process progresses through the preliminary phase to the detailed design phase.

The method and apparatus of the present invention also makes it possible to do trade studies comparing competing EPGDS candidates from the several perspectives of the system attributes. The software of the present invention is very fast when compared to conventional, manual techniques. Selection of specific part and LRU level components can be changed by the user at various locations within the software. The present invention also supports design activities associated with upgrading derivative aircraft as well as the design of new aircraft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 illustrates the AC Electrical Load Characterization screen;

FIGS. 7A–7D illustrate the AC Load Summary By Flight Phase screen;

FIG. 10 illustrates the DC Electrical Load Characterization screen;

FIGS. 11A–11C illustrate the DC Load Summary By Flight Phase screen;

FIG. 21 illustrates the AC Power Generation screen;

FIG. 33 illustrates the Wire Type & Weight screen;

FIG. 36 illustrates the Common Dependability Cost Inputs screen;

FIG. 38 illustrates the Fuel Costs screen;

FIG. 39 illustrates the Spares Costs screen;

FIG. 40 illustrates the Line Maintenance Costs screen;

FIG. 41 illustrates the Shop Maintenance Costs screen;

FIG. 42 illustrates the Scheduled Maintenance Costs screen;

FIG. 43 illustrates the Schedule Interruption Costs screen;

FIG. 52 illustrates Maintenance Times screen;

FIG. 56 illustrates the 24-09, Electrical Power Distribution screen;

FIG. 57 illustrates the 24-10, Generator Drive screen;

FIG. 58 illustrates the 24-21, Power and Regulation screen;

FIG. 59 illustrates the 24-22, Controls and Indication screen;

FIG. 60 illustrates the 24-25, Back-up Generator screen;

FIG. 61 illustrates the 24-28, Feeders screen;

Figure 62:
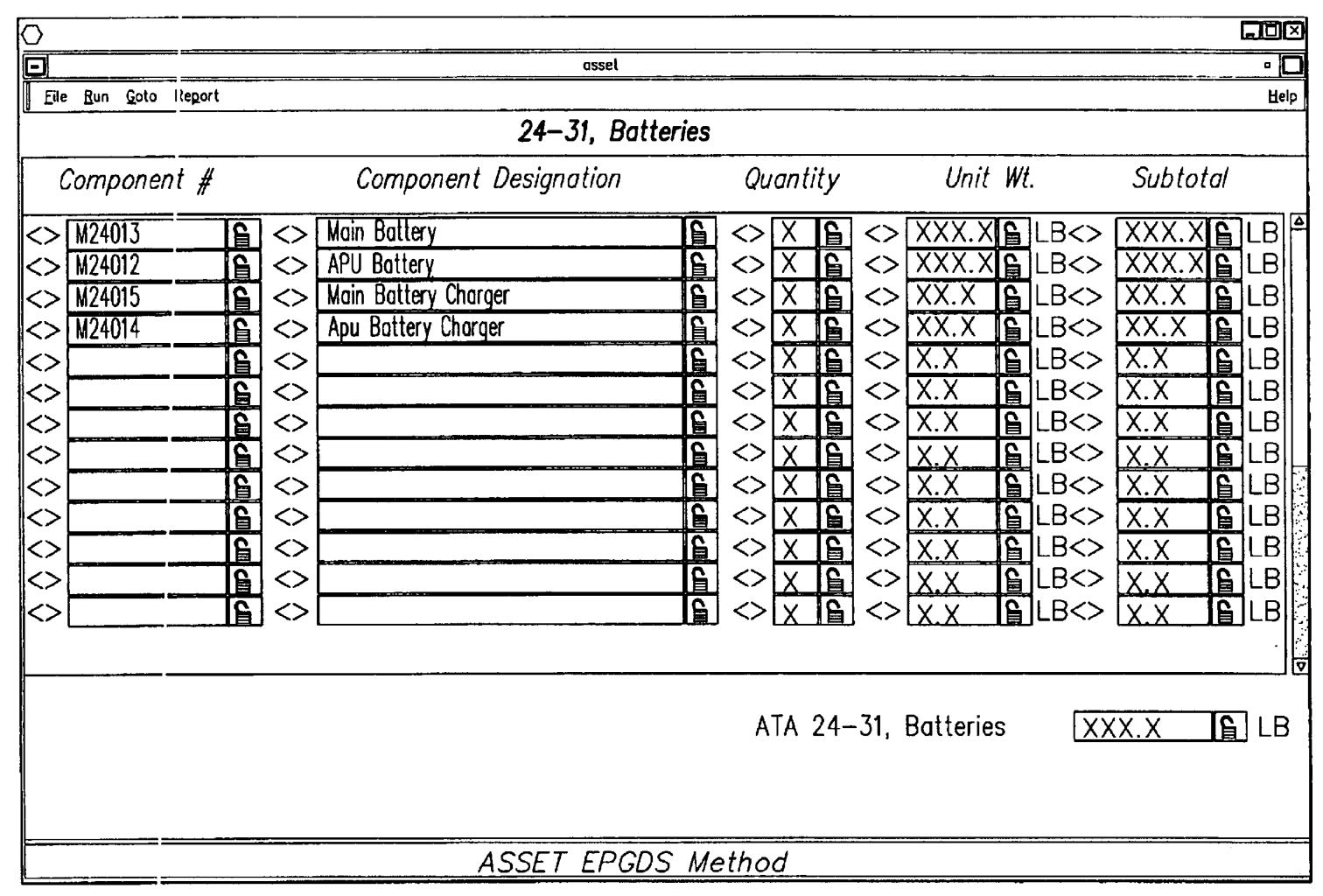

FIG. 62 illustrates the 24-31, Batteries screen;

Figure 63:
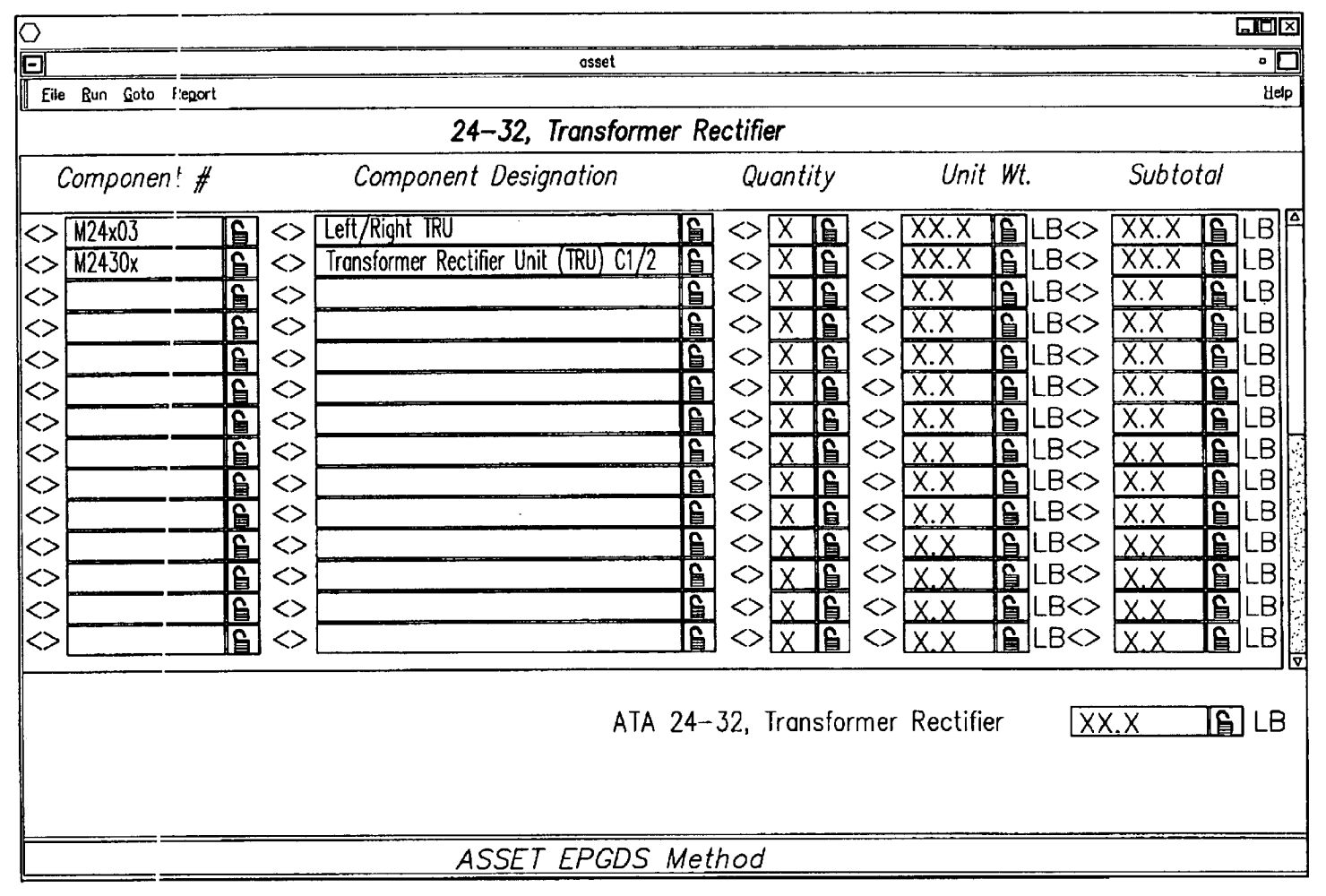

FIG. 63 illustrates the 24-32, Transformer Rectifier screen;

FIG. 64 illustrates the 24-33, Emergency Generator screen;

FIG. 65 illustrates the 24-35, Flight-Control DC Power screen;

Figure 66:
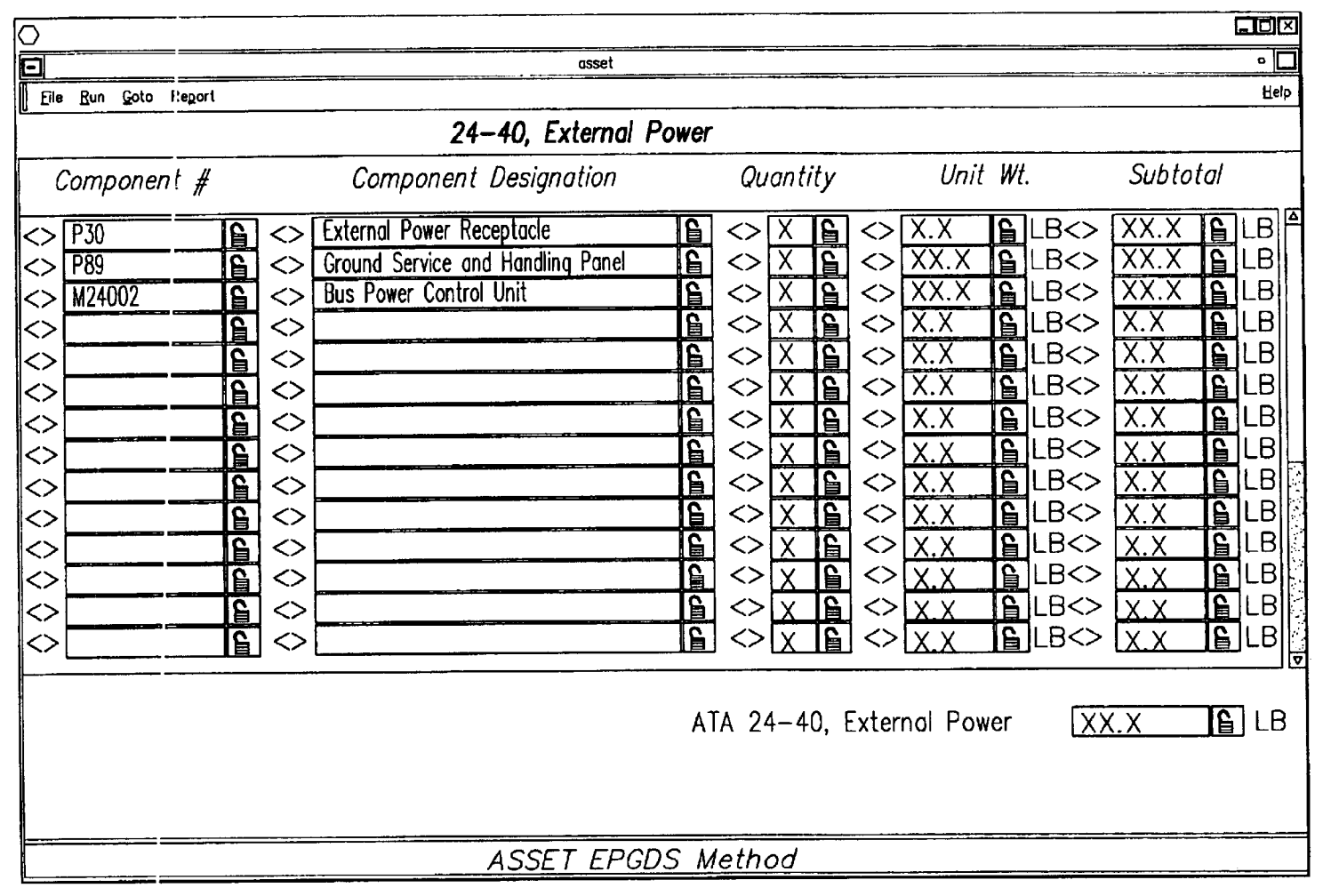

FIG. 66 illustrates the 24-40, External Power screen;

FIG. 67 illustrates the 24-51, AC Power Distribution screen;

FIG. 68 illustrates the 24-60, DC Power Distribution screen;

FIG. 69 illustrates the WW-01, Wiring Provision screen;

FIG. 70 illustrates the ATA Chapter 24 Weight Totals screen;

FIG. 73 illustrates the FC 32 Report screen;

DETAILED DESCRIPTION OF THE PREFERRED EMBODIMENTS

The following description of the preferred embodiment(s) is merely exemplary in nature and is in no way intended to limit the invention, its application, or uses.

Figure 1:
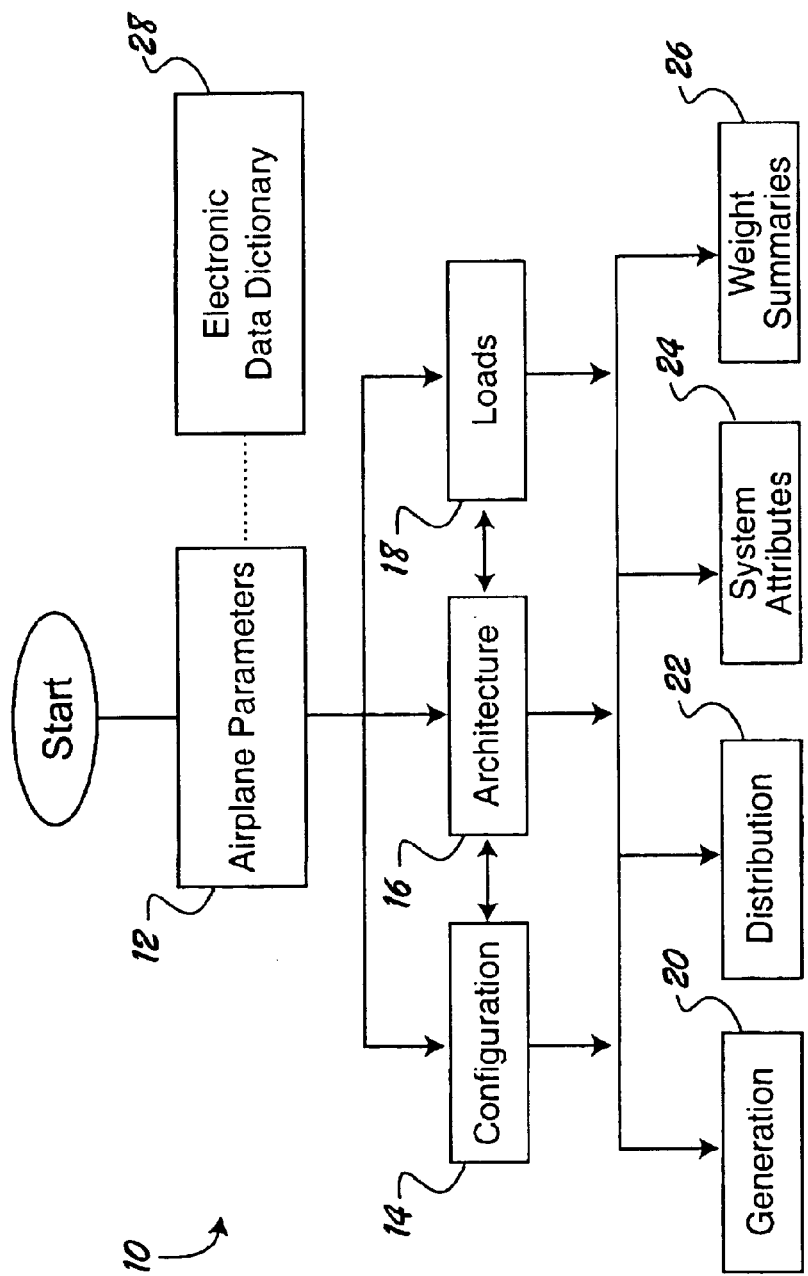
FIG. 1 is a simplified block diagram of the major modules of a preferred embodiment of the system and method of the present invention.

Referring to FIG. 1, there is shown a diagram of the major modules of a system and method 10 in accordance with a preferred embodiment of the present invention. It will be appreciated immediately that the system 10 is implemented in a user-friendly software program adapted to run on a suitable computer system such as those manufactured by the Hewlett Packard Corporation in the form of an Hp-Ux server with PC workstations as clients, and incorporating a Motif graphical user interface (GUI).

The system 10 essentially comprises an aircraft synthesis and systems evaluation technique (ASSET) which, in the embodiment illustrated in FIG. 1, is specifically implemented, in this example, in connection with the design of an electrical power generation and distribution system (EPGDS) for an aircraft. However, it will be appreciated that the software program of the present advantage could be readily modified to accommodate the development of other components, subsystems, systems or structure of aircraft, rotorcraft, spacecraft or other aerospace vehicles. For example, the system 10 could be modified to enable a designer to evaluate a wide variety of variables/parameters of a landing gear system of an aircraft.

The system 10 allows a designer to define major aircraft parameters and/or variables via an Airplane Parameters module 12. In one preferred embodiment, at least two parameters, the number of engines (NE) of an aircraft and the maximum takeoff weight (MTOW) of the aircraft, are required for the system to be able to perform the necessary calculations to provide the needed information to the designer. From this information, the system 10 calculates, through a plurality of stored formulas and knowledge-based engineering algorithms, the following information: the configuration of an aircraft under design, via a configuration module 14; the architecture of several major subsystems relating to the EPGDS, via an Architecture module 16; and information concerning the analysis of the AC and DC loads of electrical components used on the aircraft, via a Loads module 18. From information generated by these modules, additional calculations are performed by the system 10 to determine the components and attributes of various electrical power generation components (i.e., line replaceable units (LRUs)) used on the aircraft via a Generation module 20, information concerning the power distribution system and components used on the aircraft via a Distribution module 22, various system attributes such as dependability cost, reliability and maintainability via a System Attributes module 24, and weight summary information via a Weight Summaries module 26. The Weight Summaries module 26 provides highly useful weight information to the designer at the earliest stages of the design process. This significantly improves the ability of the designer to influence and control weight considerations very early on in the design process. The variables/parameters associated with each of these modules, as well as the various other modules of the system 10, in addition to the numerous formulas used by the system, are provided in the "Software Functional Specification" for the system which is attached hereto as Appendix A in the accompanying Computer Program Listing Appendix on compact disc, and which is hereby incorporated by reference into the present application.

The above-described information provides the aircraft designer with a highly useful overall "picture" of the subsystems, LRUs, electrical characteristics, weight factors, and various other attributes associated with the EPGDS of the aircraft. Importantly, and as will become more apparent throughout the following discussion, the system 10 provides the designer with the opportunity to change any one or more of a large plurality of parameters/variables associated with EPGDS design considerations and to have the system 10 re-calculate those parameters/variables affected by the changes input by the designer. The system 10 also permits the designer to "lock in" virtually any of the parameters/variables that the system has calculated (or that the designer has input) such that same cannot be overridden by the system in subsequent calculations. This makes the system 10 especially useful for generating information which can be used in multi-level trade studies to evaluate competing EPGDS subsystem designs. This feature also allows the designer to replace previously calculated estimates of various attributes with known (i.e., better or more accurate) data as such data becomes available to the designer. Thus, as better knowledge of each of the hundreds of design parameters, EPGDS components and variables under consideration becomes available, the designer is able to override previously calculated attributes or values and then lock them in before performing further calculations with the system 10. Inserting known, more accurate values and attributes improves the accuracy of "downstream" calculations performed by the system 10. Moreover, once a parameter value is locked in by the designer, it cannot be altered by changes in "upstream" values made by the system 10 or the designer. This feature of allowing the designer to "lock in" more accurate values, parameters or attributes allows the designer to incrementally improve the accuracy of the information generated by the system 10 as it is used by the designer from the preliminary design phase to the detailed design phase of an aircraft.

An additional feature of the system 10 is an Electronic Data Dictionary 28. The Electronic Data Dictionary 28 is accessible to the designer at any screen of the software of the system 10 via a "Help" menu tab. The Electronic Data Dictionary 28 provides the designer with information concerning the numerous variables and formulas used by the system 10 to perform its calculations. The formulas and algorithms incorporated in the Electronic Data Dictionary 28 are applicable to all design phases. This permits "seamless" use of the system 10 from the preliminary design phase through the detailed design phase, thus avoiding discontinuities which could be caused by switching between varying design methods. Further, this Electronic Data Dictionary 28 is integrated with the compilation of new versions of the program of the present invention simplifying the programmer's task and improving the invention's fidelity.

Figure 5A:
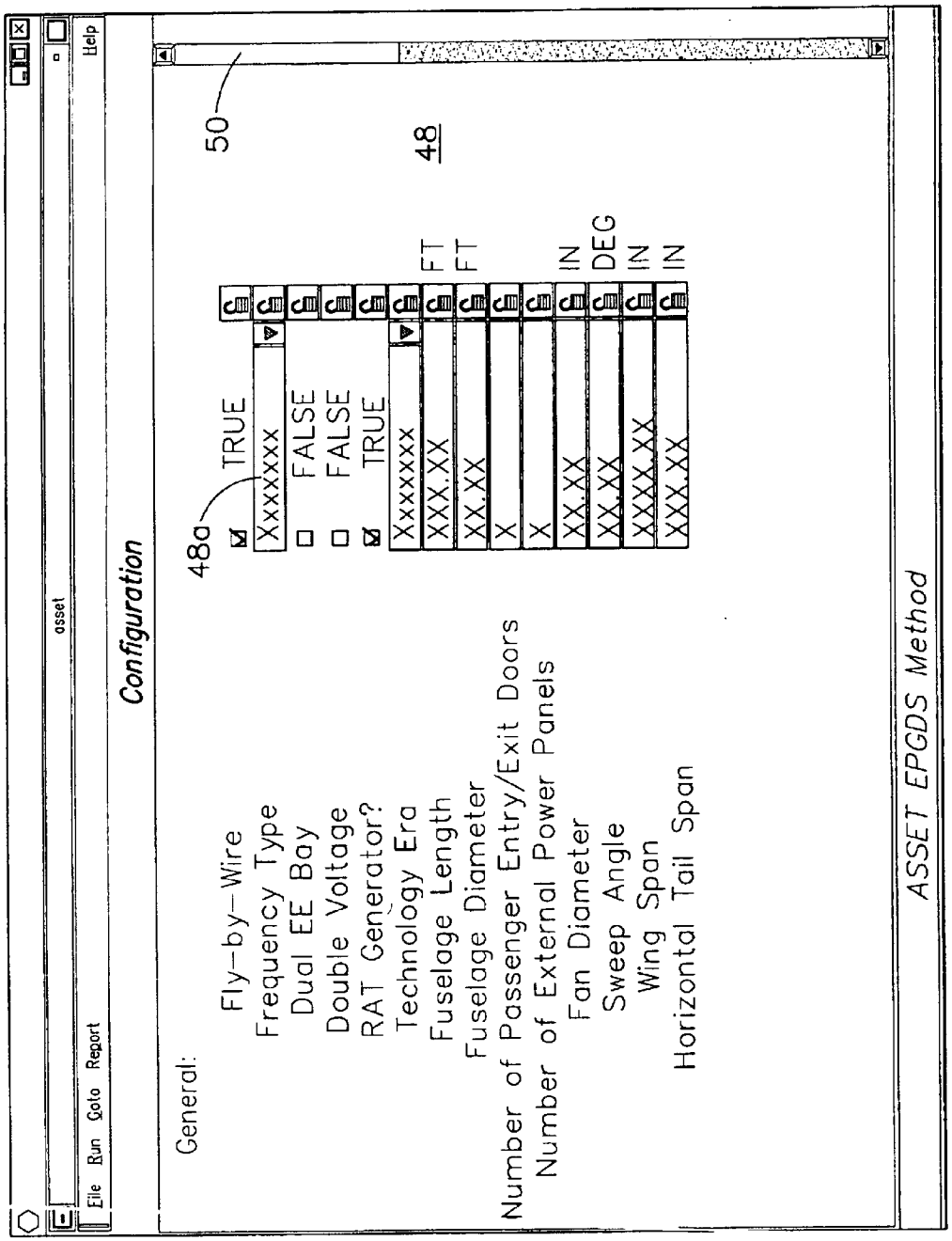
FIGS. 5A and 5B illustrate the Configuration screen.
Figure 5B:
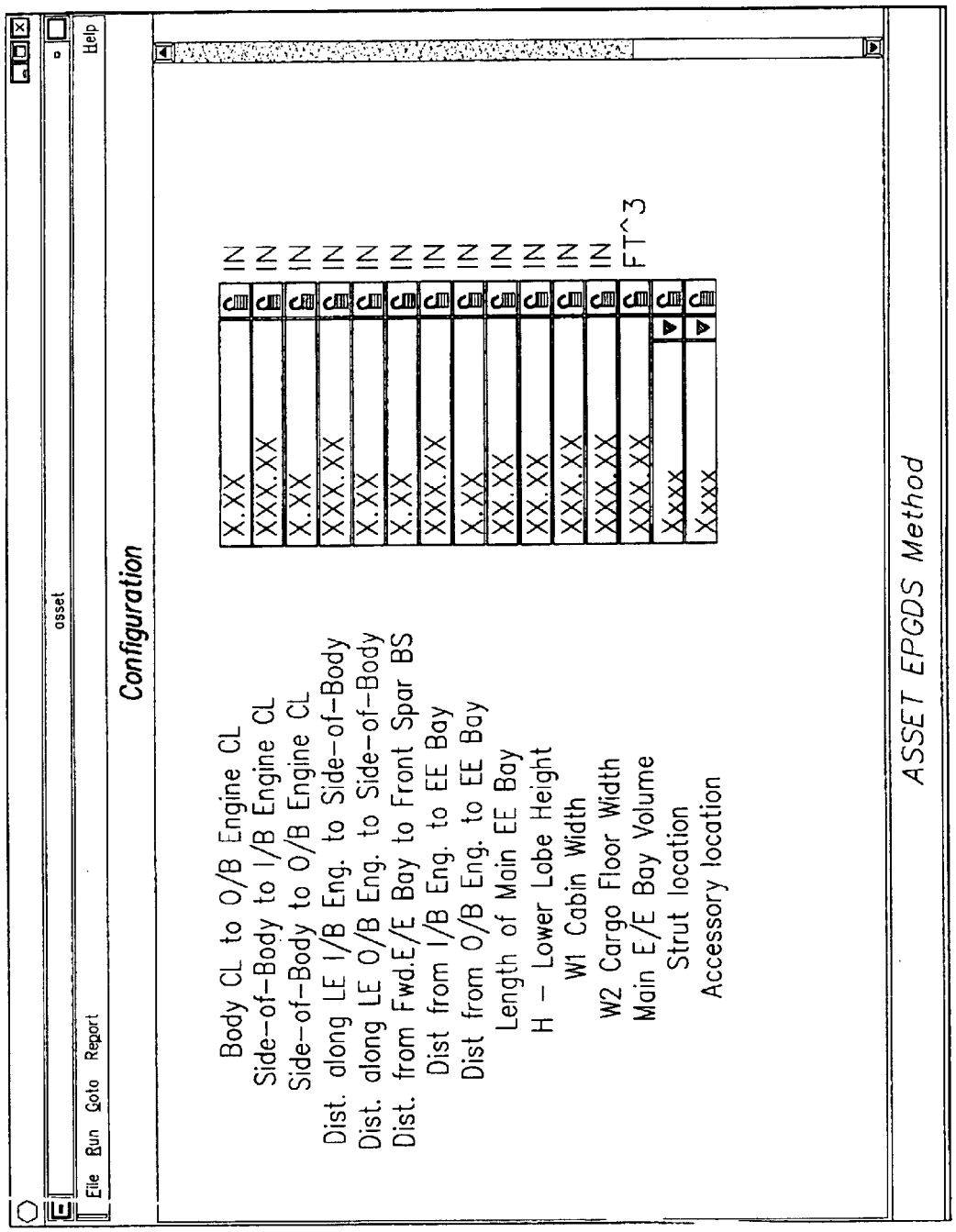

The Configuration module 14 is used for general parameters needed by the Loads module 18, the Architecture module 16, the Generation module 20, the Distribution module 22, and the System Attributes module 24. The specific parameters are illustrated in FIGS. 5A and 5B which show the Configuration screen of the software of the system 10.

The Architecture module 16 includes screens, illustrated in FIGS. 15–19, which default to one of four typical electrical power system architectures: quad engine fly-by-wire, quad engine non-fly-by-wire, twin engine fly-by-wire, and twin engine non-fly-by-wire. Once an architecture is selected, a default set of LRUs is automatically input into a plurality of ATA 24 attribute screens (Appendix B) which denote the most typical LRU selection for that architecture. Appendix B is hereby incorporated by reference into the present application. For example, a million pound class, four engine (Quad), non-fly-by-wire aircraft defaults to certain LRU group, such as an LRU group for a 747 aircraft of the assignee. These default LRU selections can be altered and the changes locked by the user, as described herein. If a radically different architecture is to be used, the designer should select the closest default architecture as a starting point. It is then the designer's responsibility to populate the attribute screens (to be discussed) with the appropriate type and number of LRUs. The one-line diagrams illustrated in the attribute screens may then be invalid and should only be used with care by the designer.

The Loads module 18 is used to perform loads analysis, which drives the power system capacity ratings of its LRUs. The Load module 18 performs five distinct functions: full AC loads analysis, essential loads analysis, DC loads analysis, standby loads analysis, and in-flight entertainment (IFE) loads analysis. The screens associated with the Loads module 18 will be described in connection with FIGS. 4–13.

The Generation module 20 performs the sizing of the generation LRUs and relies upon data extracted from the Loads module 18 and the Architecture module 16. The Loads module 18 dictates the required AC and DC load capacities and the Architecture module 16 specifies the number of the various LRUs. The screens associated with the Generation module 20 will be discussed in connection with FIGS. 20–28.

The Distribution module 22 determines the weight of the power feeders and distribution panels of the aircraft and relies upon data extracted from the Airplane Parameters module 12, the Configuration module 14, the Generation module 20 and the Architecture module 16. The screens associated with the Distribution module are illustrated in FIGS. 29–34.

The System Attributes module 24 generates performance factors which are used to characterize and quantify the merits of various EPGDS designs. System attribute information is highly useful when comparing various alternative electrical systems. The System Attributes module 24 calculates information relating to three factors: dependability cost, reliability and maintainability of the components of the EPGDS. The dependability cost relates to the dependability cost of the main generators of the aircraft's electrical system. Reliability is calculated for the Main and Standby electrical power systems, the Backup system when appropriate, and the Flight Control DC (FCDC) system for fly-by-wire architectures. The reliability is calculated based on the flight length and on the failure rates and probabilities associated with LRUs affecting the availability of the various power sources. Maintainability information is calculated by the system 10 using the parameters "Mean Time To Repair (MTTR), "Mean Maintenance Preparation Time" (MMPT), "Mean Maintenance Down Time" (MMDT), "Mean Time Between Maintenance" (MTBM), and "Inherent Availability" (IA). These parameters are calculated for the main generator (either integrated drive generator (IDG) or variable frequency generator (VFG). They are also based on the "Mean Time Between Unscheduled Removals" (MTBUR), the maintenance intervals for servicing and adjustment, and the mean times required for the various maintenance tasks. The screens associated with the Systems Attributes module 24 will be discussed further in connection with FIGS. 35–54.

Figure 2:
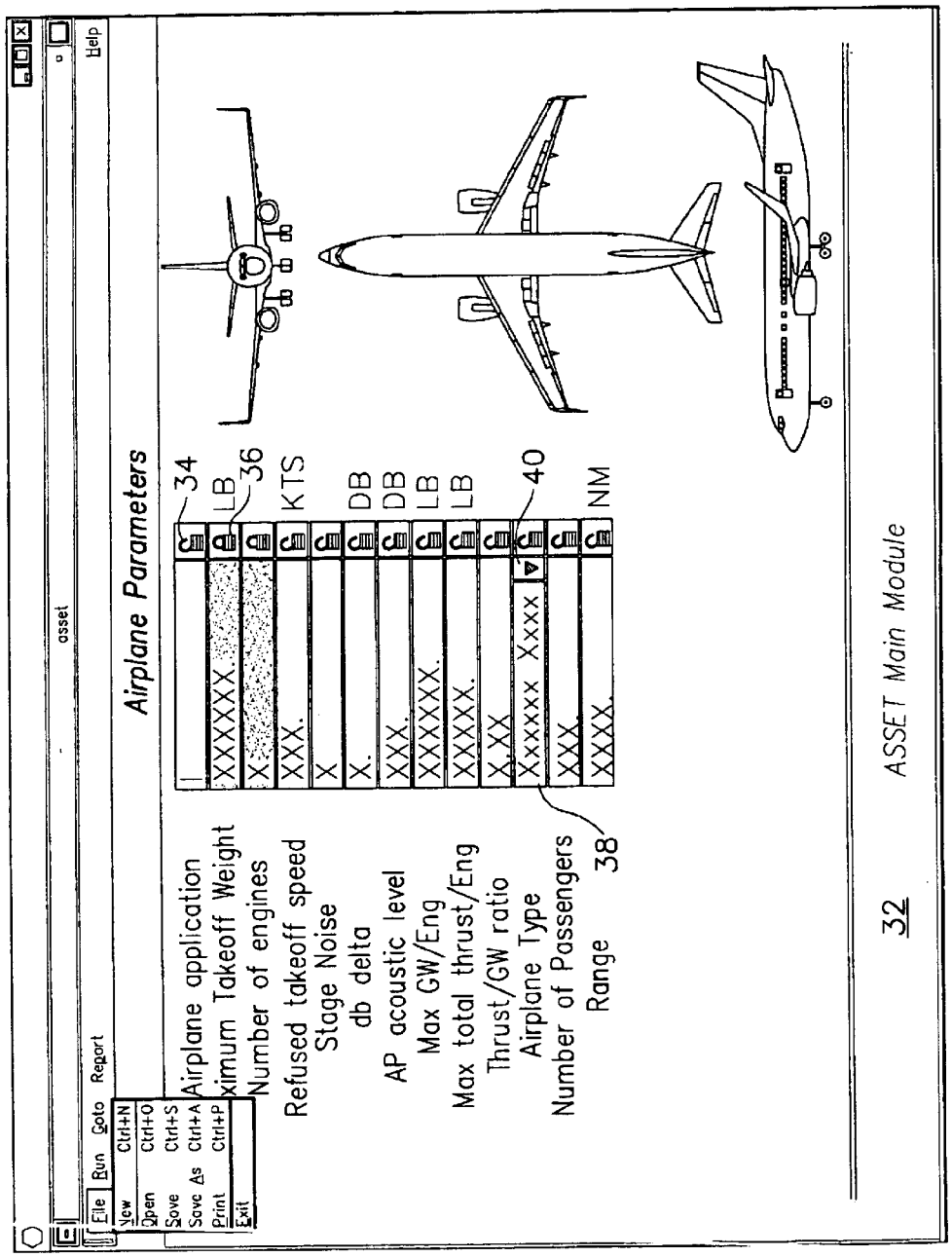
FIG. 2 illustrates the Aircraft Parameters screen of the software together with the pull down menu associated with the "File" menu tab.

The Weight Summaries module 26 involves calculations relating to three weight summaries: ATA 24 weight summary, FC 32 weight summary and "Below Wing" weight. The ATA 24 weight summary is concerned with electrical power generation and distribution. It is the system typically used by electrical power system engineers to keep track of the weight of the electrical power system. All weights of all LRUs are calculated by the system 10 regardless of whether they make the ATA 24 lists or not. The FC 32 weight summary is also concerned with electrical power generation and distribution system weights, but it is in the preferred format used by mass properties engineers. The below wing weight information is used typically by propulsion engineers. This provides the below wing weight of the EPGDS for each nacelle/strut combination and the total below wing weight for all of the nacelle/struts. The screens associated with the Weight Summaries module 26 are illustrated in Appendix B, which is hereby incorporated by reference Referring to FIG. 2, the "Airplane Parameters" screen 32 associated with the Airplane Parameters module 12 is shown. It will be appreciated that this screen 32, as well as each of the screens subsequently described herein, each include "File", "Run", "Goto" and "Report" menu tabs. Selecting each one of these menu tabs produces a pull down menu. The pulldown menu for the "File" menu tab is such as that shown in FIG. 2 with a plurality of options for saving, as a file, the information the designer is currently using with the system and method 10. The "Airplane Parameters" screen 32 can be seen to provide a number of fields in which the designer can input desired values. As described hereinbefore, preferably only two of the fields, those being the "Number of Engines" and the "Maximum Takeoff Weight" are fields which require inputs from the designer. The system 10 uses calculates each of the remaining fields. The designer may alter these values estimated by the system. The "lock-in" symbol 34 can be used by the designer to lock-in a value such that the system 10 cannot modify the locked-in value during subsequent calculations. Selector 36 indicates that the user selected maximum take-off weight (MTOW) of 300,000 lbs. has been locked-in by the designer. It could not be altered by the system 10 in any case since it is one of the two top level parameters (along with number of engines). Field 38 is an option for the designer to select either a "Narrow Body" or a "Wide Body" aircraft via the pull down menu arrow 40.

Figure 3:
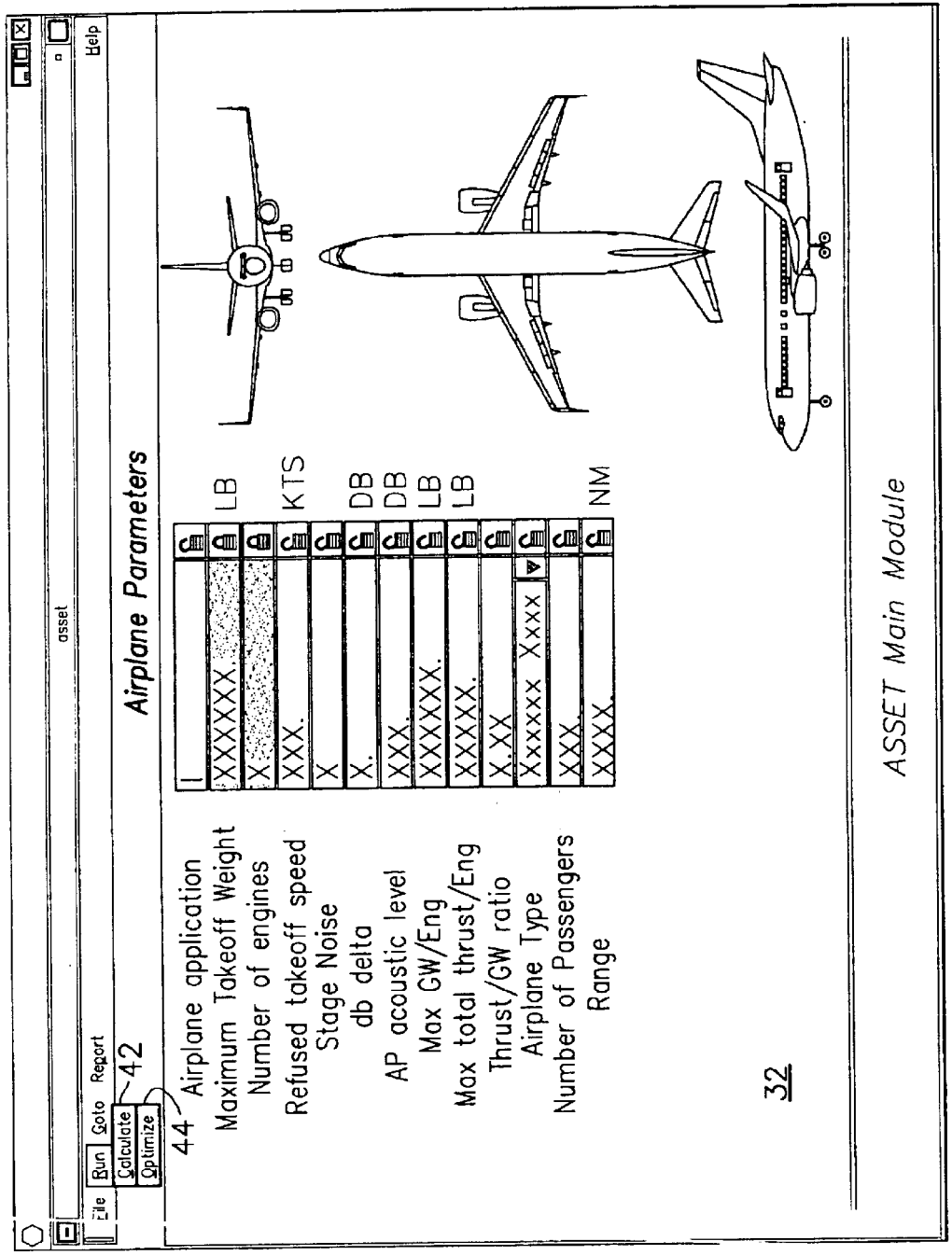
FIG. 3 illustrates the selections of the pull down menu associated with the "Run" menu tab.

FIG. 3 indicates the Airplane Parameters screen 32 but with the "Run" selection selected. This produces a pull down menu providing a "Calculate" option 42 and an "Optimize" option 44. The "Calculate" option causes the system 10 to re-calculate the various parameters and attributes on the screen that will change after the designer has changed one of the user definable inputs. The "Optimize" selection 44 re-calculates everything on the screen. In each of the foregoing and subsequently described screens of the system 10, a "Help" menu tab 46 allows the user to access the Electronic Data Dictionary 28 for information on any particular variable or component being used by the system 10.

Figure 4:
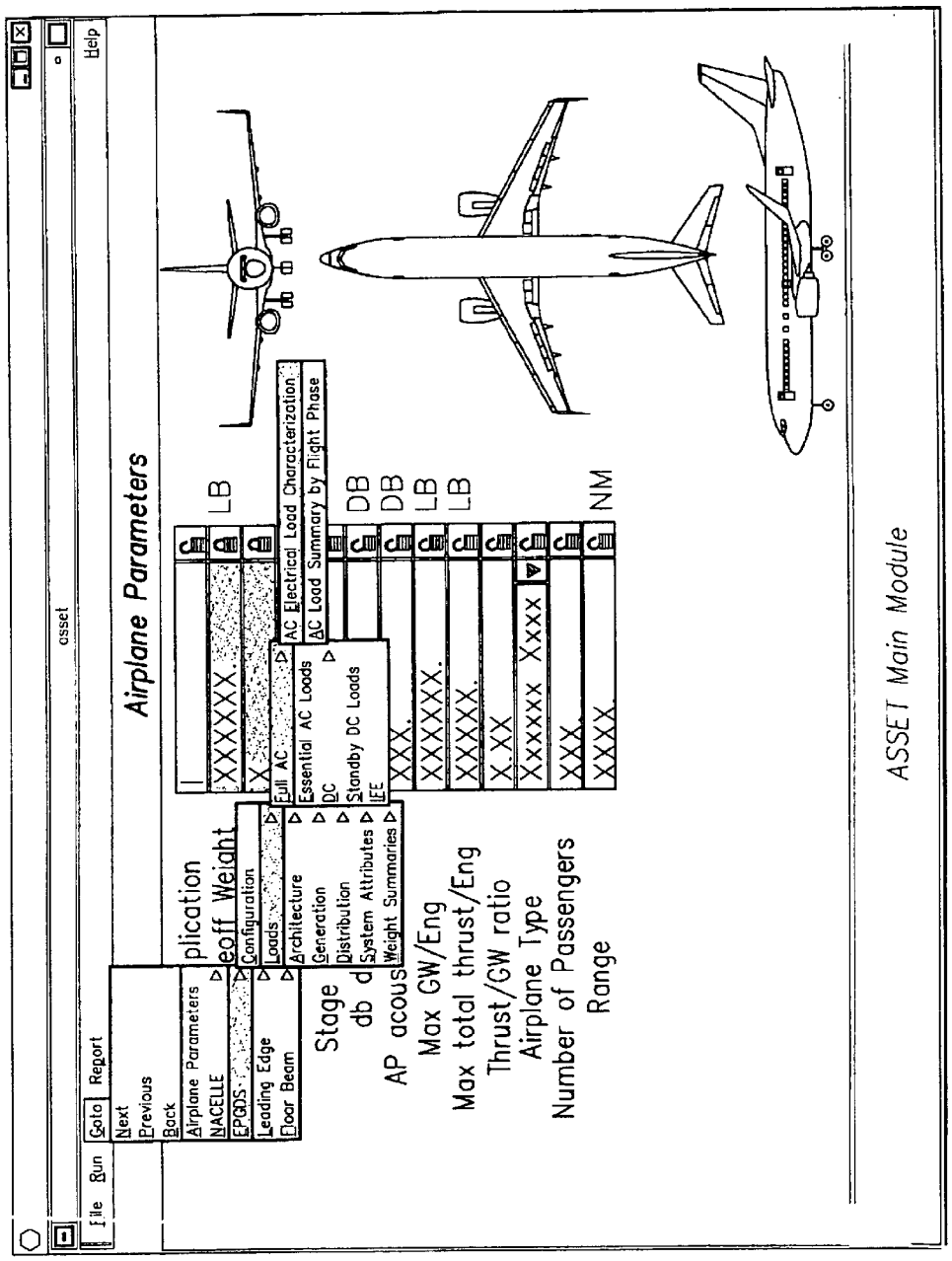
FIG. 4 illustrates the pull down menus associated with the "Goto" menu tab.

Referring now to FIG. 4, the pull down menu of the "Goto" menu tab is illustrated. This pull down menu indicates several major subsystem selections which may be selected by the designer for review and/or modification. The EPGDS submenu item is shown being selected. This selection produces a second pull down menu listing the options of "Configuration", "Loads", "Architecture", "Generation", "Distribution", "System Attributes", and "Weight Summaries". With brief reference to FIGS. 5a and 5b, the Configuration screen 48 is shown. It will be appreciated that FIG. 5b is a continuation of the screen shown in FIG. 5a. A vertical scroll bar 50 allows the designer to scroll up and down among the various fields of this screen. The Configuration screen 48 includes a number of screens more closely related to the configuration of the aircraft fuselage. Field 48a allows a designer to select a "Frequency Type" value of "Constant" or "Variable". "Constant" means 400 Hz. "Variable" means the frequency changes with engine speed between about 300 and 700 Hz. The designer is also allowed to select a "Technology" Era" which uses current era LRUs or what is predicted to be available within a future time frame, such a by year 2005. The remaining fields all contain variables which the system 10 will calculate, based on the original inputs by the designer in the Airplane Parameters screen 32. However, the designer has the option of changing the system 10 calculated value displayed in any one of these fields and also of locking in the input value he/she inputs.

Referring again to FIG. 4, if the designer selects the "Loads" option in the second pull down menu, then a plurality of menu suboptions are presented in a third pull down menu. These options are "Full AC", "Essential AC Loads", "DC", "Standby DC Loads" and "IFE" (in-flight entertainment). Selecting the "Full AC" option produces a fourth pull down menu with the options "AC Electrical Load Characterization" and "AC Load Summary By Flight Phase". The "AC Electrical Load Characterization" screen 52 is shown in FIG. 6. This screen 52 provides a number of fields for the designer to select desired numbers of certain electrical components such as fans, TRUs (transformer rectifier units), ACMPs (alternating current motor pumps) and various other pumps. Each of these numbers can also be locked in by the designer.

Referring to FIGS. 7a–7d, the "AC Load Summary By Flight Phase" screen 54 can be shown. Screen 54 presents the AC load in kVA for each one of three operational phases of the aircraft denoted as "Passenger Loading", "Engine Start", "Taxi Out", "Take Off and Climb", "Cruise" and "Descent and Land". Scroll bar 56 allows the user to scroll up and down within screen 54. The "Maximum Flight Phase Load" is the maximum load experienced in any of the six foregoing flight phases. In this example, the "Take Off and Climb" phase illustrated in FIGS. 7c and 7d produces the maximum flight phase load of 116.88 kVA with a power factor of 0.96.

Figure 8:
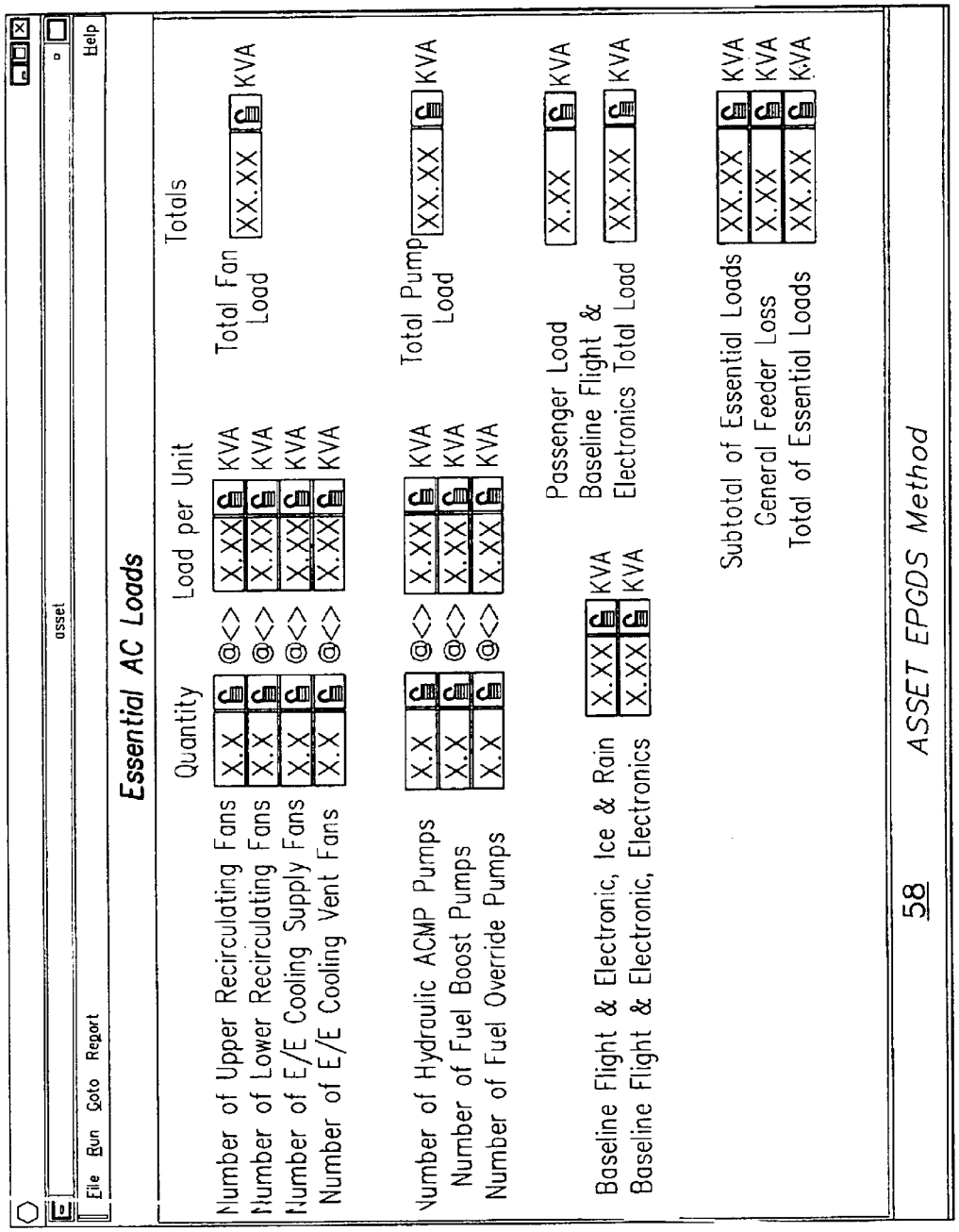
FIG. 8 illustrates the Essential AC Loads screen.

Referring now to FIG. 8, the "Essential AC Loads" screen 58, which can be selected from the third pull down menu in FIG. 4, is illustrated. This screen 58 provides the user with suggested quantities of various types of fans and pumps along with an approximation of the electrical load per unit of each item. The designer can modify the value displayed in any of these fields and lock in the modified value.

Figure 9:
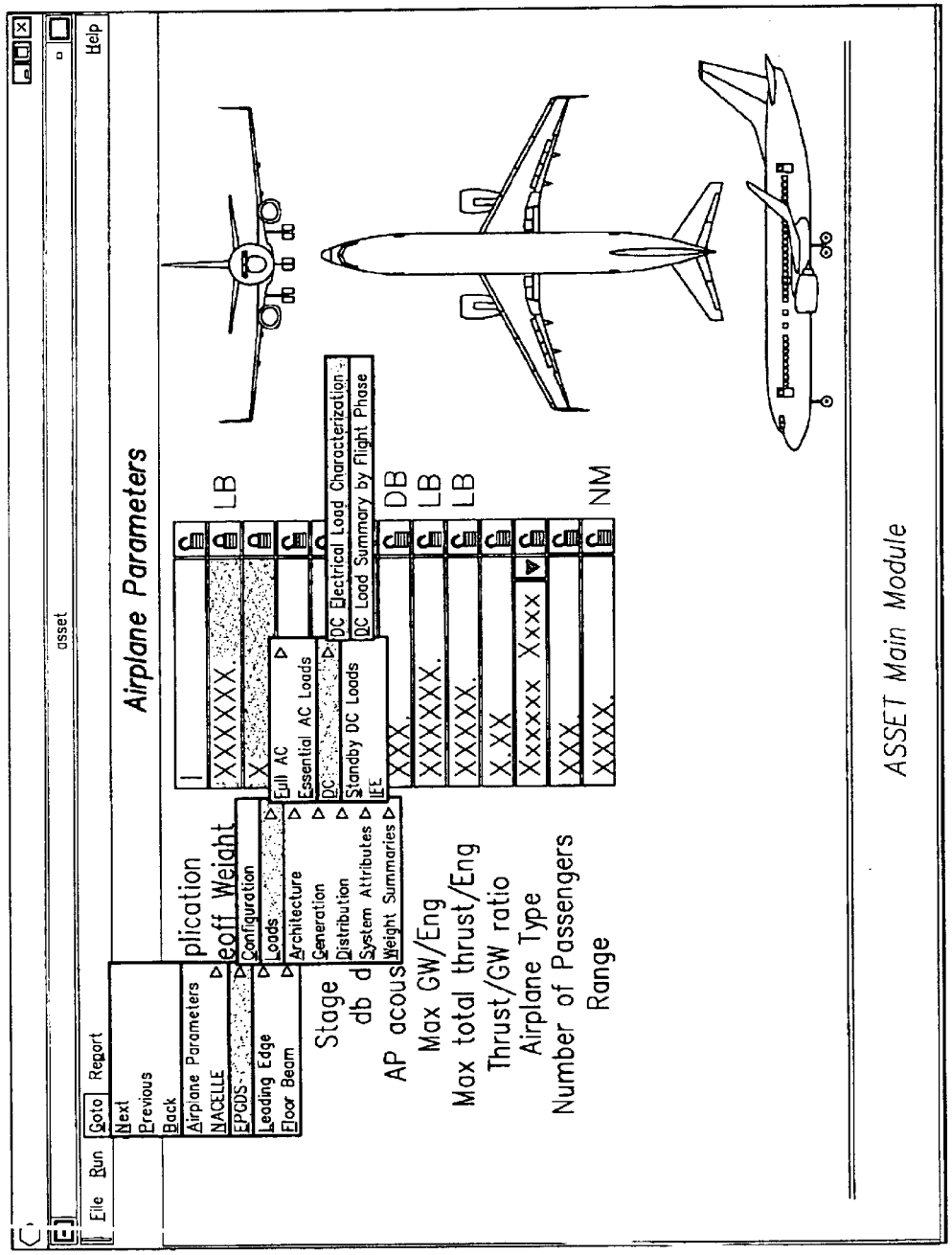
FIG. 9 illustrates the pull down menu associated with the DC menu option.

FIGS. 9–11 illustrate the two options "DC Electrical Load Characterization" and "DC Load Summary By Flight Phase" for six flight phases as similar to described in FIGS. 7a–7d.

Figure 12:
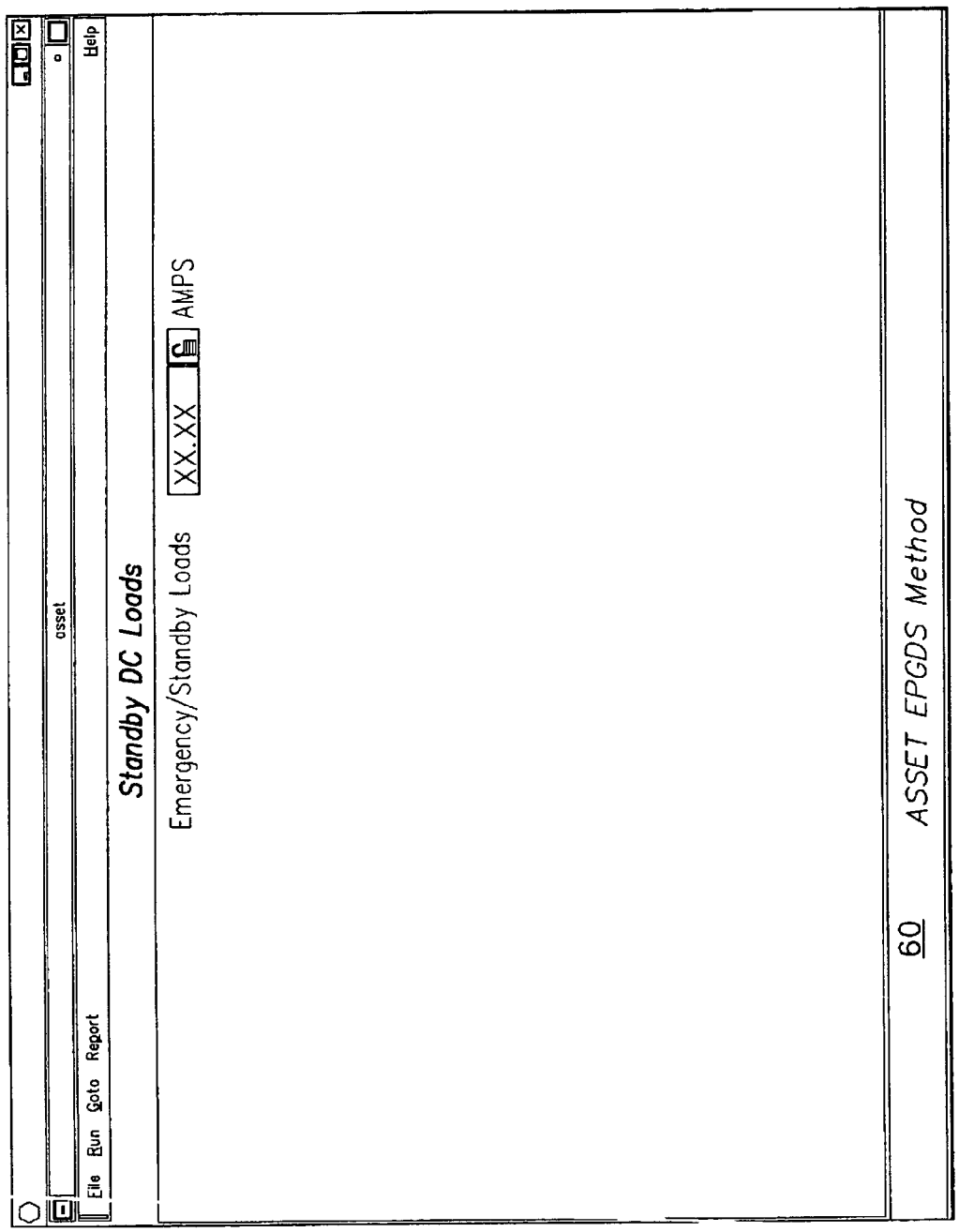
FIG. 12 illustrates the Standby DC Loads screen.

FIG. 12 illustrates the "Standby DC Loads" screen 60 which shows the Emergency/Standby Load calculated by the system 10 in amps. This value represents the minimum number of amps needed to run the electrical systems of the aircraft.

Figure 13:
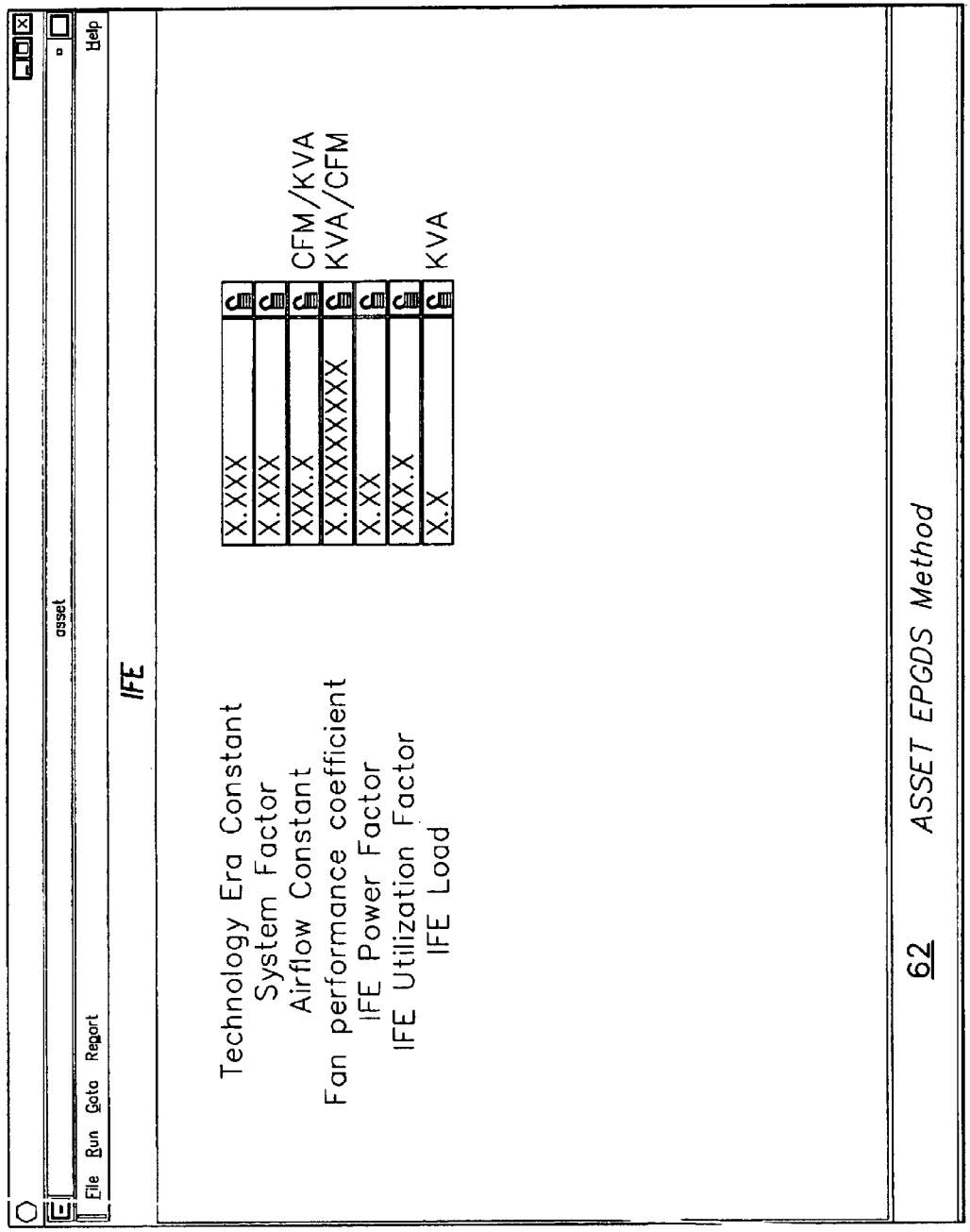
FIG. 13 illustrates the IFE screen.

FIG. 13 illustrates the IFE screen 62 showing various power and utilization factors associated with the IFE of the aircraft.

Figure 14:
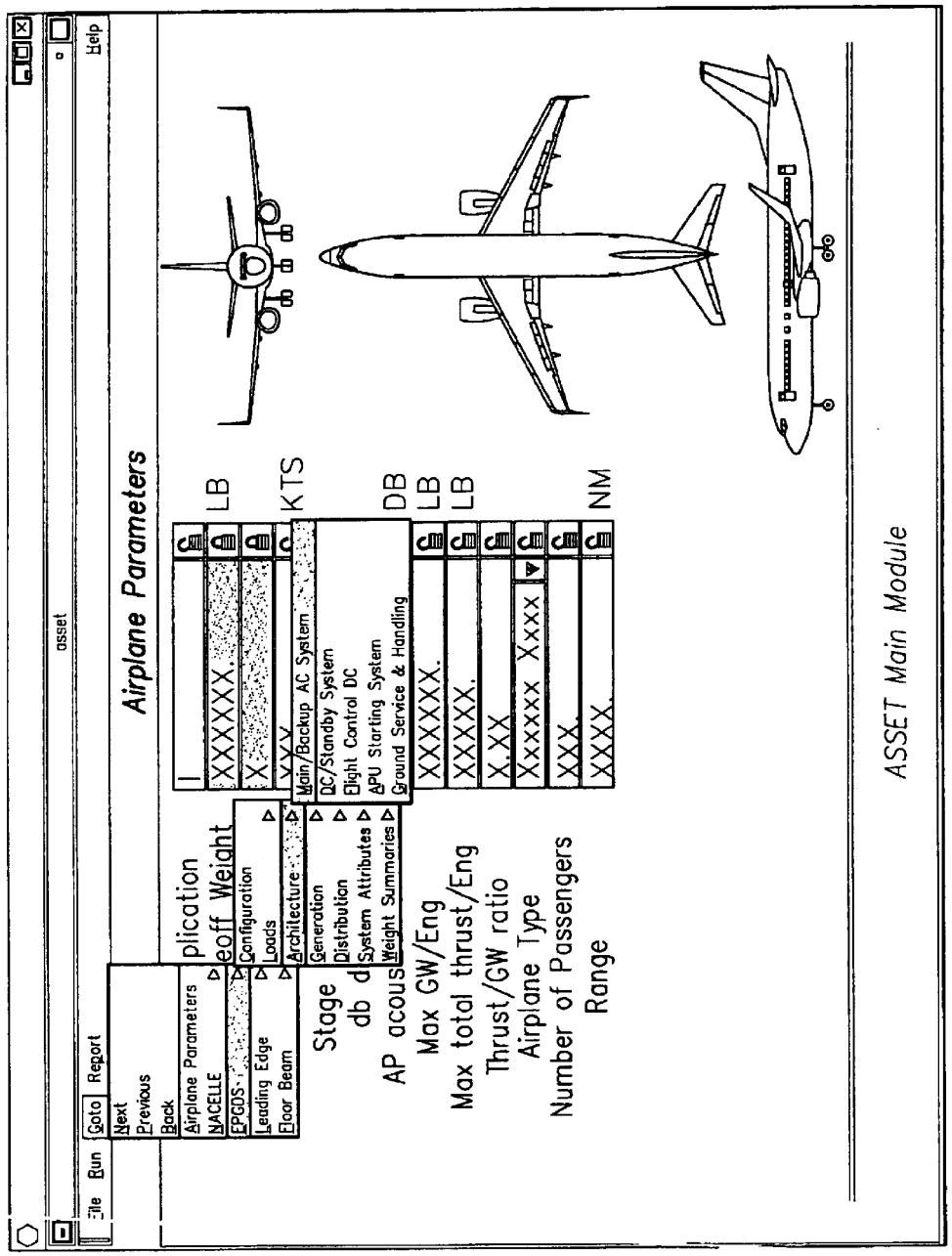
FIG. 14 illustrates the pull down menu associated with the Architecture menu option.
Figure 15:
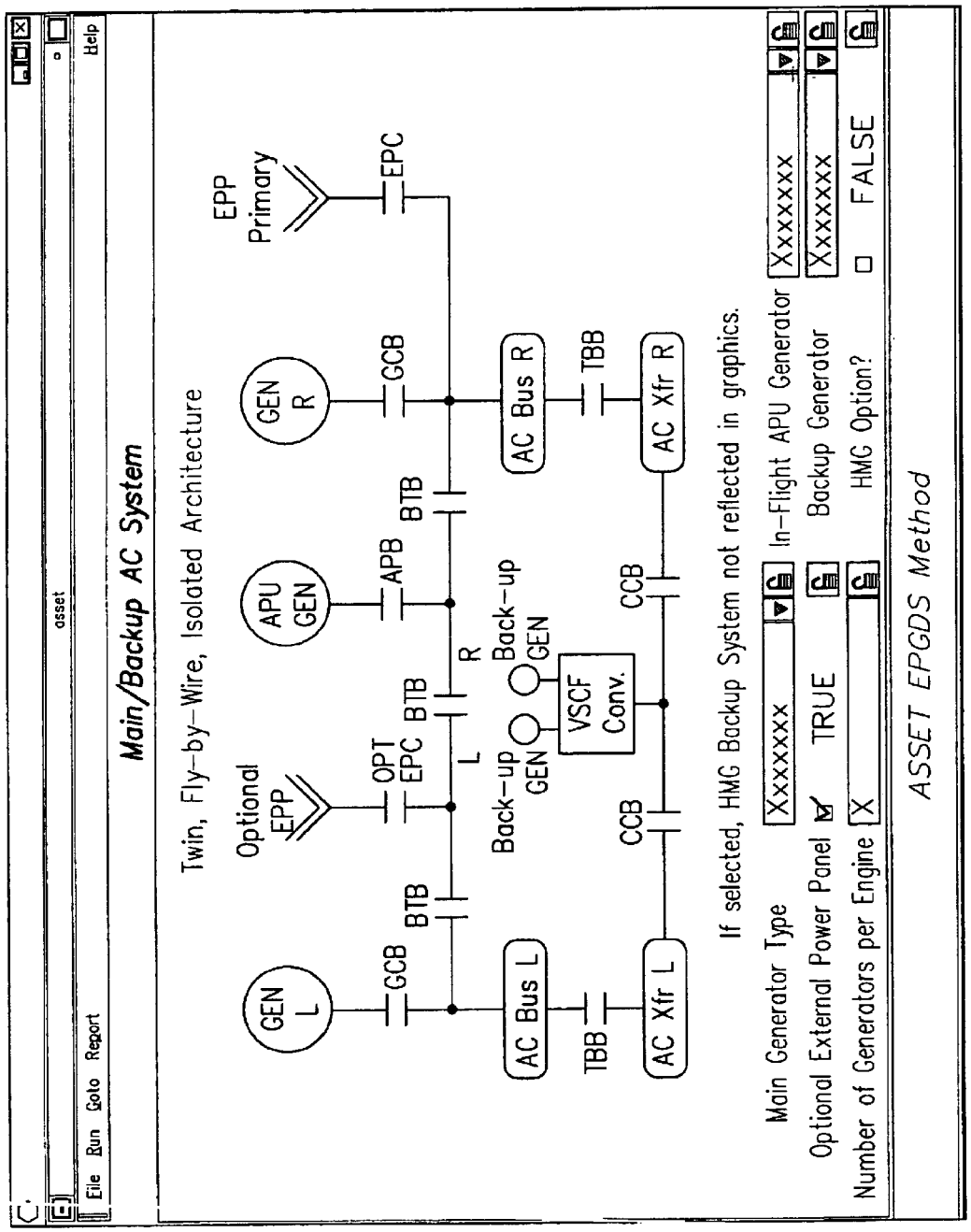
FIG. 15 illustrates the Main/Backup AC System screen.

Referring now to FIG. 14, the "Architecture" selection in the second pull down menu is shown as being selected. This module populates the system 10 with electrical generation/conversion components to generate systems weight. Along with the Loads analysis, the Architecture analysis forms the basis for sizing power sources for the aircraft under design. The first selection in the third pull down column, "Main/Backup AC System", is illustrated in FIG. 15. This is a one-line diagram of a twin, fly-by-wire, isolated architecture drawn by the method for the aircraft being analyzed.

Figure 16:
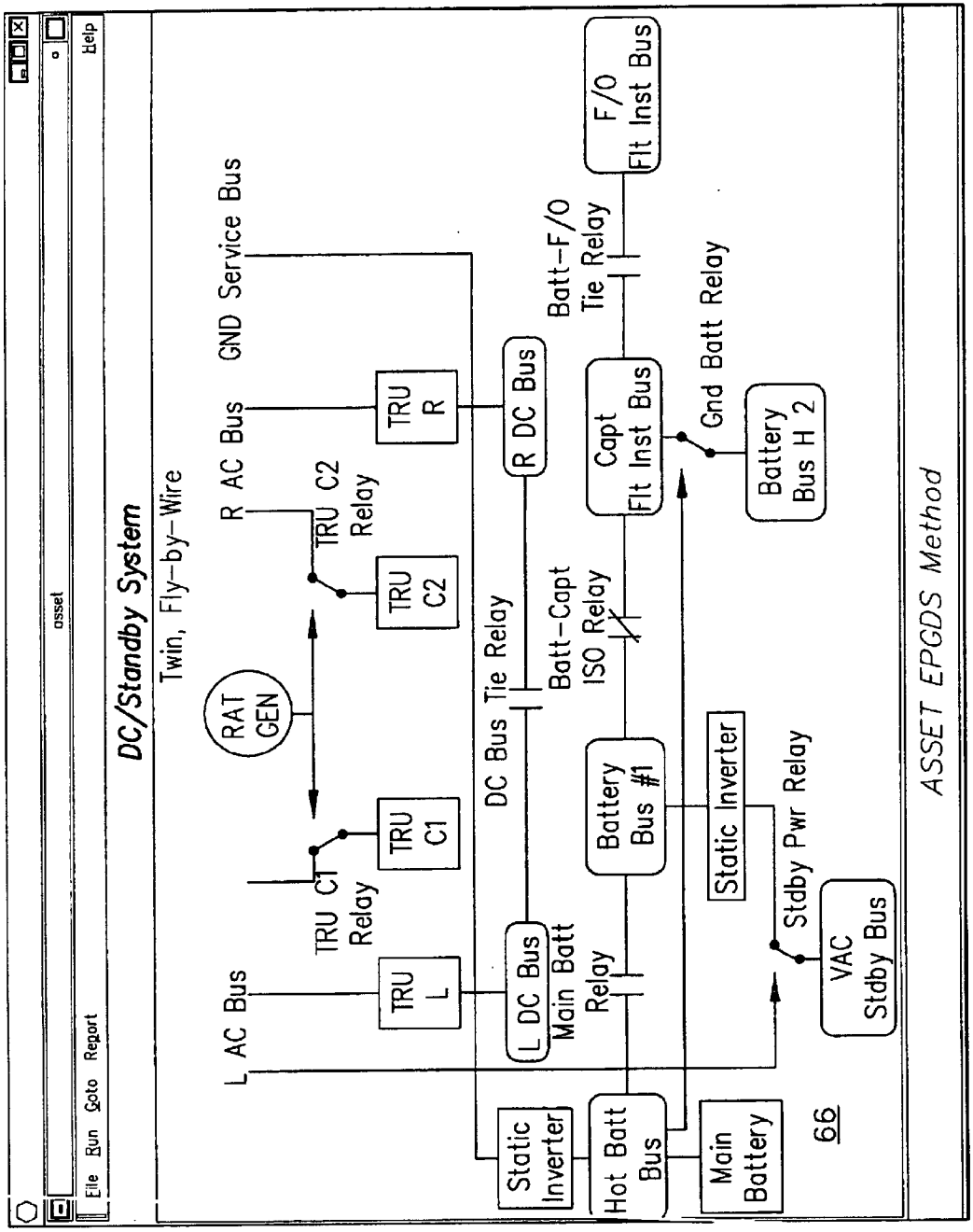
FIG. 16 illustrates the DC/Standby System screen.
Figure 17:
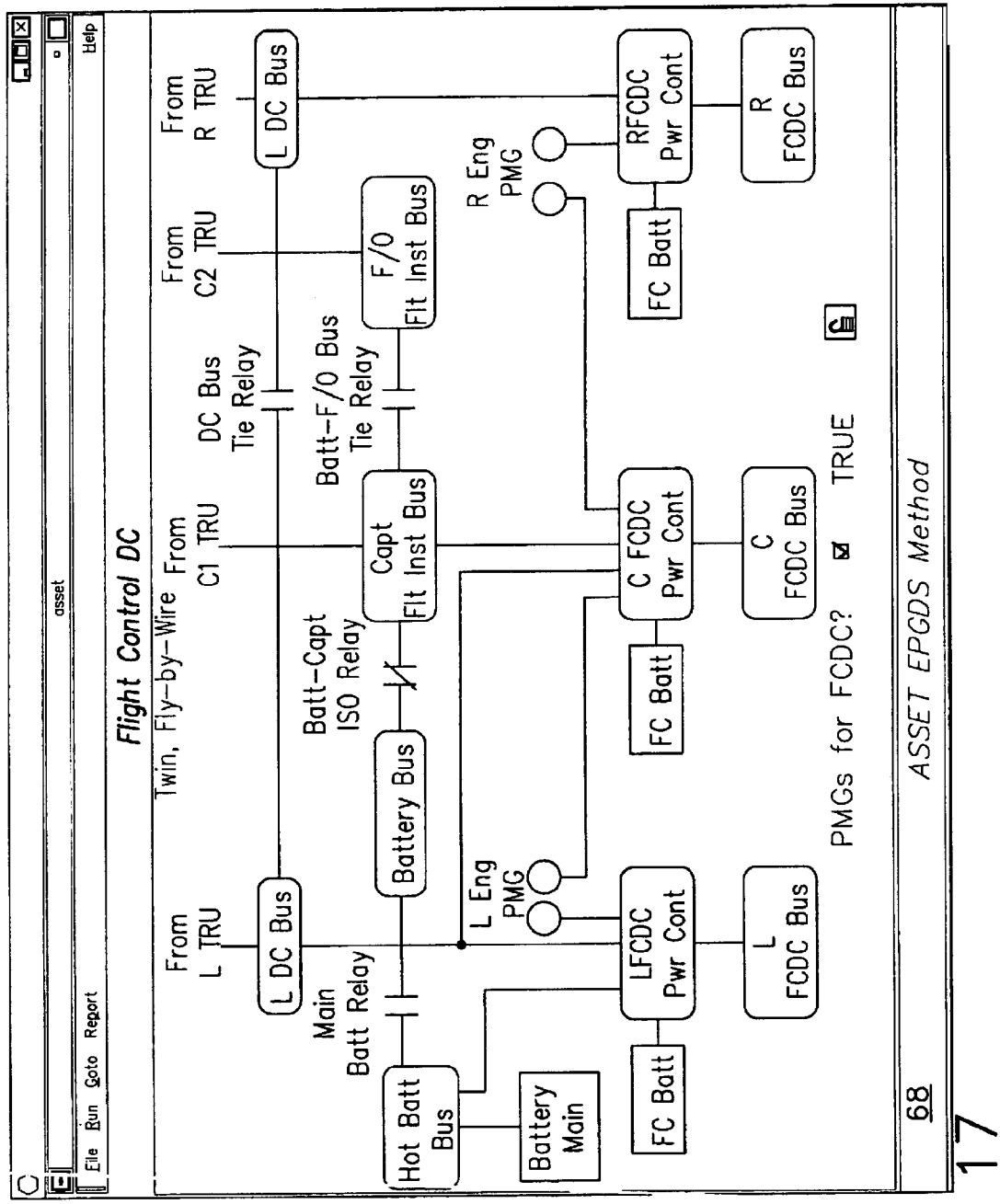
FIG. 17 illustrates the Flight Control DC screen.
Figure 18:
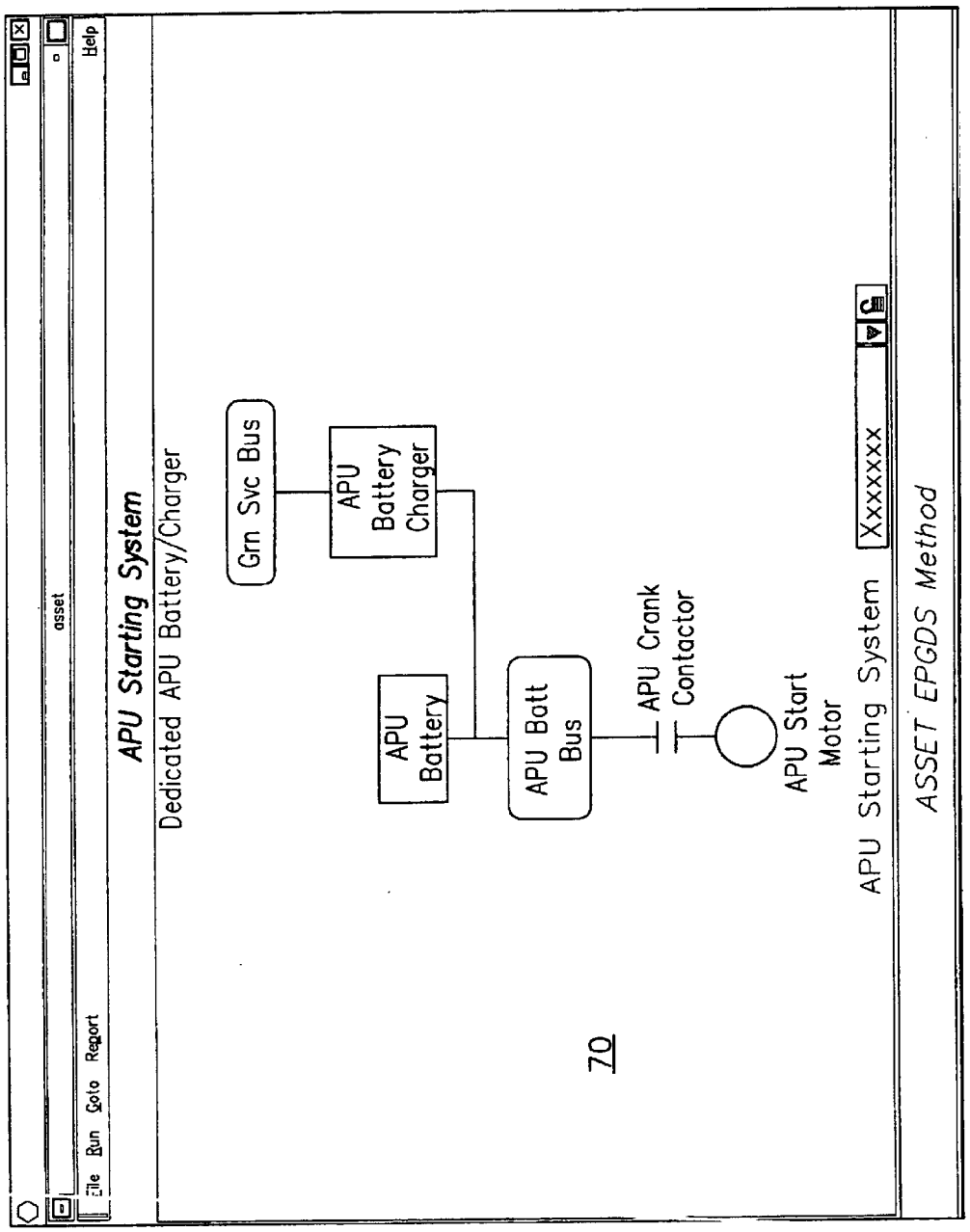
FIG. 18 illustrates the APU Starting System screen.
Figure 19:
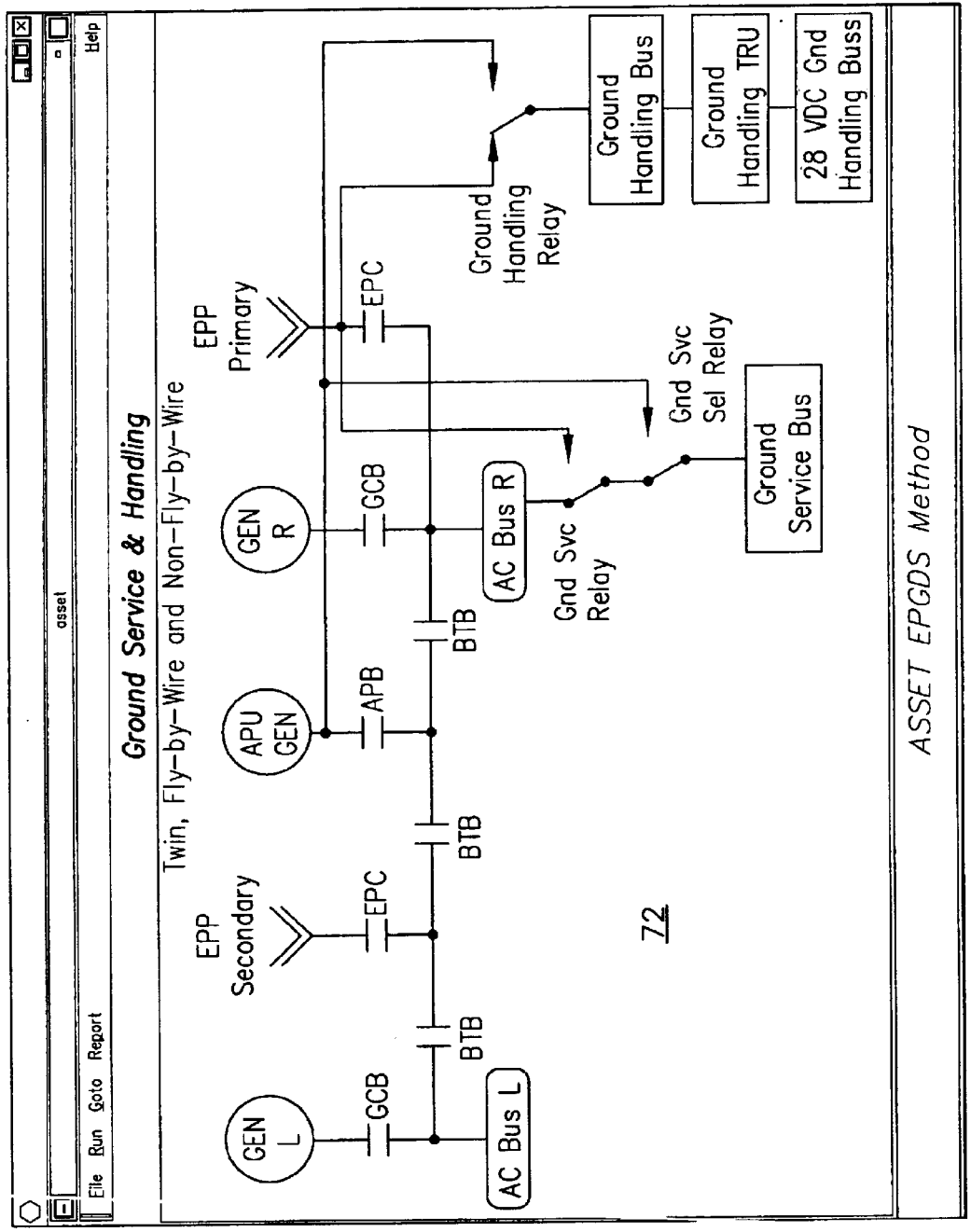
FIG. 19 illustrates the Ground Service & Handling screen.

The second selection, "DC/Standby System", is shown in FIG. 16, which forms a flow diagram 66 of the selected system (in this case a twin, fly-by-wire) system. FIG. 17 illustrates a system diagram 68 illustrating the determined "Flight Control DC" subsystem. FIG. 18 illustrates the "APU Starting System" diagram 70 and FIG. 19 illustrates the "Ground Service & Handling" flow diagram 72.

Figure 20:
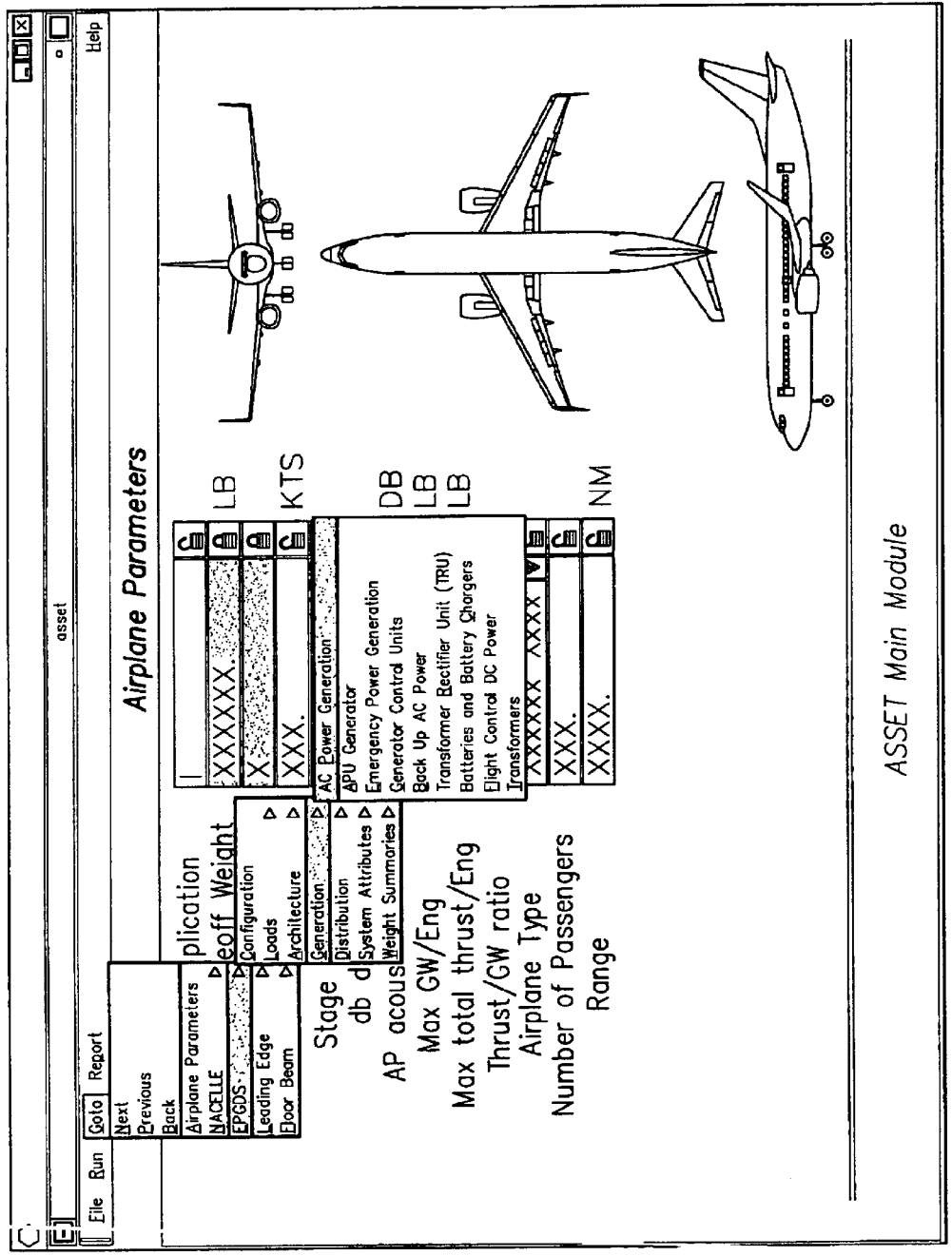
FIG. 20 illustrates the pull down menu associated with the Generation menu option.
Figure 21:
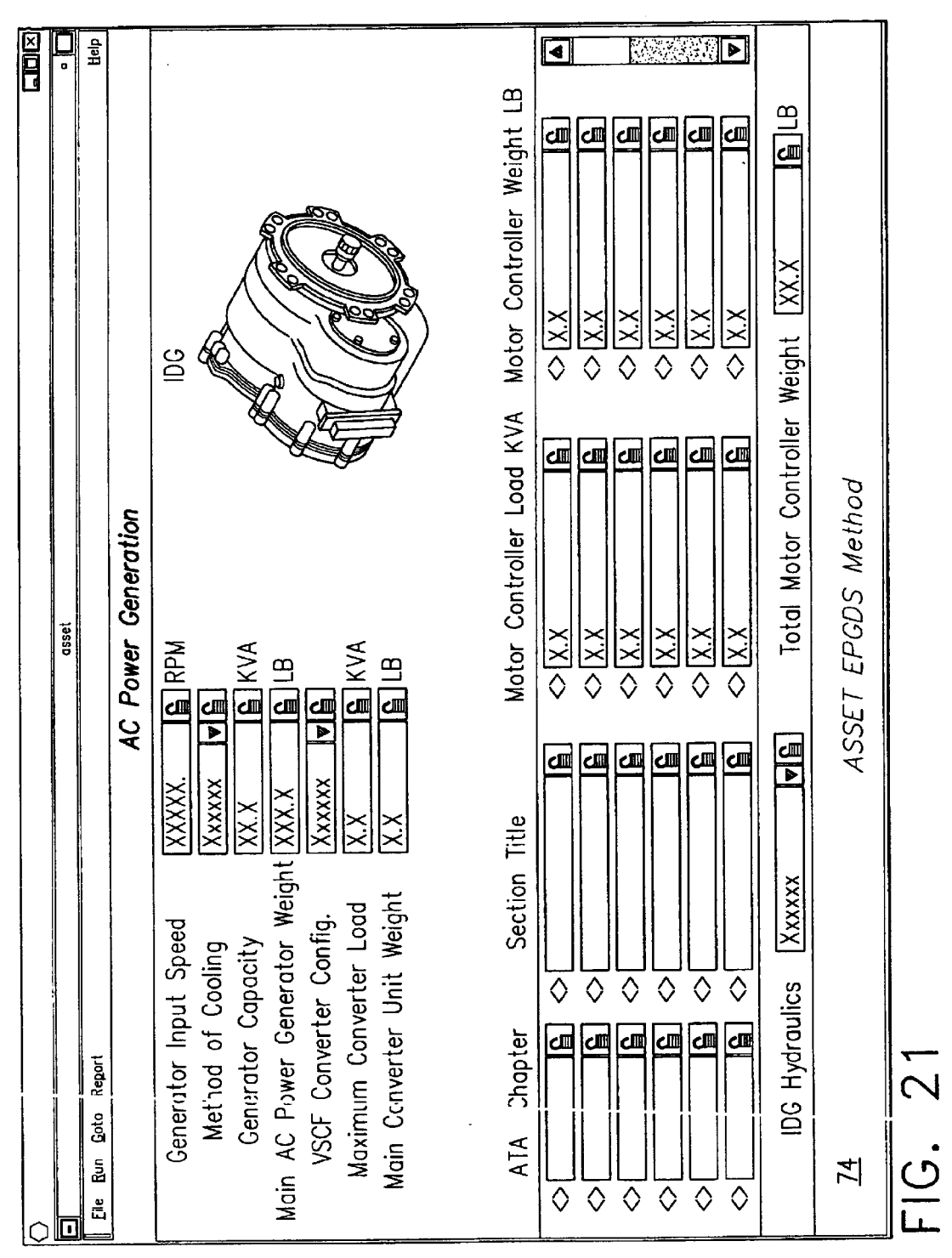
Figure 22:
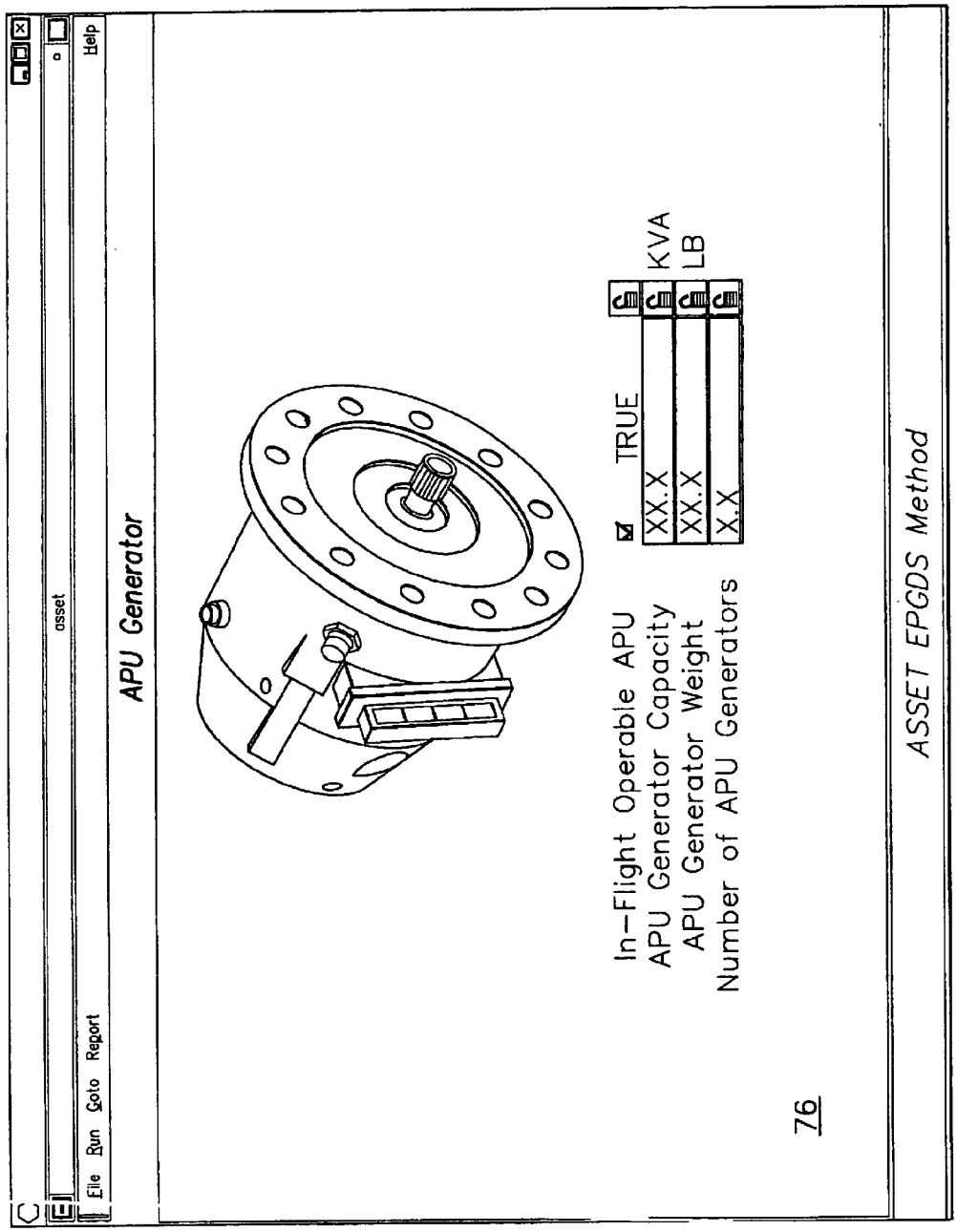
FIG. 22 illustrates the APU Generator screen.
Figure 23:
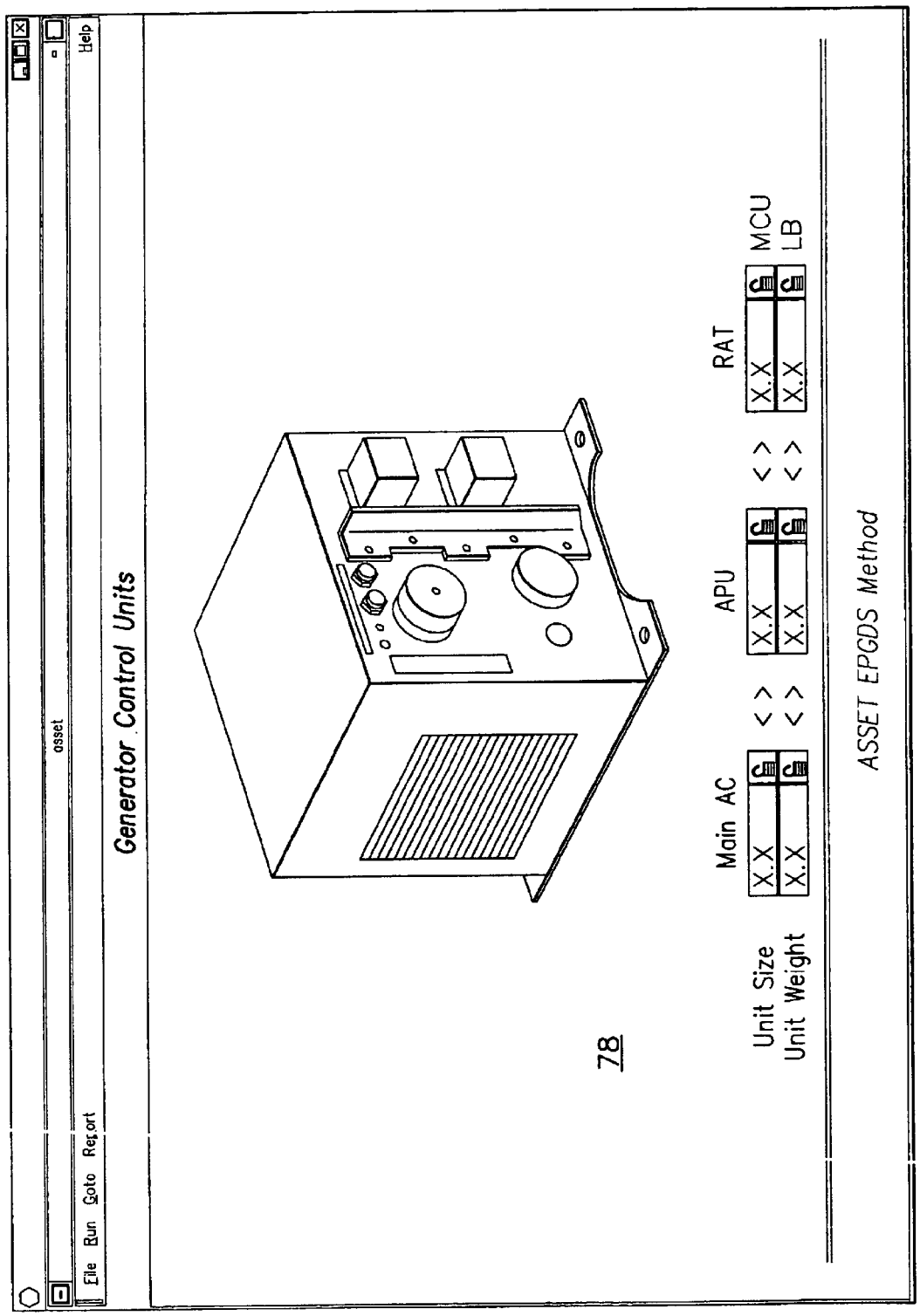
FIG. 23 illustrates the Generator Control Units screen.
Figure 24:
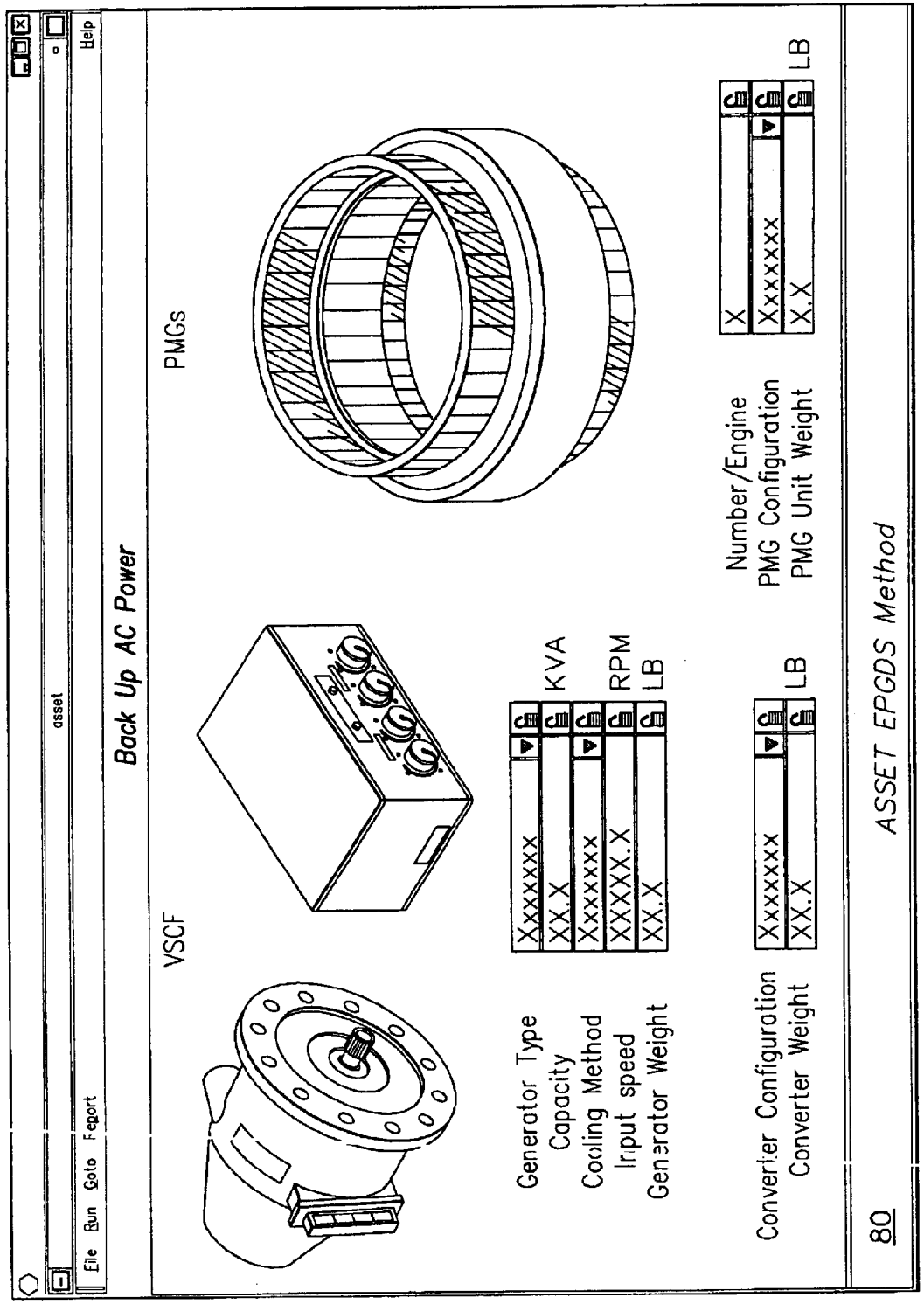
FIG. 24 illustrates the Back Up AC Power screen.
Figure 25:
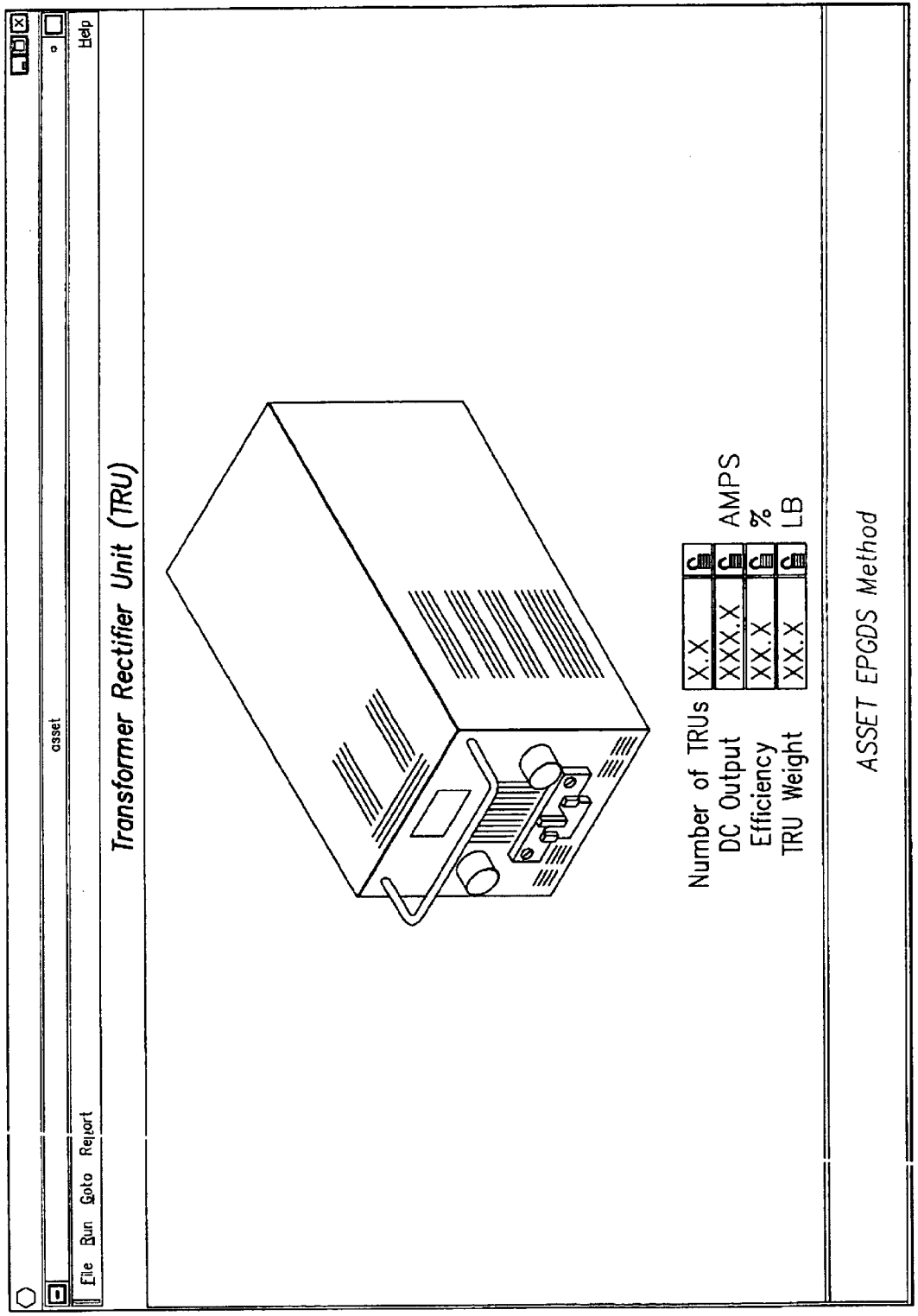
FIG. 25 illustrates the Transformer Rectifier Unit (TRU) screen.
Figure 26:
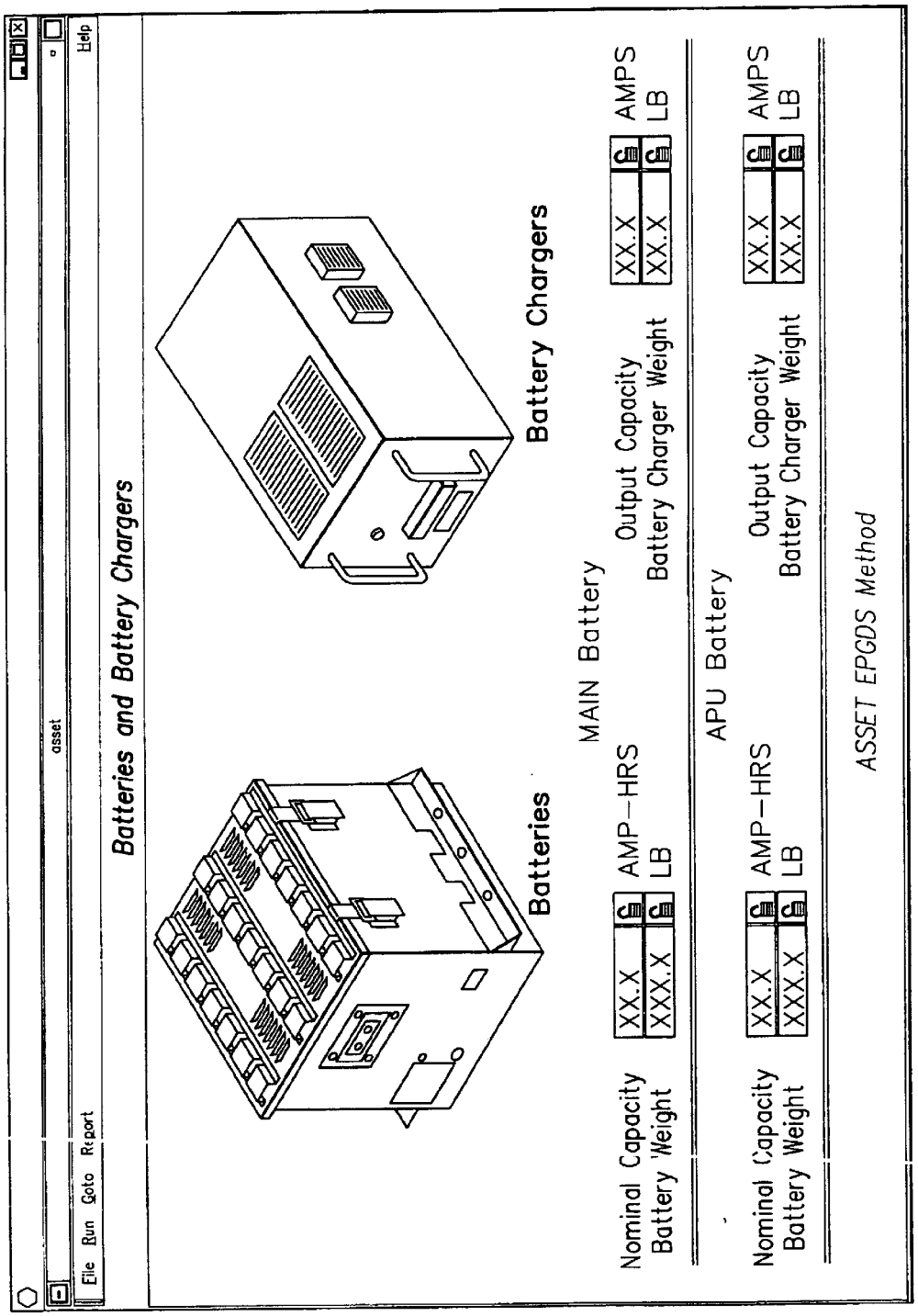
FIG. 26 illustrates the Batteries and Battery Chargers screen.
Figure 27:
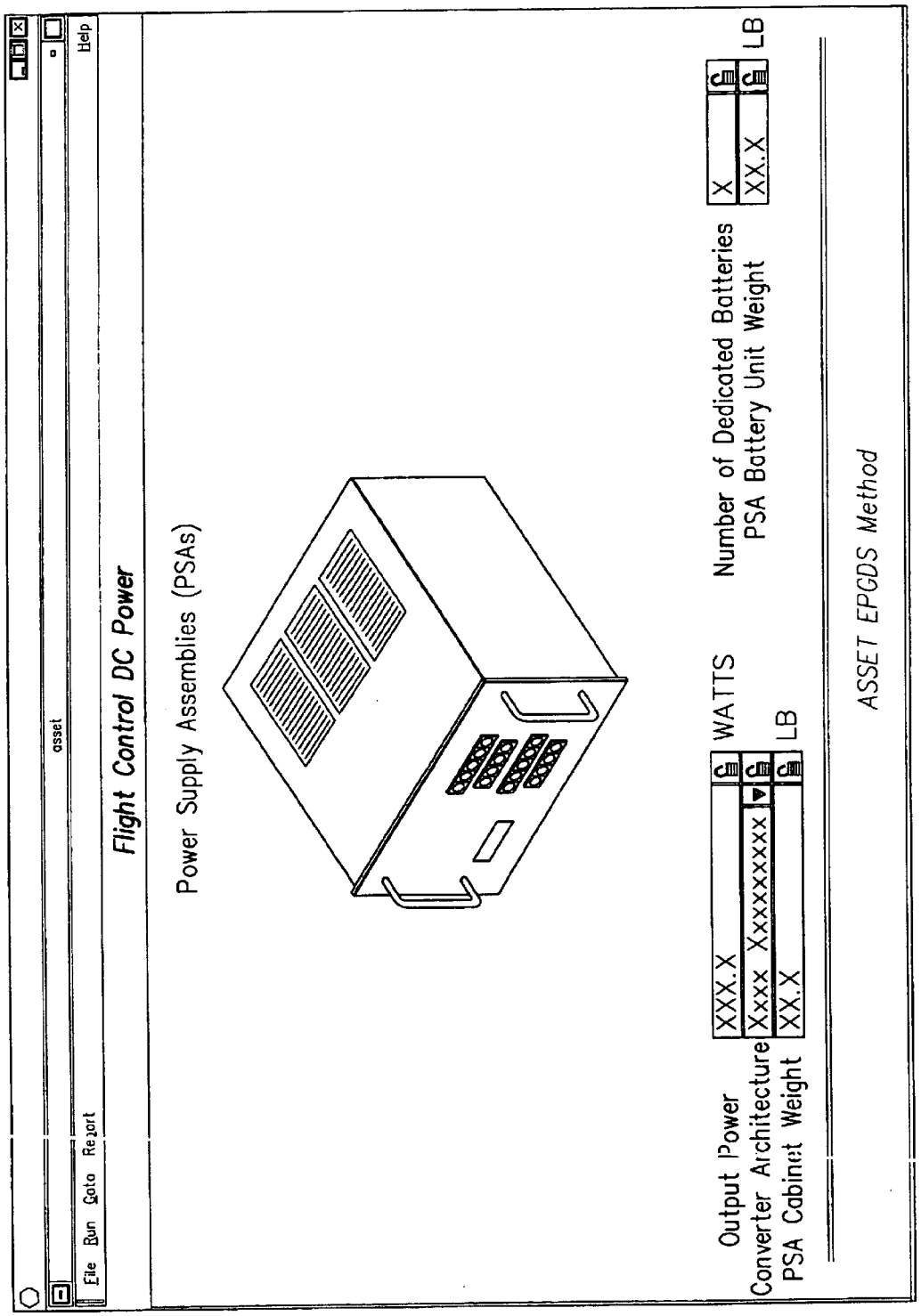
FIG. 27 illustrates the Flight Control DC Power screen.
Figure 28:
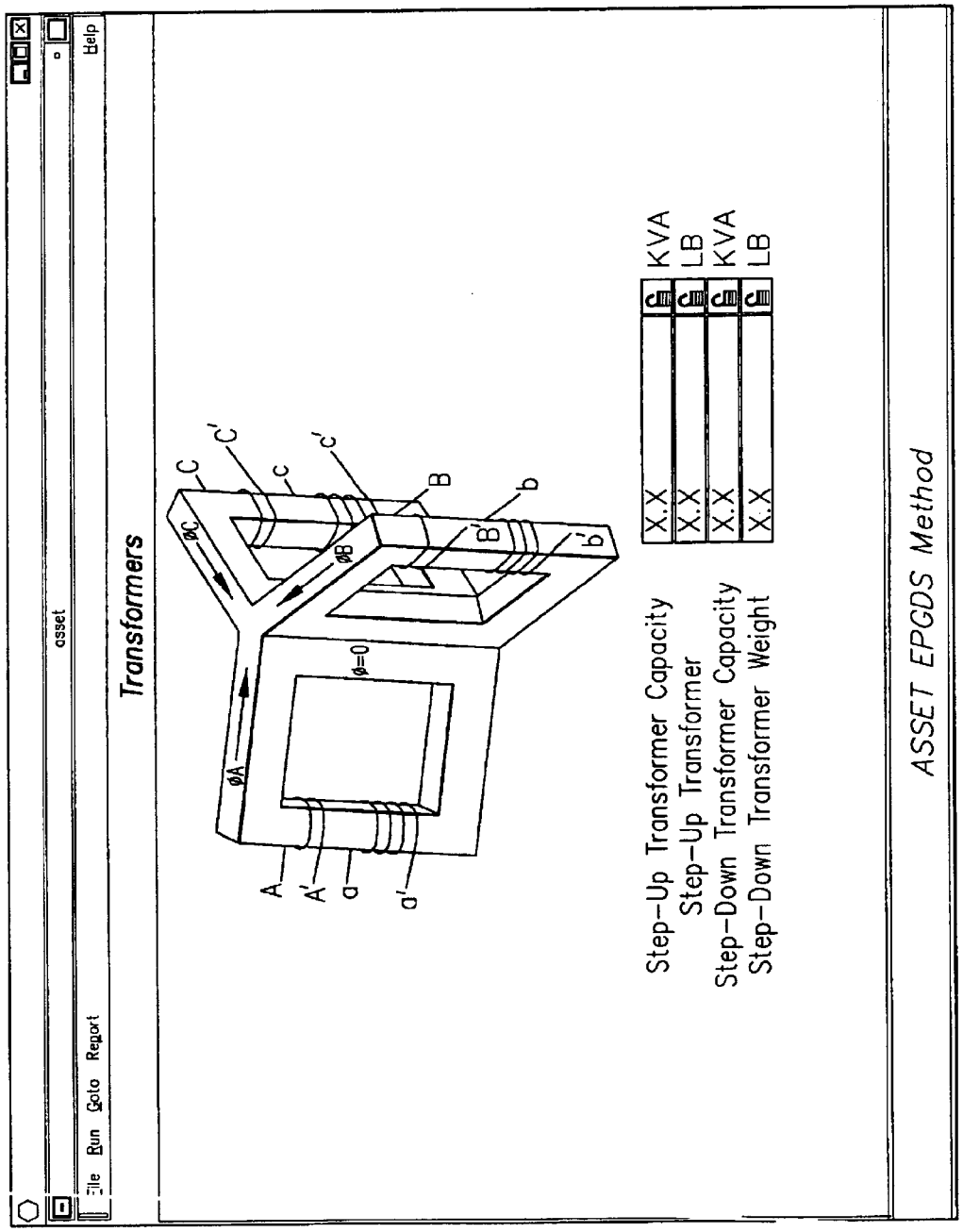
FIG. 28 illustrates the Transformers screen.

Referring now to FIG. 20, the "Generation" selection in the second pull down menu is shown as being selected, which produces nine submenu selections in a third pull down menu. The "AC Power Generation" selection has been chosen, and this screen 74 is shown in FIG. 21. Screen 74 provides a designer with various generator performance attributes, each of which may be modified and locked-in by the designer. Screen 76 (FIG. 22) illustrates the "APU Generator" screen which provides a designer with attributes of the auxiliary power unit (APU) required for the aircraft. FIG. 23 illustrates the "Generator Control Units" screen 78 giving attributes of the calculated generator control unit. FIG. 24 illustrates the "Back Up AC Power" screen 80 giving the designer the attributes of a variable speed constant frequency (VSCF) system, standalone converter, and permanent magnet generator (PMG). FIGS. 26–28 provide the screens associated with the "Batteries And Battery Chargers", "Flight Control DC Power" and "Transformers".

Figure 29:
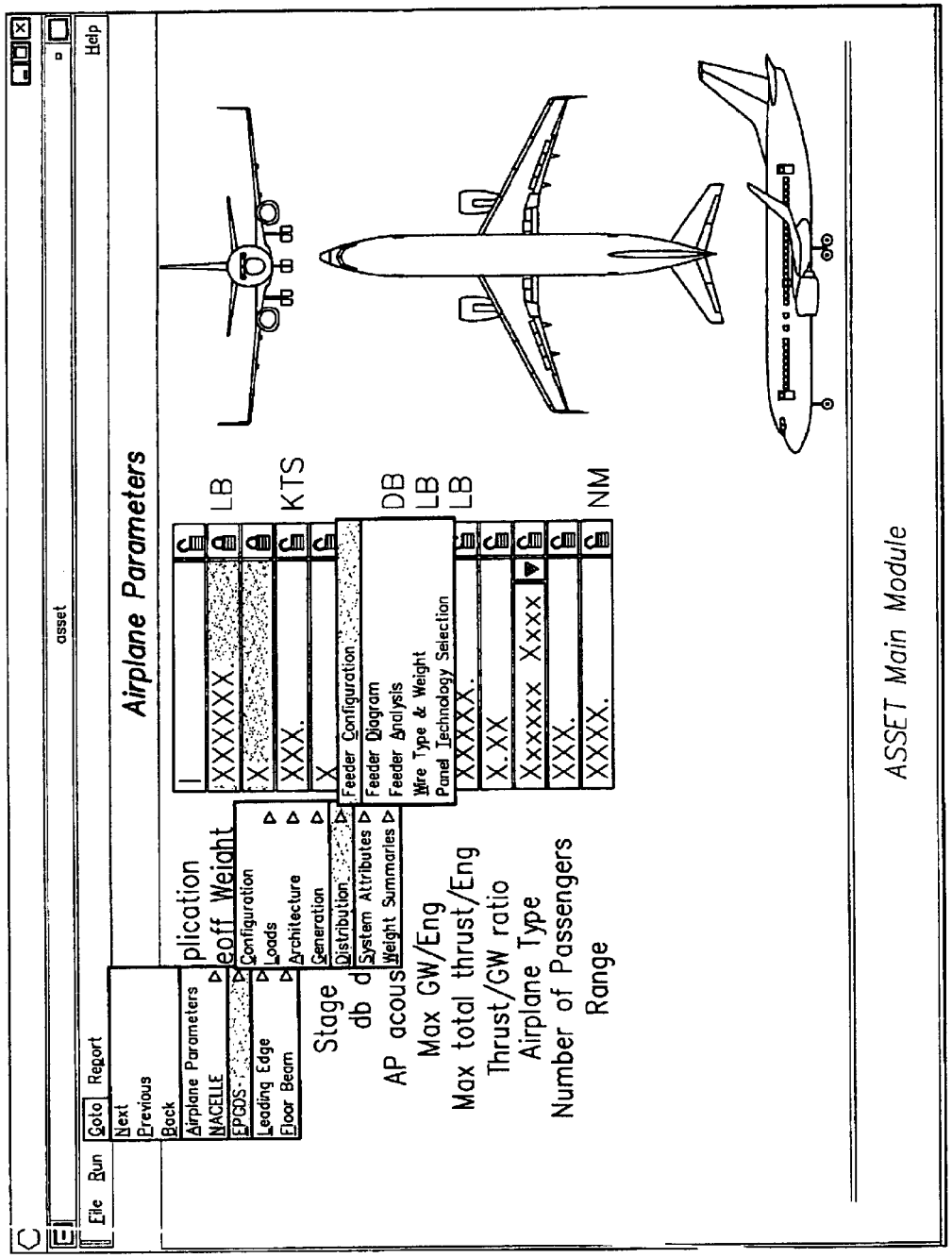
FIG. 29 illustrates the pull down menu associated with the Distribution menu option.
Figure 30:
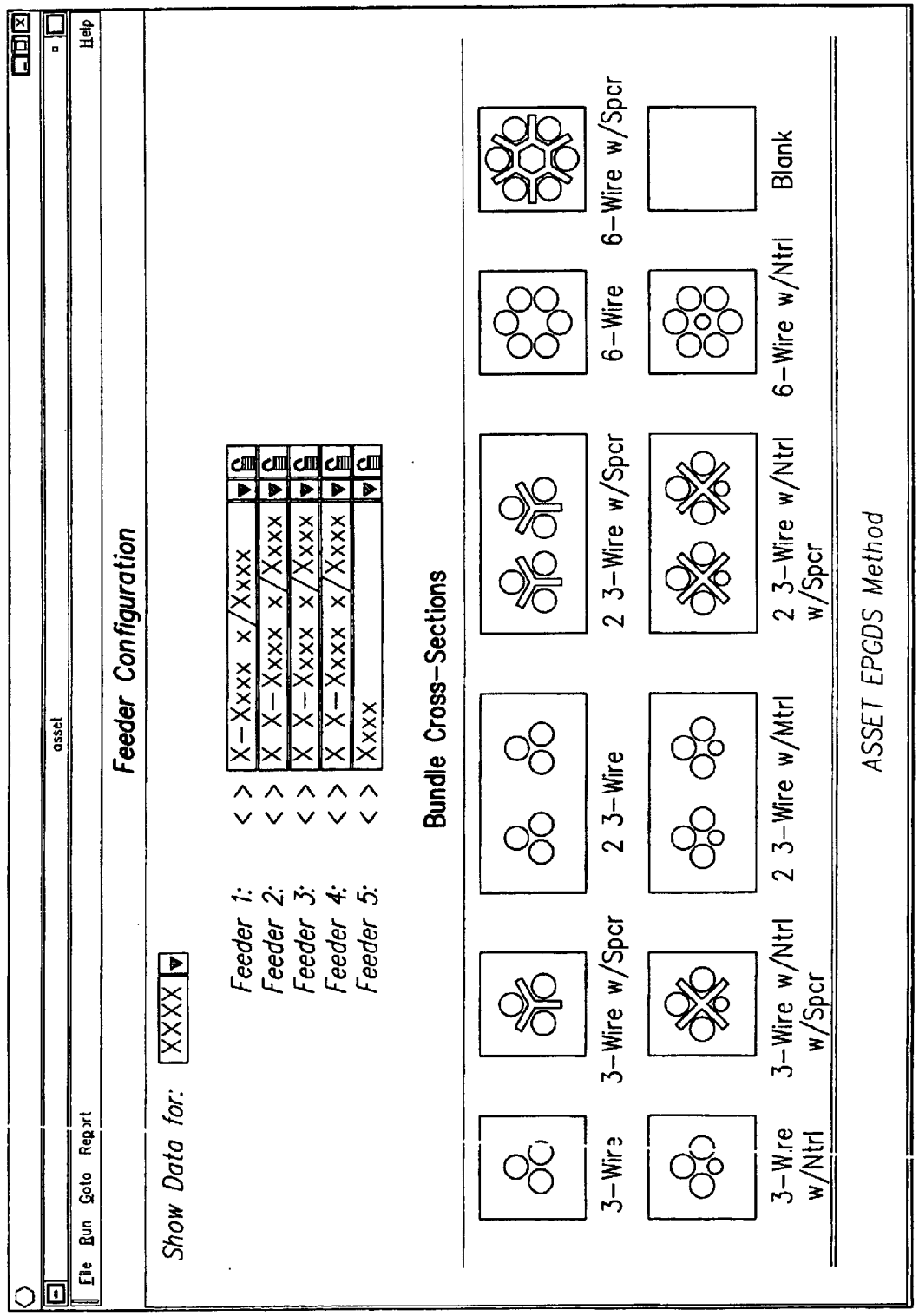
FIG. 30 illustrates the Feeder Configuration screen.
Figure 31:
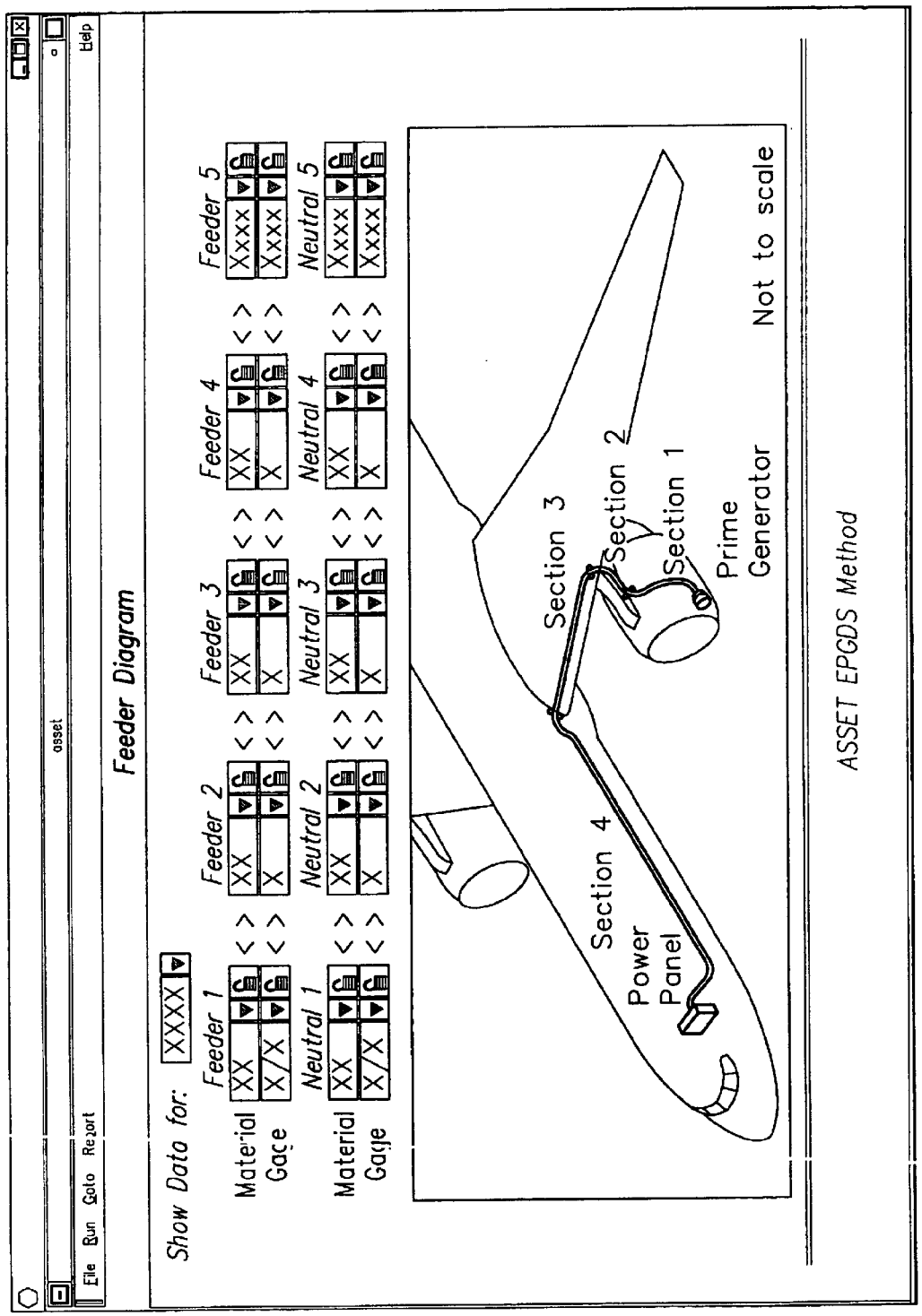
FIG. 31 illustrates the Feeder Diagram screen.
Figure 32:
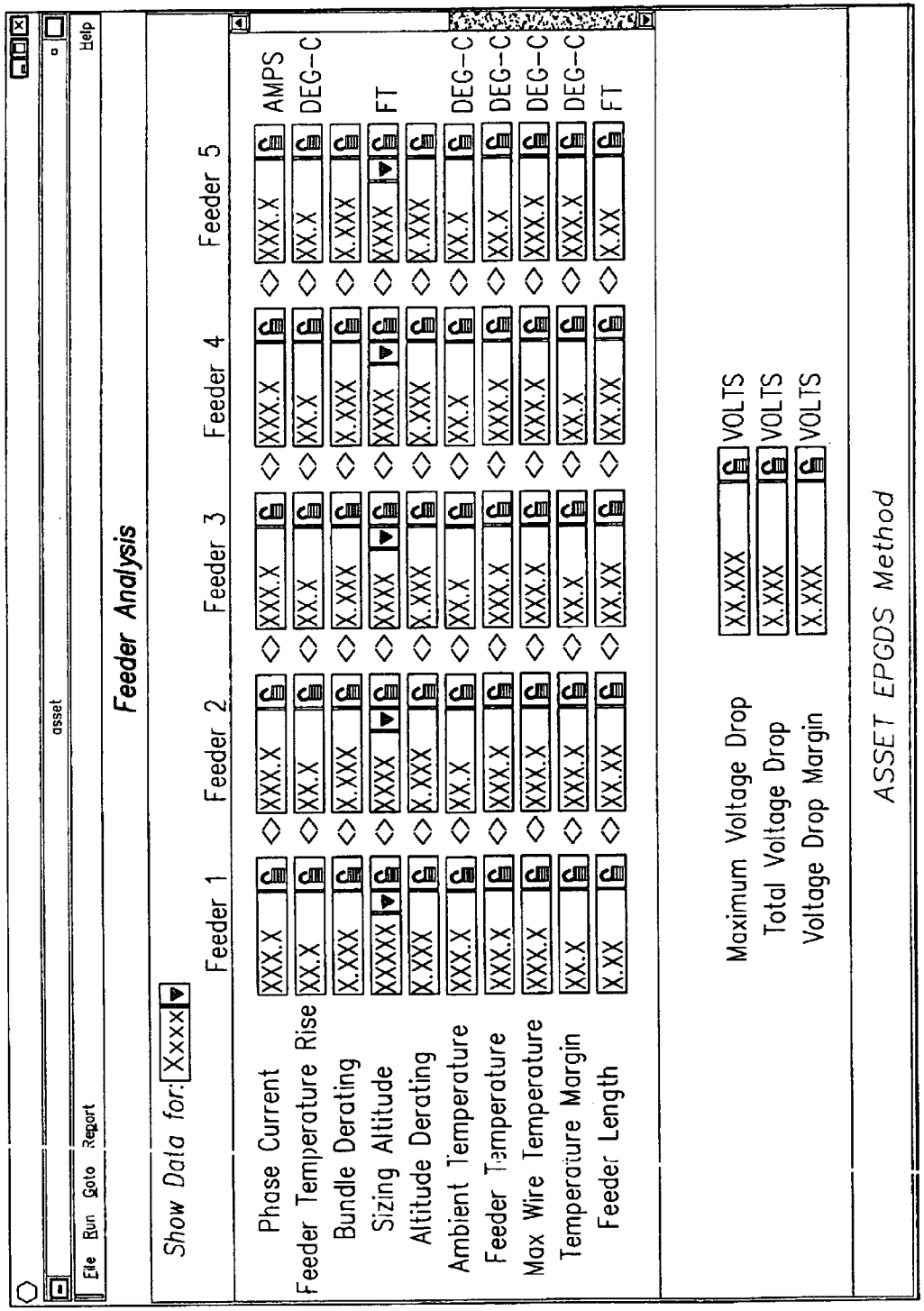
FIG. 32 illustrates the Feeder Analysis screen.
Figure 34:
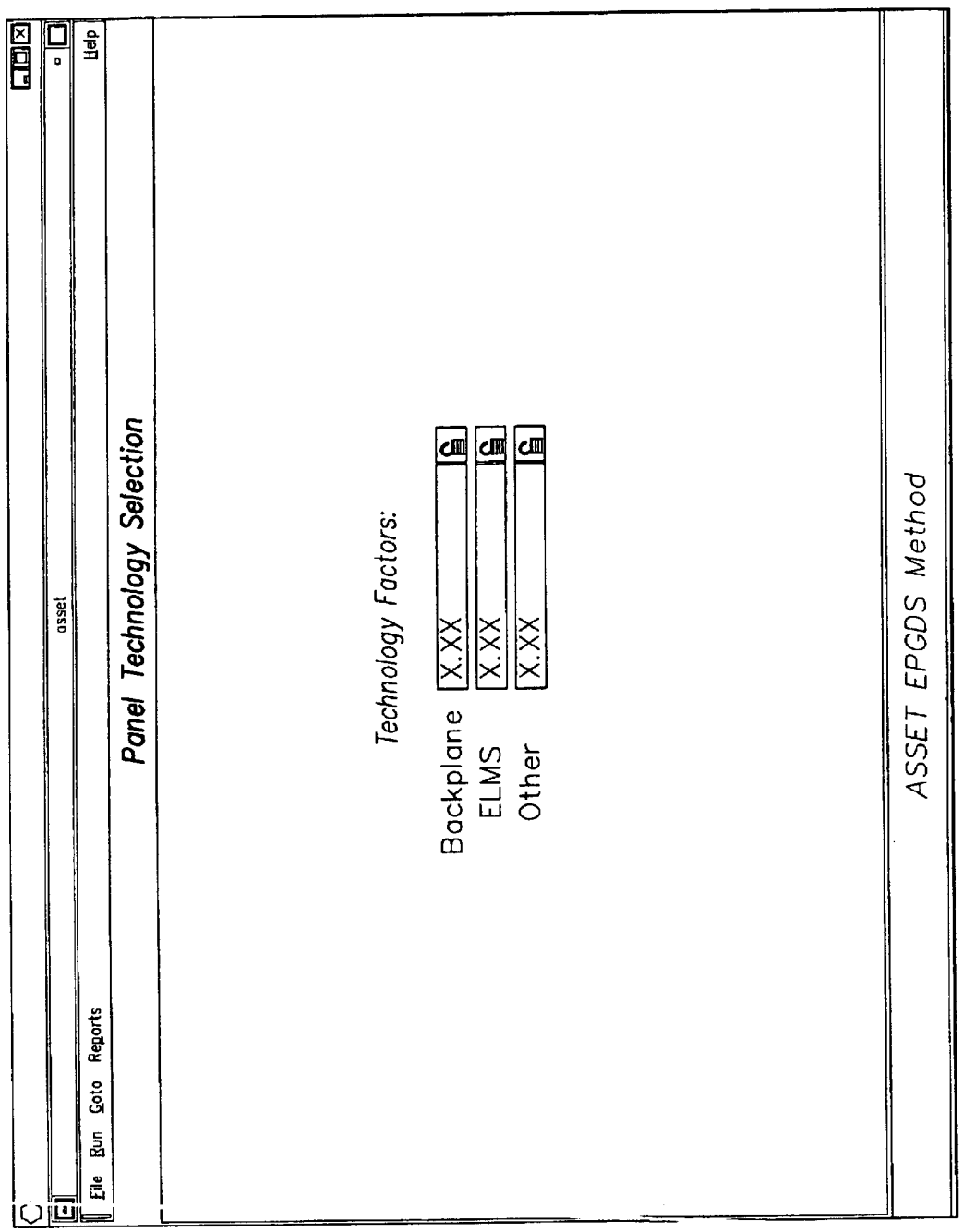
FIG. 34 illustrates the Panel Technology Selection screen.

Referring now to FIG. 29, the "Distribution" menu selection in the second pull down menu is shown as being selected. This selection provides the designer with five subscreens illustrated in FIGS. 30–34 relating to the main power feeder configuration calculated for the aircraft. FIG. 30 provides the designer with eleven system 10 bundle configurations or the option to have none. FIG. 31 provides the designer with the system 10 selected feeder materials, and the designer has the option to modify the selected materials and/or gages to select either copper, aluminum or "none", and to lock-in his/her selection. FIG. 31 also provides the designer with the system 10 selected feeder gages, and the designer has the option to modify the selected gages and to select either 4/0, 3/0, 2/0, 1/0, 1, 2, 4, 8 or "none", and to lock-in his/her selection. FIG. 34 provides the designer with panel technology factors relating to the "Backplane", "ELMS" and "Other". By changing the technology factor, the weight of the technology under consideration is directly changed from current best practice.

Figure 35:
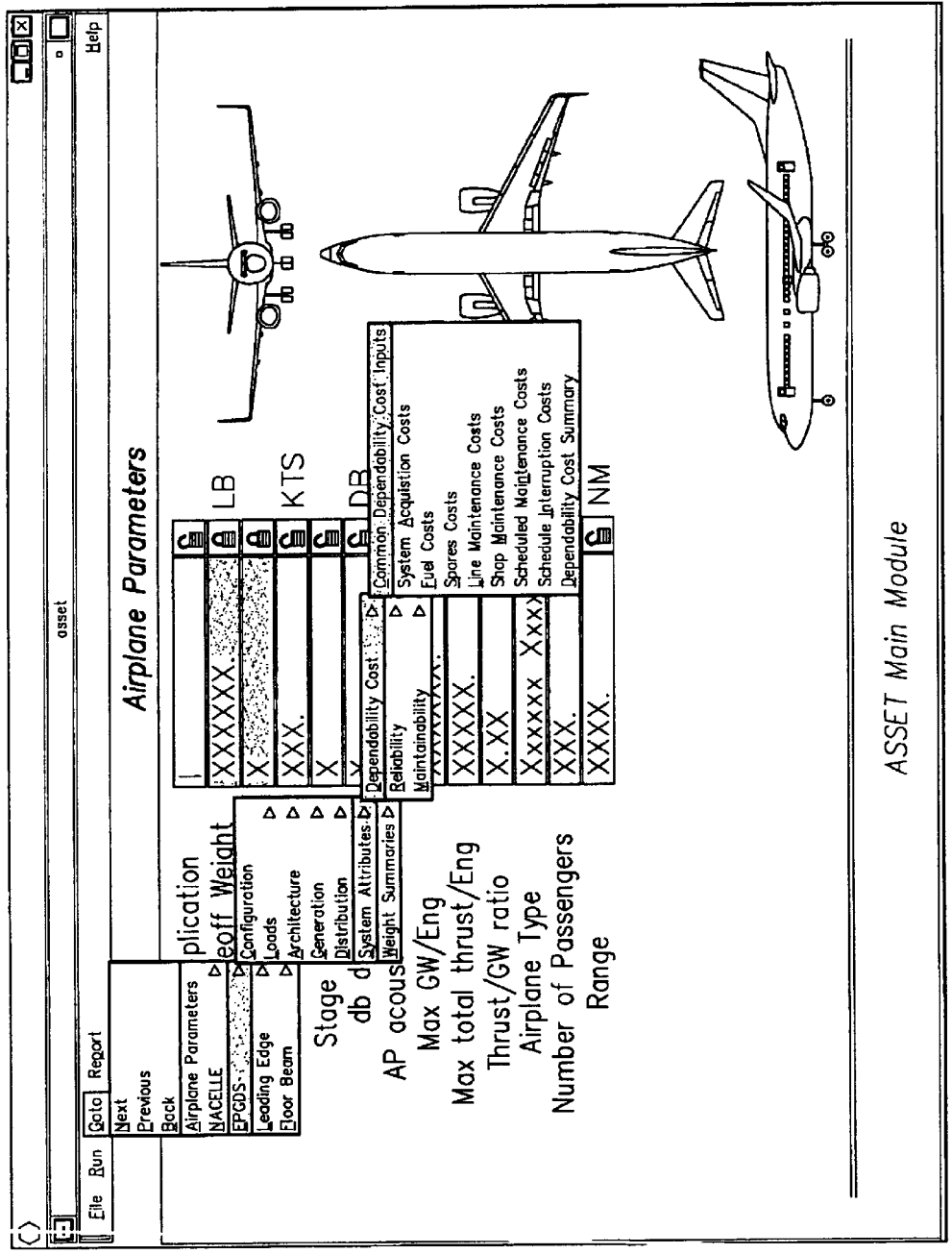
FIG. 35 illustrates the pull down menu associated with the Dependability Cost menu option.
Figure 37:
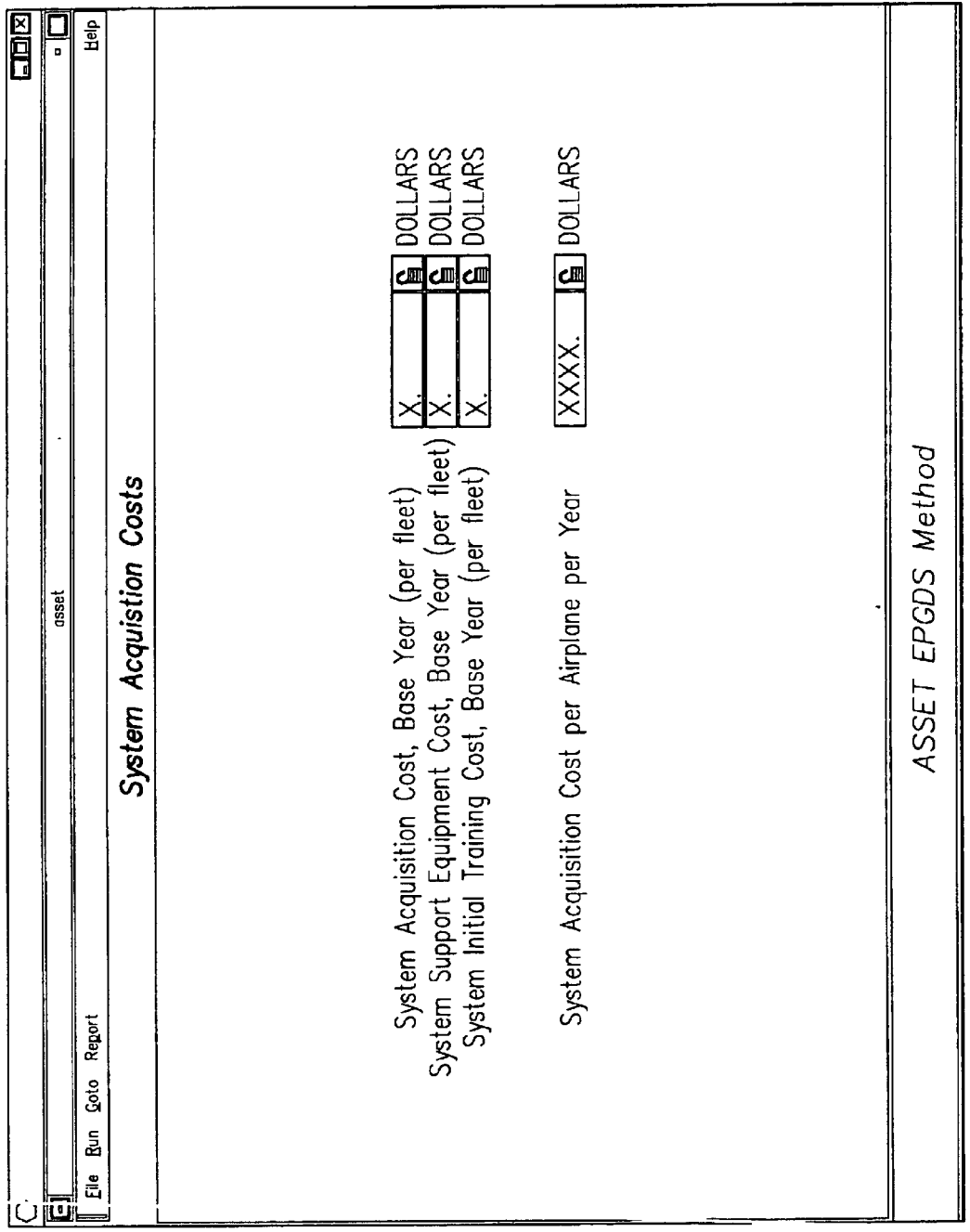
FIG. 37 illustrates the System Acquisition Costs screen.
Figure 44:
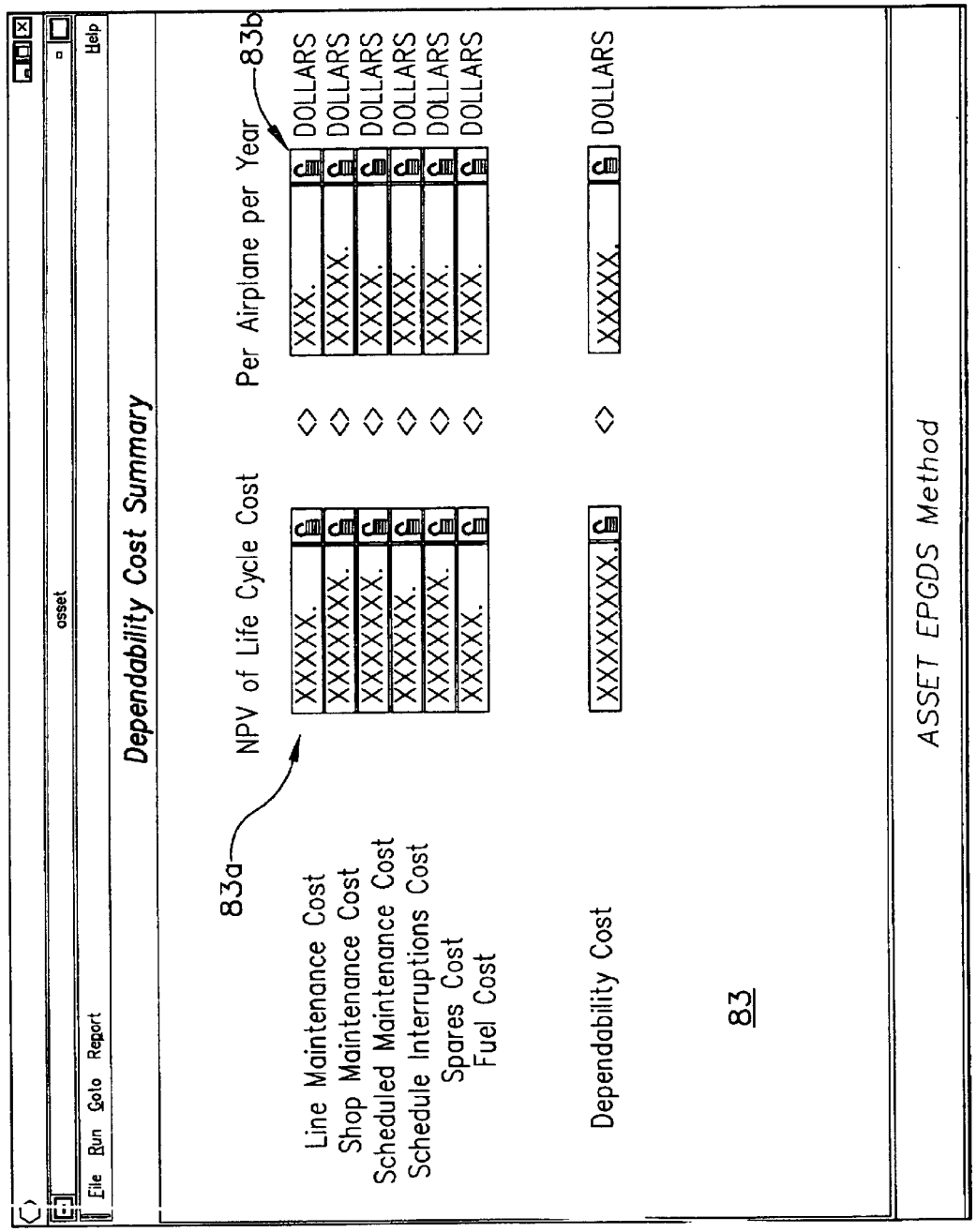
FIG. 44 illustrates the Dependability Cost Summary screen.

Referring now to FIG. 35, the "System Attributes" selection in the second pull down menu is shown as being selected, which produces a third pull down menu providing the menu selections of "Dependability Cost", "Reliability" and "Maintainability". FIGS. 36–44 illustrate the screens associated with the nine selections in the fourth pull down menu of FIG. 35. The dependability information provided in these screens is highly useful to the designer in allowing the designer to determine a wide range of dependability attributes of various LRUs of the aircraft, as well as a wide range of costs associated with operating the aircraft. The Fuel Costs Screen (FIG. 38) provides fields for variables associated with the cost of operating the generators on the aircraft. The Spares Costs screen (FIG. 39) provides fields for variables associated with the cost of maintaining adequate spare generators. The Line Maintenance Costs screen (FIG. 40) provides fields for variables associated with the cost of maintenance on the line due to main generator failure. The Shop Maintenance Costs Screen (FIG. 41) provides fields for variables associated with the cost of maintenance in the shop due to main generator failure. The Scheduled Maintenance Costs screen (FIG. 42) provides fields for variables associated with the costs of scheduled maintenance on the generators. The Schedule Interruption Costs screen (FIG. 43) provides fields for variables associated with the cost of delays, cancellations, turnbacks and diversion of the airplane caused by generator failure. The Dependability Cost Summary Screen 83 (FIG. 44) provides the costs per fleet of 25 airplanes (column 83a) for thirty years, while the right column (column 83b) provides the cost per airplane per year. The "Dependability Cost" fields represent the sums of all the various components of dependability cost to operate the generators. "Dependability Cost" is an independent system attribute for "weight", a major driver, and therefore is a good trade study discriminating element between candidate systems.

Figure 45:
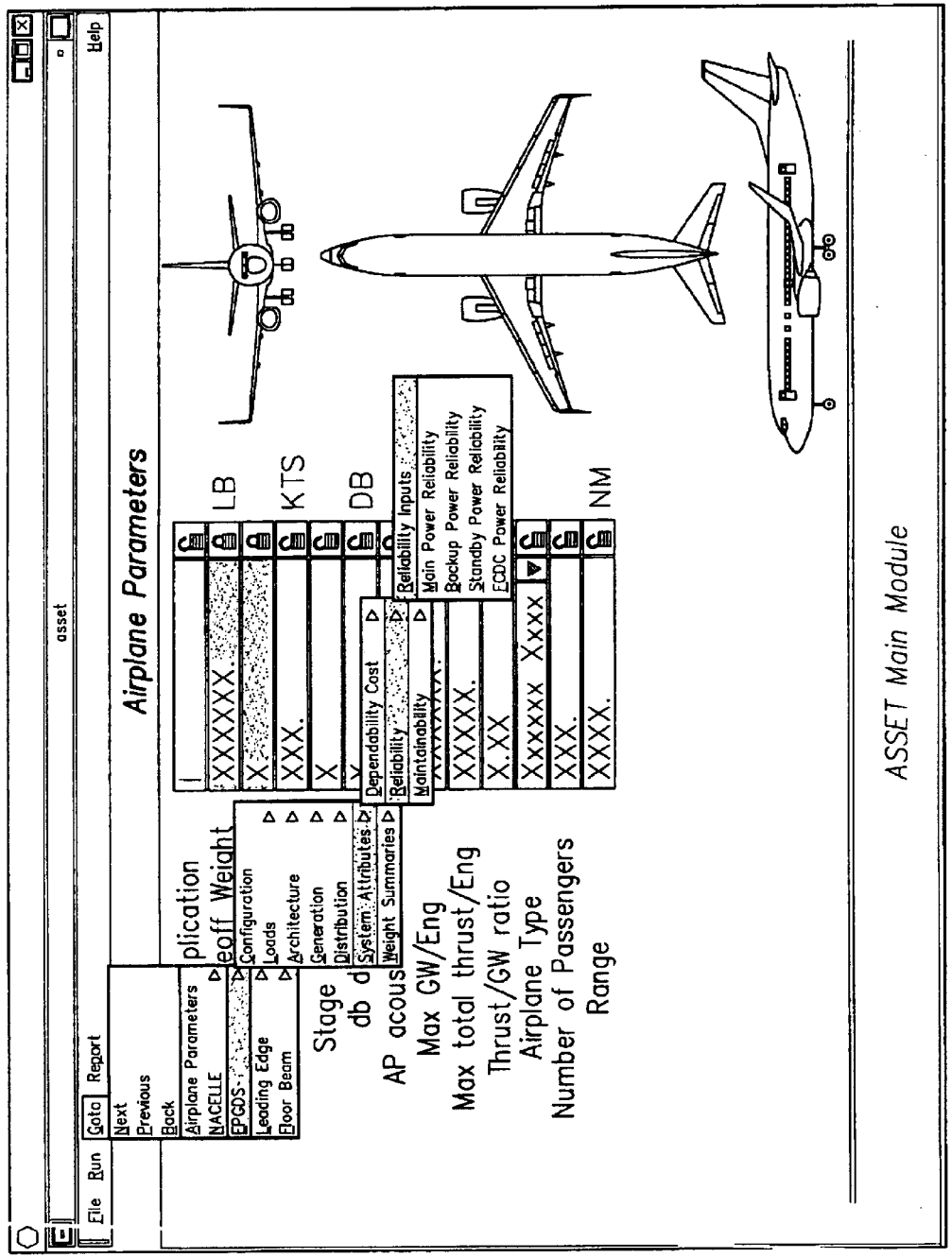
FIG. 45 illustrates the pull down menu associated with the Reliability menu option.
Figure 46:
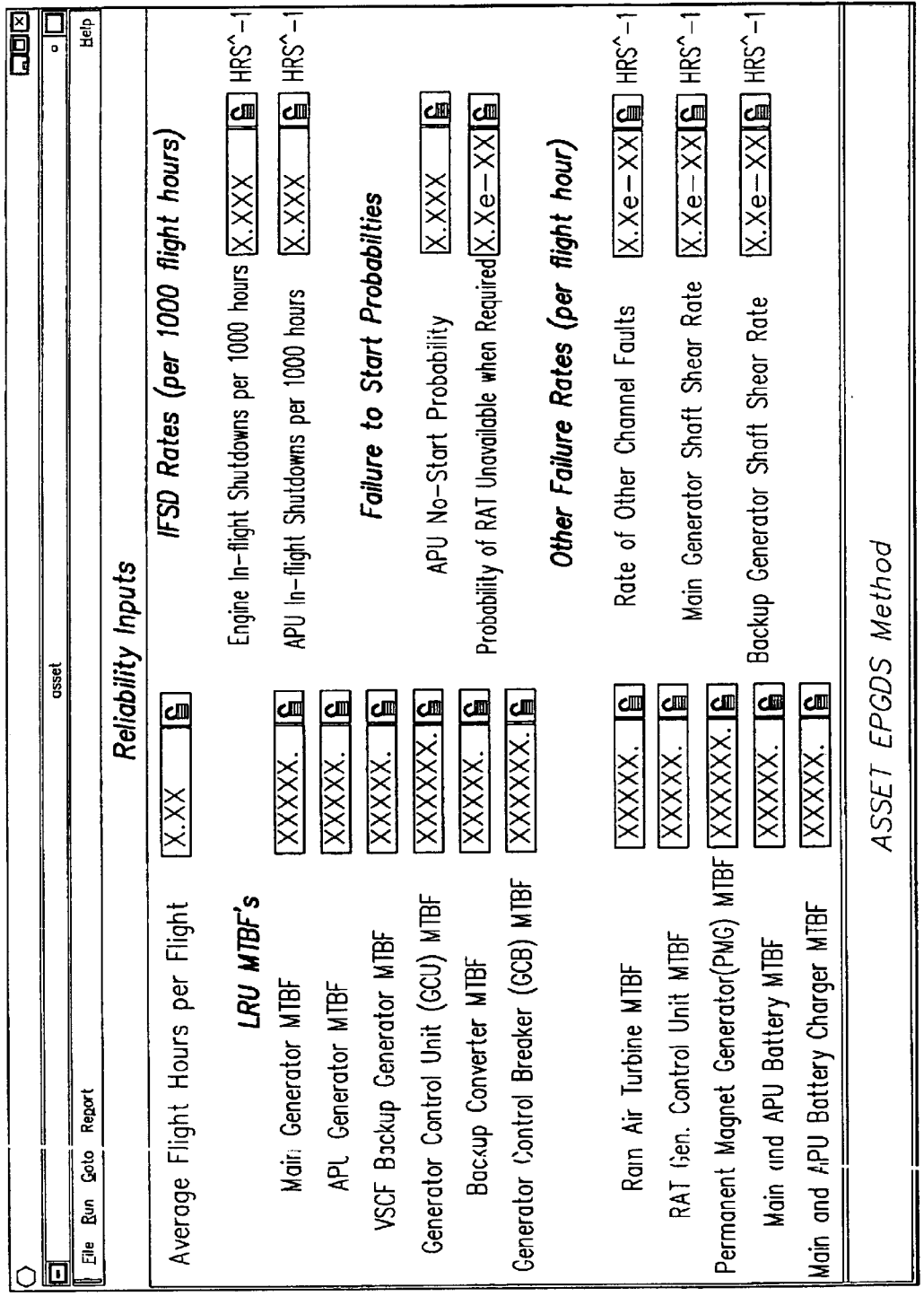
FIG. 46 illustrates the Reliability Inputs screen.

Referring now to FIG. 45, the "Reliability" selection in the third pull down menu is shown as being selected, which produces a fourth pull down menu having the selections "Reliability Inputs", "Main Power Reliability", "Backup Power Reliability", "Standby Power Reliability" and "FCDC Power Reliability". The screens associated with these menu options are shown in FIGS. 46–50, respectively. FIG. 46 provides a designer with a plurality of calculated reliability values for various LRUs of the aircraft. As with other screens, the designer can choose to lock-in one or more of these values, and subsequent upstream calculations will not modify the locked-in value.

Figure 47:
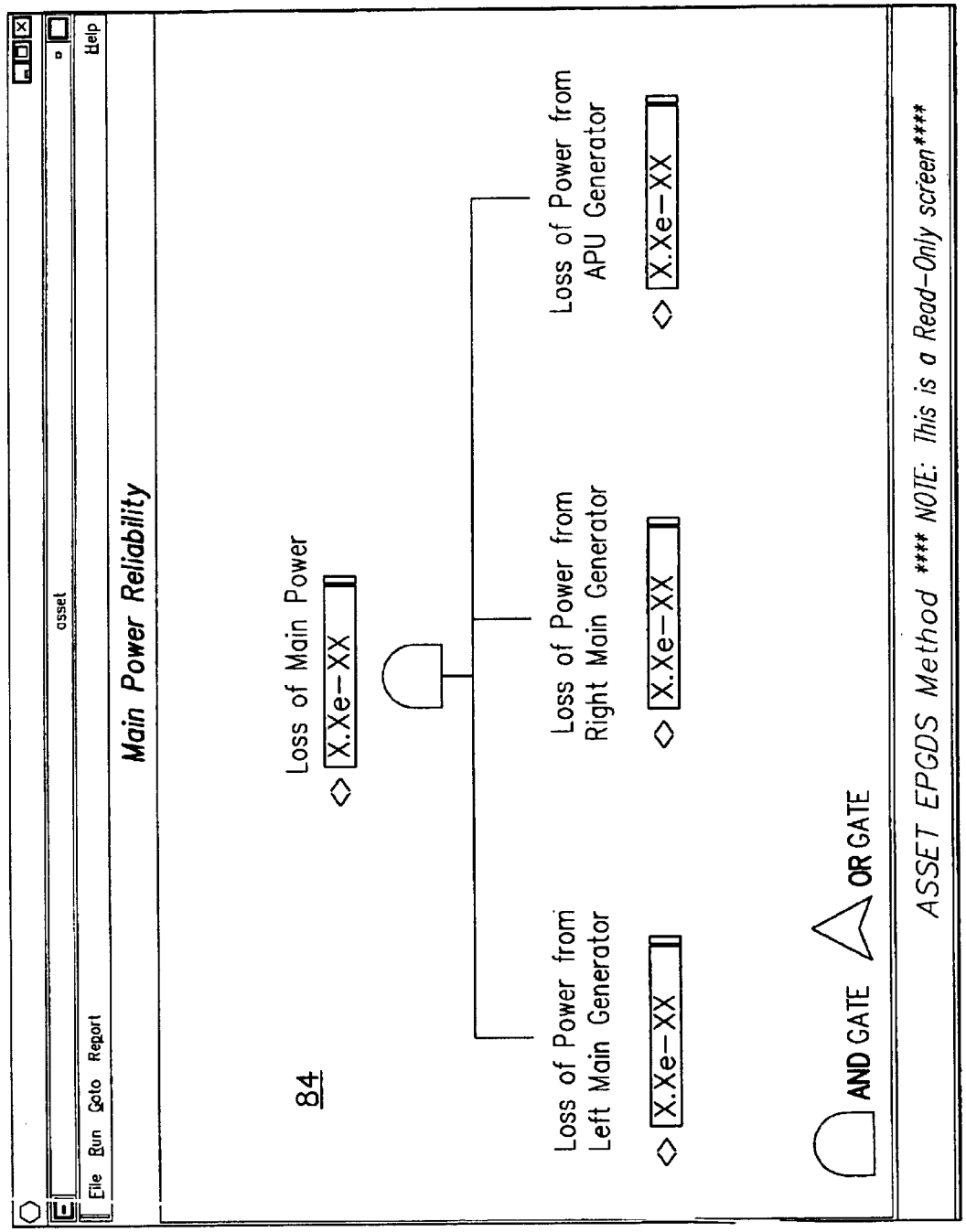
FIG. 47 illustrates the Main Power Reliability screen.
Figure 48:
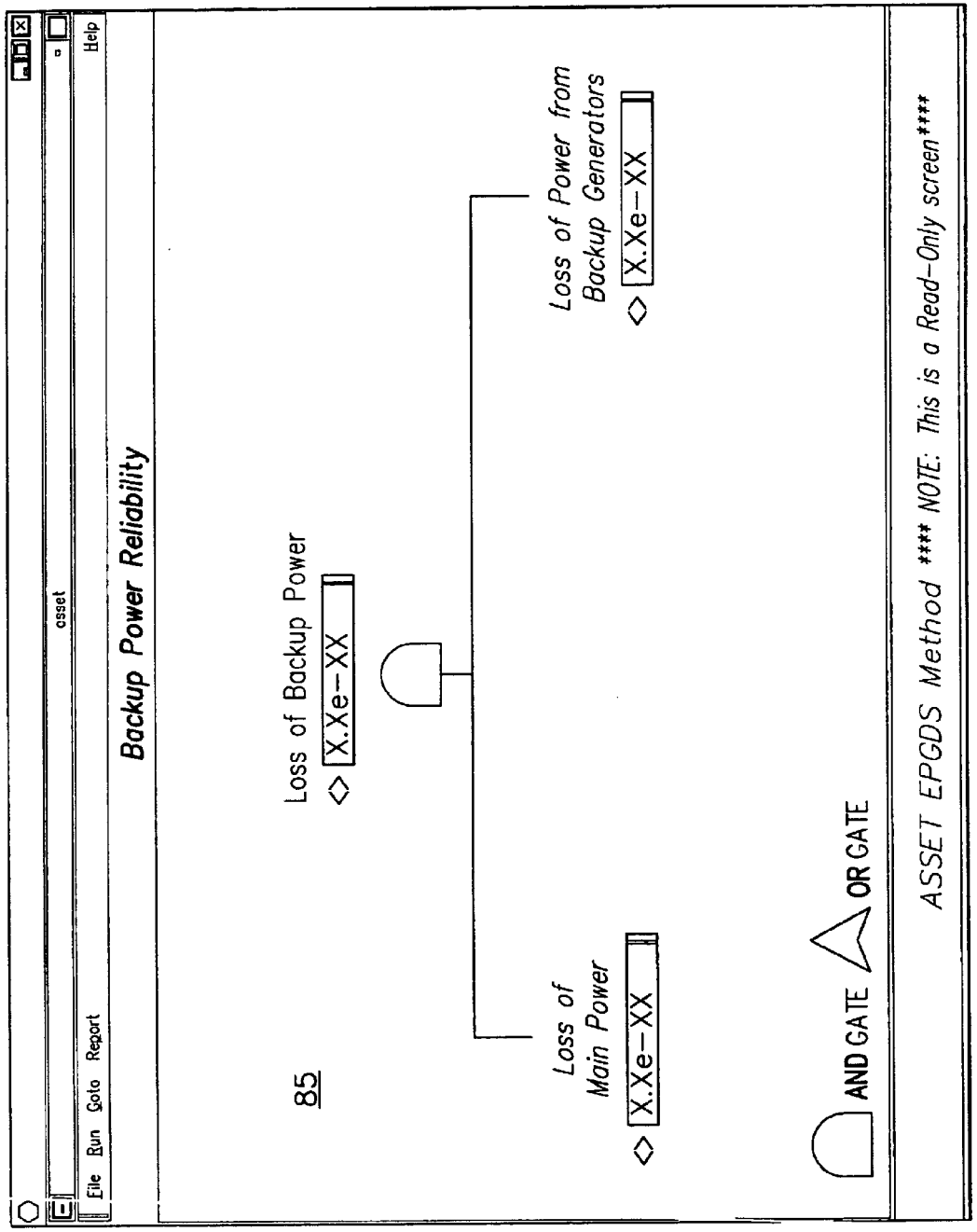
FIG. 48 illustrates the Backup Power Reliability screen.

FIG. 47 illustrates the "Main Power Reliability" screen 84 which displays calculated probabilities for the loss of main power, as well as the loss of power from the left main generator, right main generator and APU generator. FIG. 48 illustrates the "Backup Power Reliability" screen 85 which displays probabilities for the loss of backup power, main power, and the probability of loss of power from the backup generators.

Figure 49:
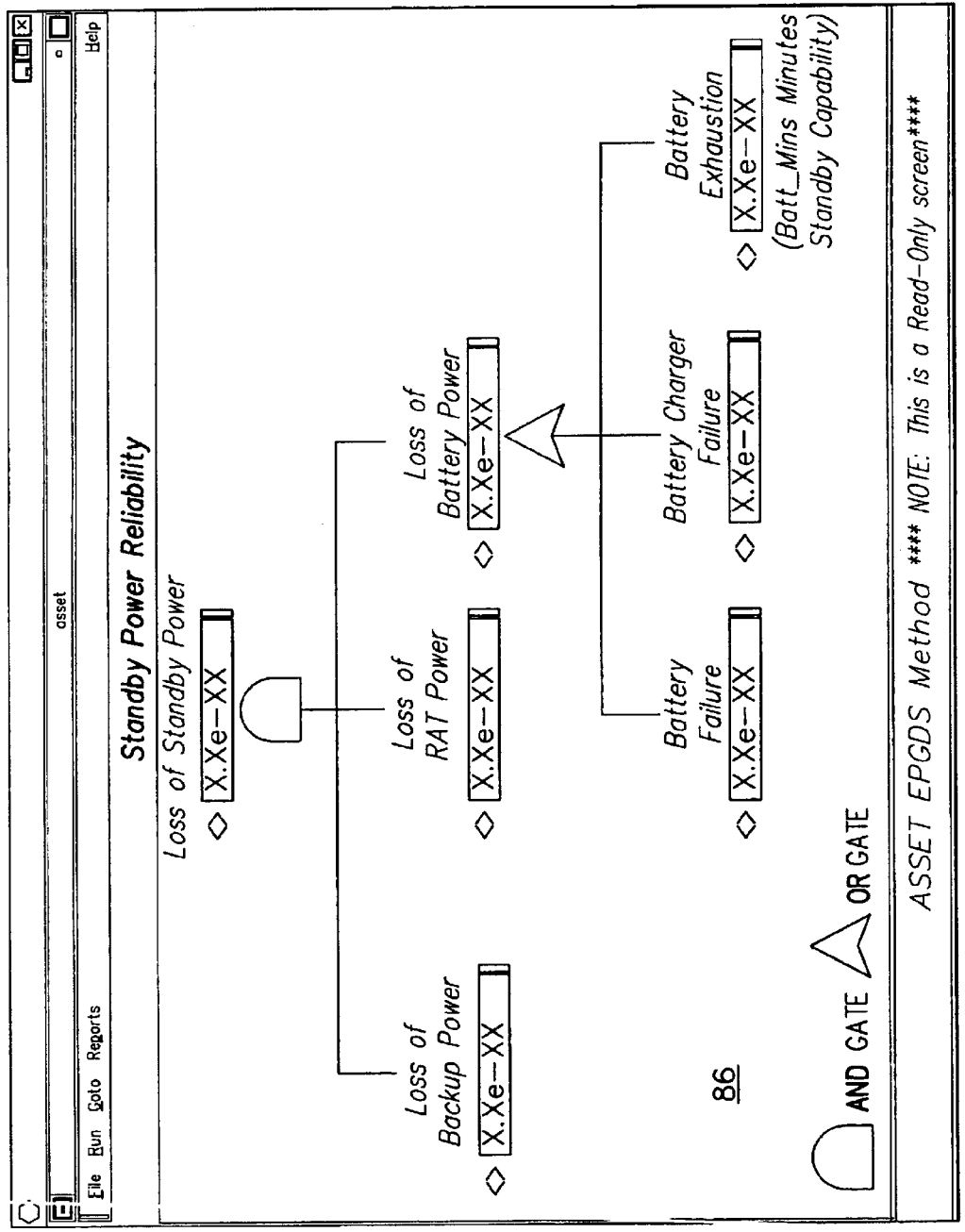
FIG. 49 illustrates the Standby Power Reliability screen.
Figure 50:
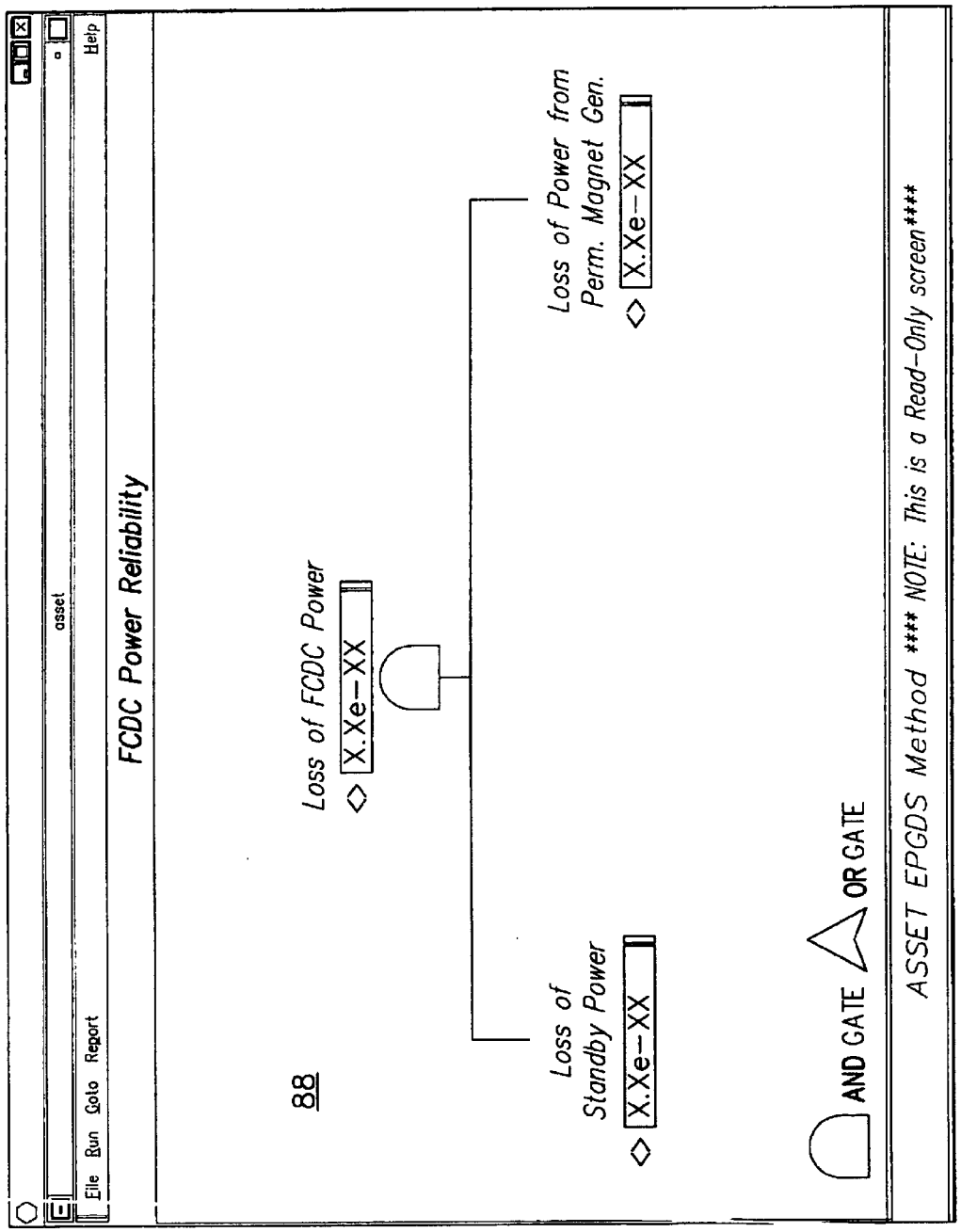
FIG. 50 illustrates the FCDC Power Reliability screen.

FIG. 49 illustrates the "Standby Power Reliability" screen 86 showing the calculations made by the system 10 relating to the probability of a loss of "Standby Power", as well as probabilities of the loss of "Backup Power", loss of "RAT power" (Ram Air Turbine), loss of "Battery Power", as well as the probability of failure of battery components of the aircraft. FIG. 50 shows the "FCDC Power Reliability" screen 88 which provides the designer with the probability of the loss of all flight control DC power as well as the loss of "standby power" and the loss of power from the permanent magnet generator of the aircraft.

Figure 51:
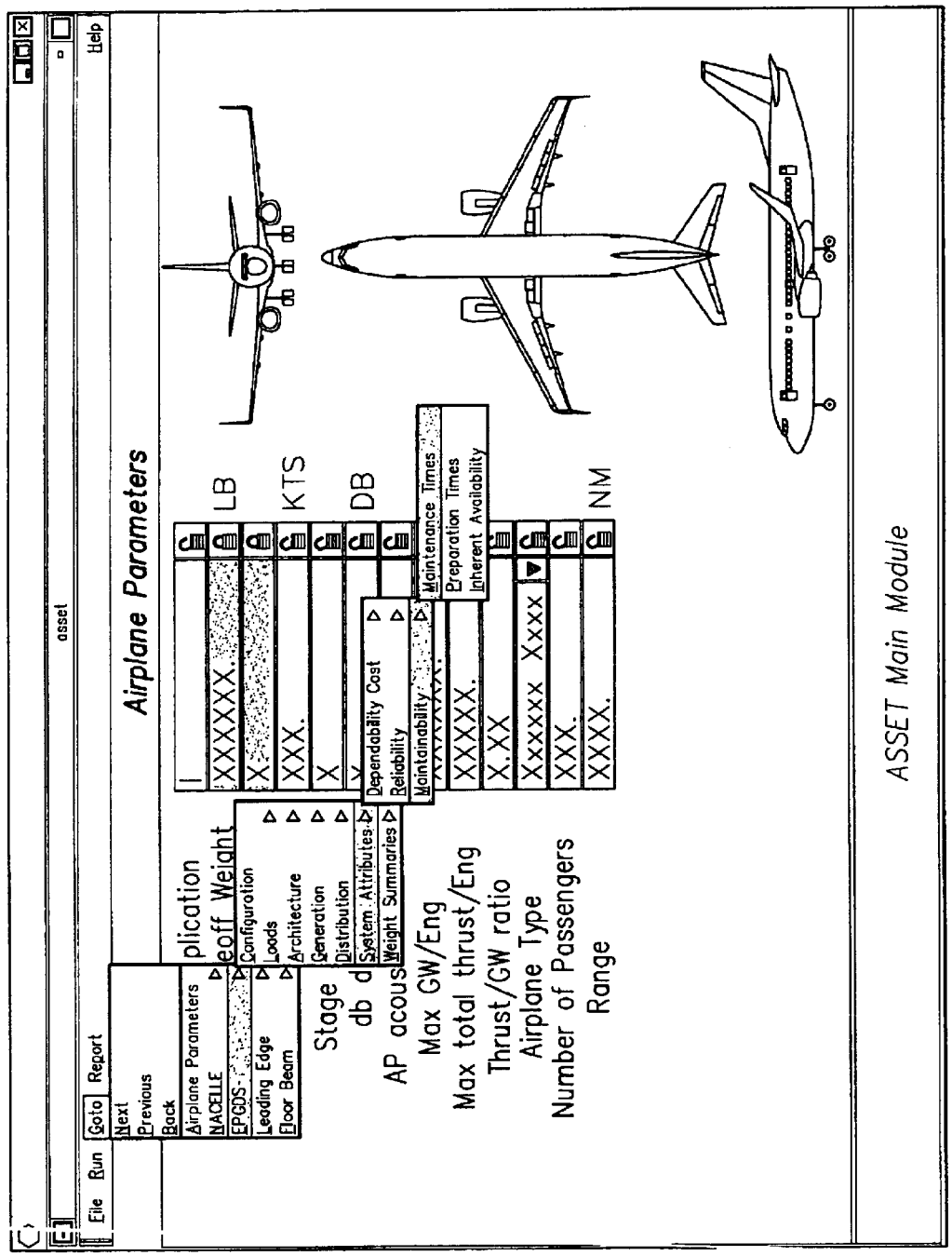
FIG. 51 illustrates the pull down menu associated with the Maintainability option.

Referring to FIG. 51, the third menu selection, "Maintainability" in the third pull down menu is shown as being selected. This selection produces a fourth pull down menu with the selections "Maintenance Times", "Preparation Times" and "Inherent Availability". The "Maintainability" module of the system 10 essentially calculates inherent availability (IA) for the main generator system of the aircraft. FIG. 52 illustrates the "Maintenance Times" screen 90. This screen provides the user with the information that the system 10 has calculated relating to the mean corrective time (MCT) for unscheduled removals, servicing, alignment and adjustment of various power system components of the aircraft. It also includes a plurality of maintenance corrective time inputs for each type of maintenance required to be performed, as well as sums those inputs to arrive at an MCT for each type of maintenance needed. Finally, this module requires the input of each maintenance frequency by the designer. As with other screens, these values can be changed and/or locked-in by the designer.

Figure 53:
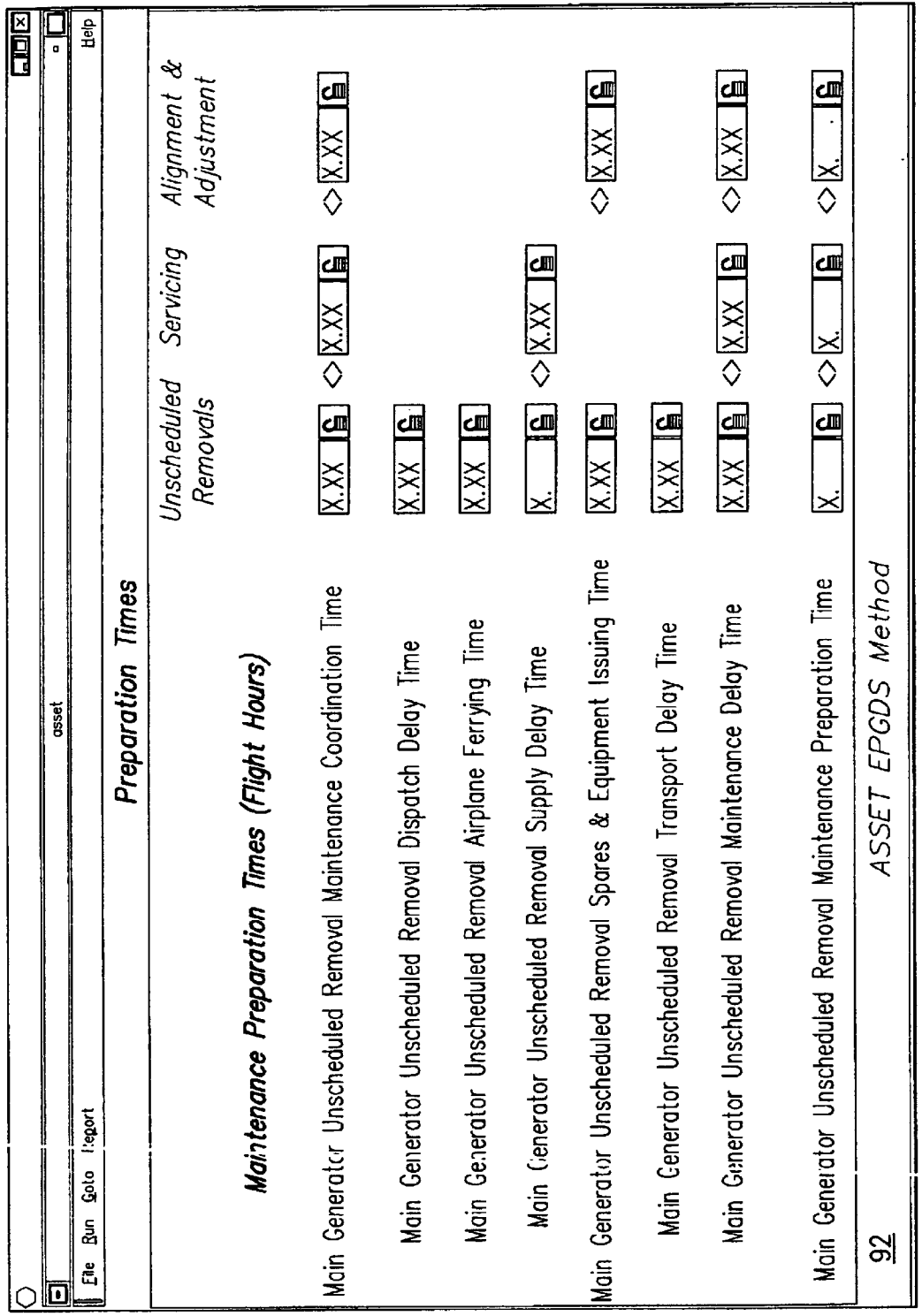
FIG. 53 illustrates Preparation Times screen.

FIG. 53 illustrates the "Preparation Times" screen 92. This screen presents information calculated by the system 10 relating to the mean-preparation-time (MPT) for unscheduled removals, servicing, alignment and adjustment. It also includes several maintenance preparation time inputs for each type of maintenance and sums those inputs to arrive at a MPT for each type of maintenance.

Figure 54:
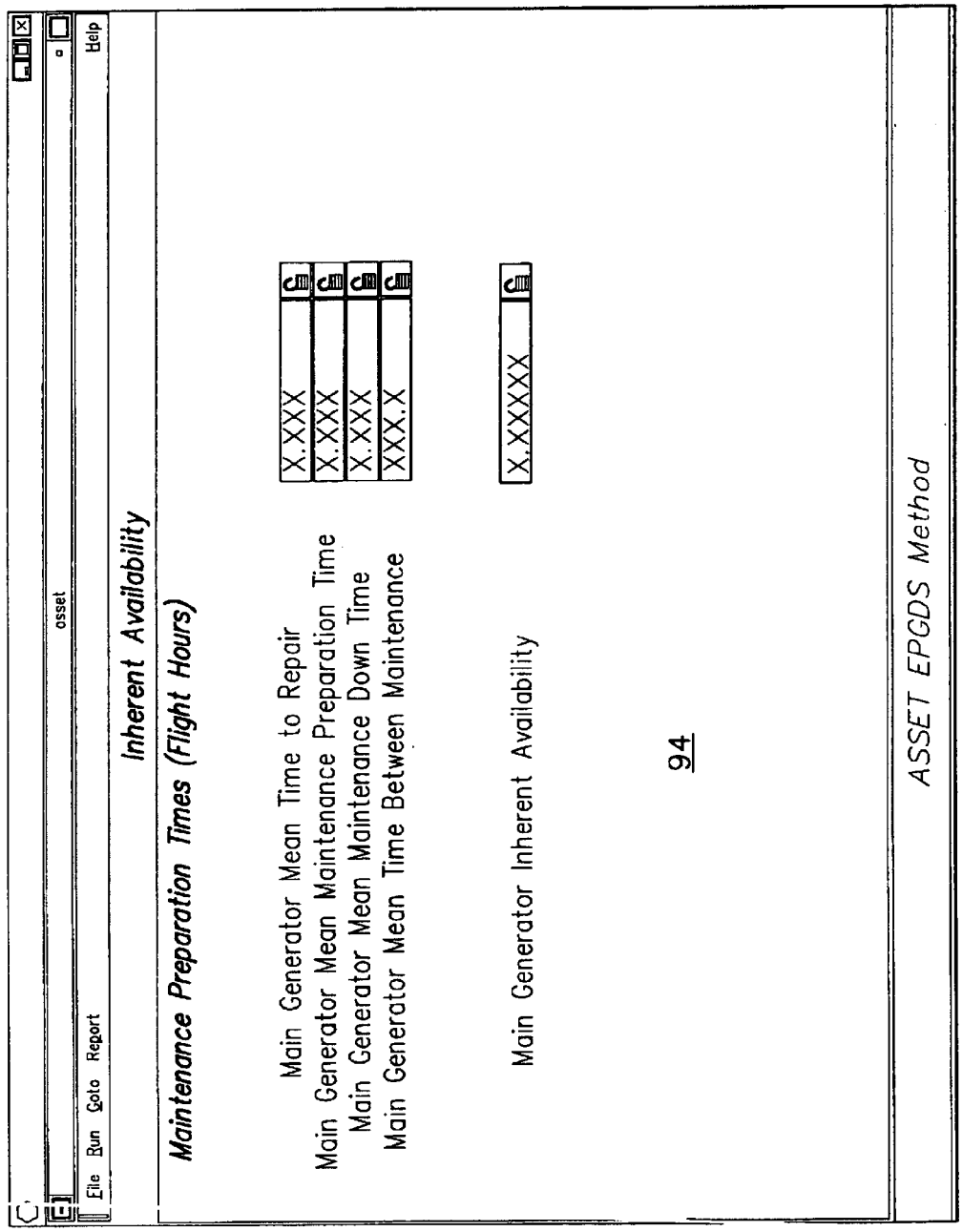
FIG. 54 illustrates Inherent Availability screen.

FIG. 54 illustrates the "Inherent Availability" screen 94 which provides the designer with values determined by the system 10 relating to the mean-maintenance-preparation-time (MMPT) and mean-time-to-repair (MTTR), which are weighted averages of the MPT and MCT for the three types of maintenance. This screen also provides information relating to the mean-maintenance-down-time (MMDT) which is the sum of these three above-described types of maintenance. The mean-type-between-maintenance (MTBM) is determined by combining the unscheduled removal, servicing, and alignment/adjustment frequencies. The inherent availability is calculated by the model: MTBM/(MTBM+MMDT).

Figure 55:
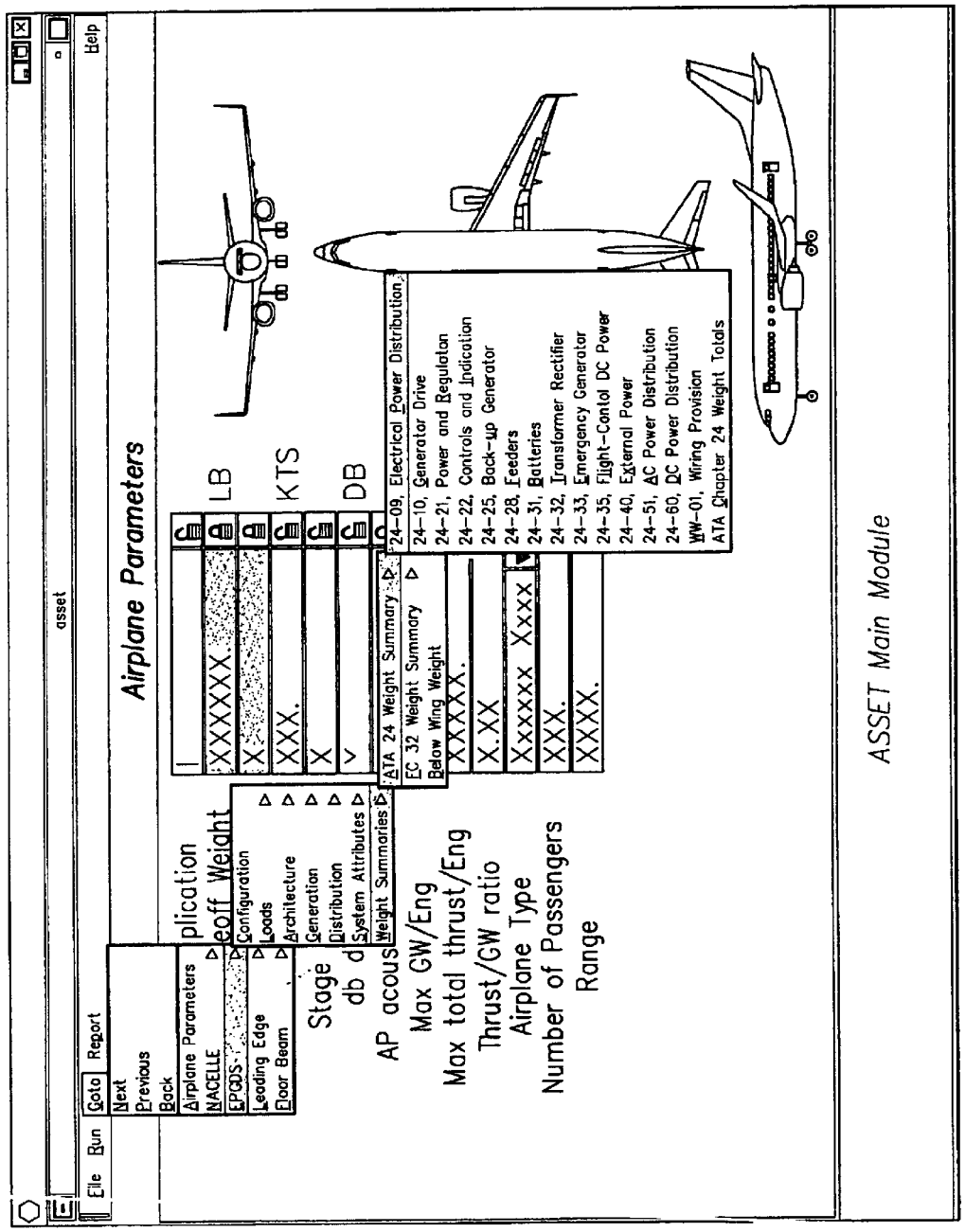
FIG. 55 illustrates the pull down menu associated with the ATA 24 Weight Summary menu option.
Figure 71:
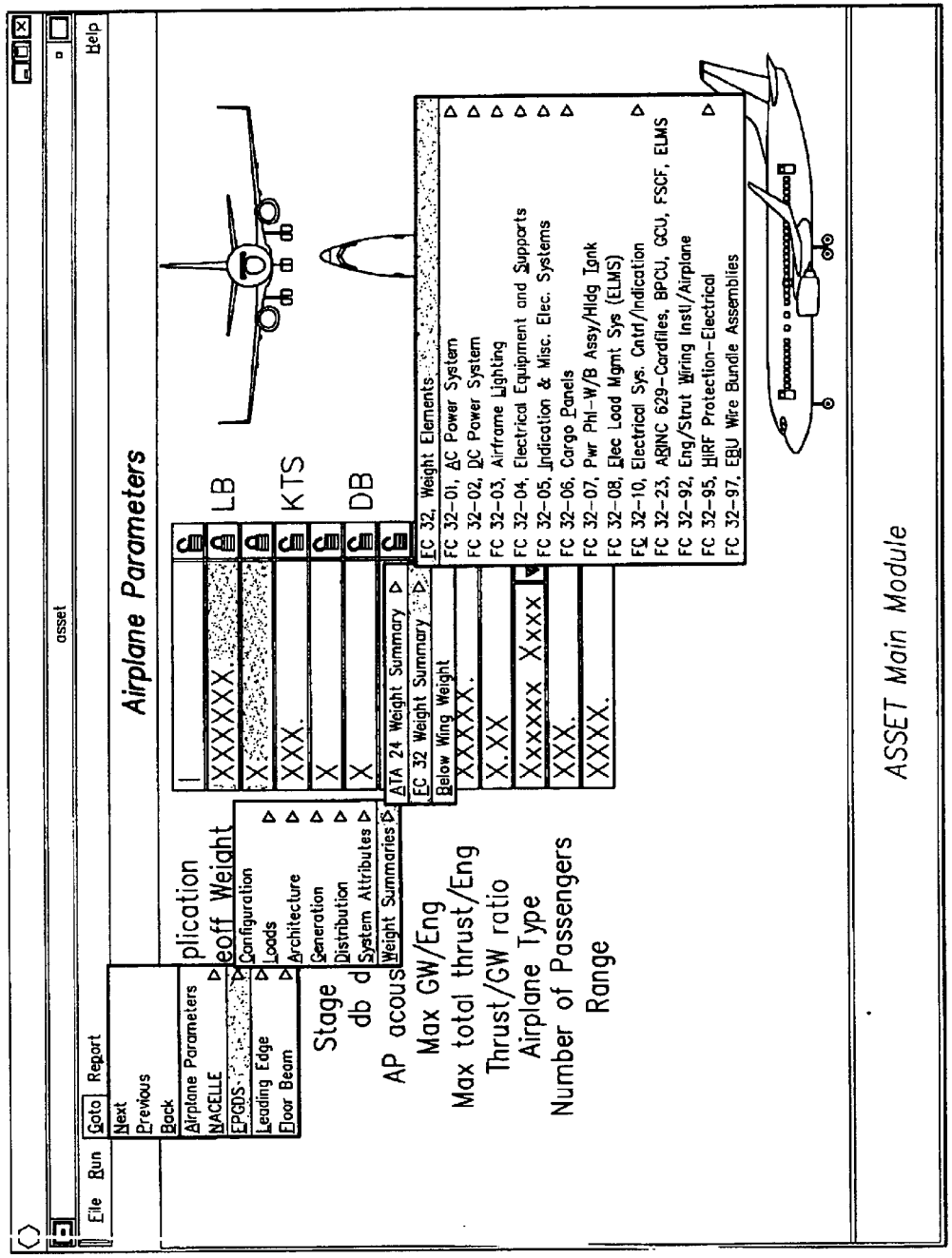
FIG. 71 illustrates the pull down menu associated with the FC 32 Weight Summaries menu option.

Referring now to FIG. 55, the "Weight Summaries" menu option in the second pull down menu is shown as having been selected. This produces a third pull down menu with the selections "ATA 24 Weight Summary", "FC 32 Weight Summary" and "Below Wing Weight". The "ATA 24 Weight Summary" selection has been selected which produces a fourth pull down menu providing 15 weight menu options which may be selected by the designer. These screens associated with these options are illustrated in FIGS. 56–70, respectively. These screens illustrate the weights of each of a large plurality of components forming the EPGDS of the aircraft. FIG. 71 illustrates the menu options which may be selected when the "FC 32 Weight Summary" selection is selected, thus producing a fourth pull down menu providing 14 different options. The 14 screens associated with these options, plus 31 lower level screens, are illustrated in Appendix B, hereby incorporated by reference into the present application. These screens embody a complete ordered weight listing of the EPGDS tailored expressly for the mass property engineer. Appendix C illustrates the screen associated with the "Below wing weight" option, and is also hereby incorporated by reference. This screen embodies EPGDS weight elements of interest to a propulsion mass properties engineer.

Figure 72:
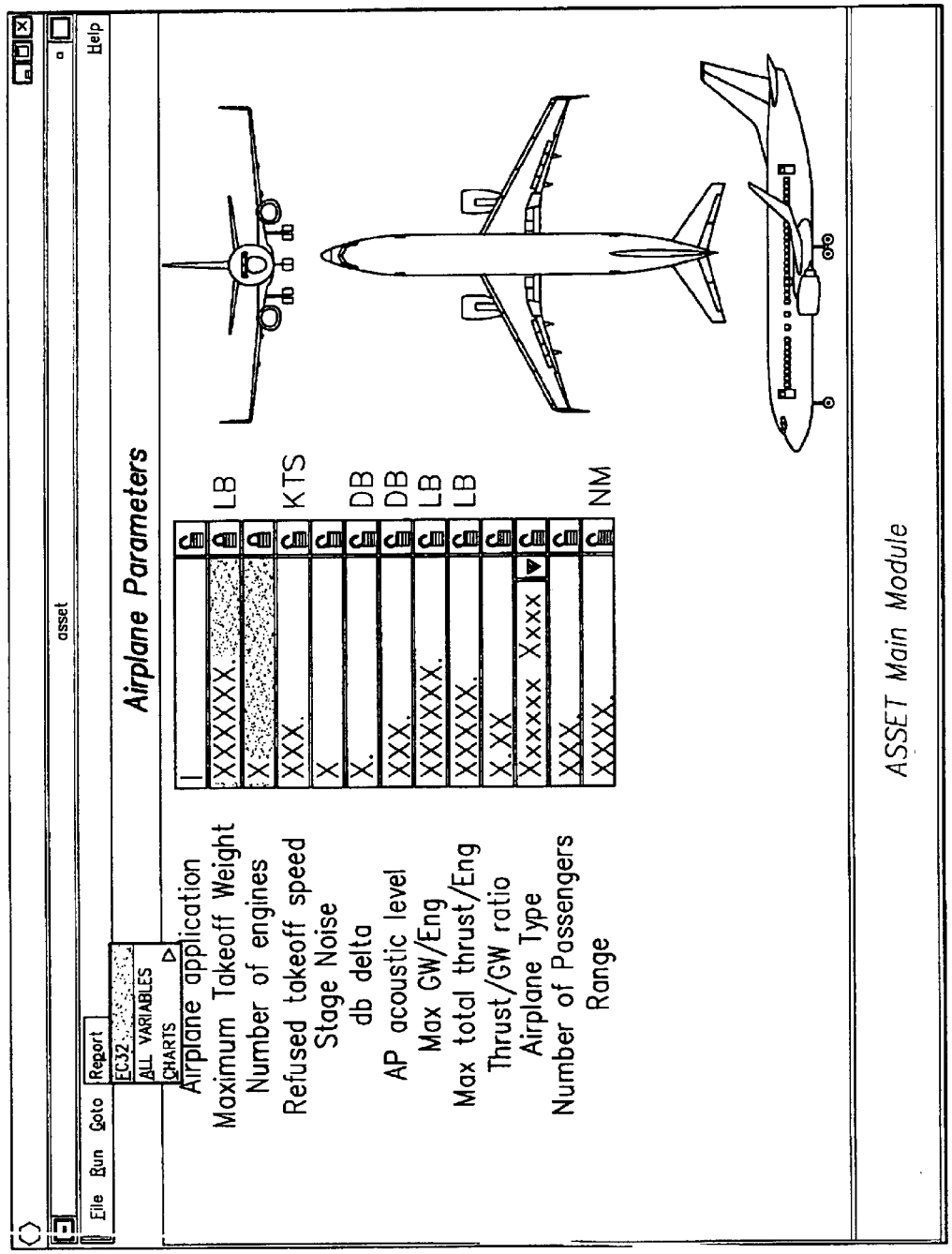
FIG. 72 illustrates the pull down menu associated with the Report menu tab.
Figure 74:
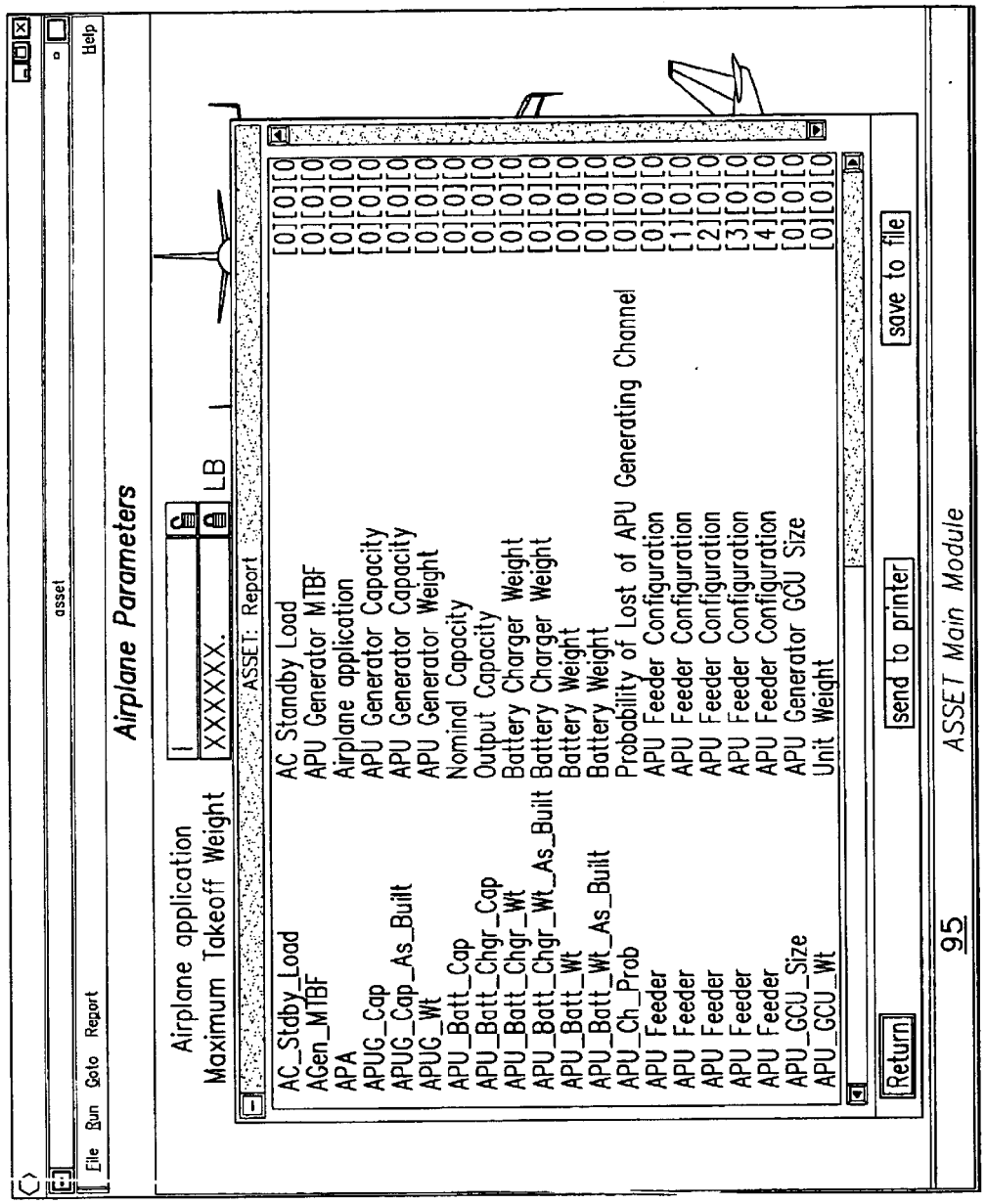
FIG. 74 illustrates the All Variables screen.
Figure 75:
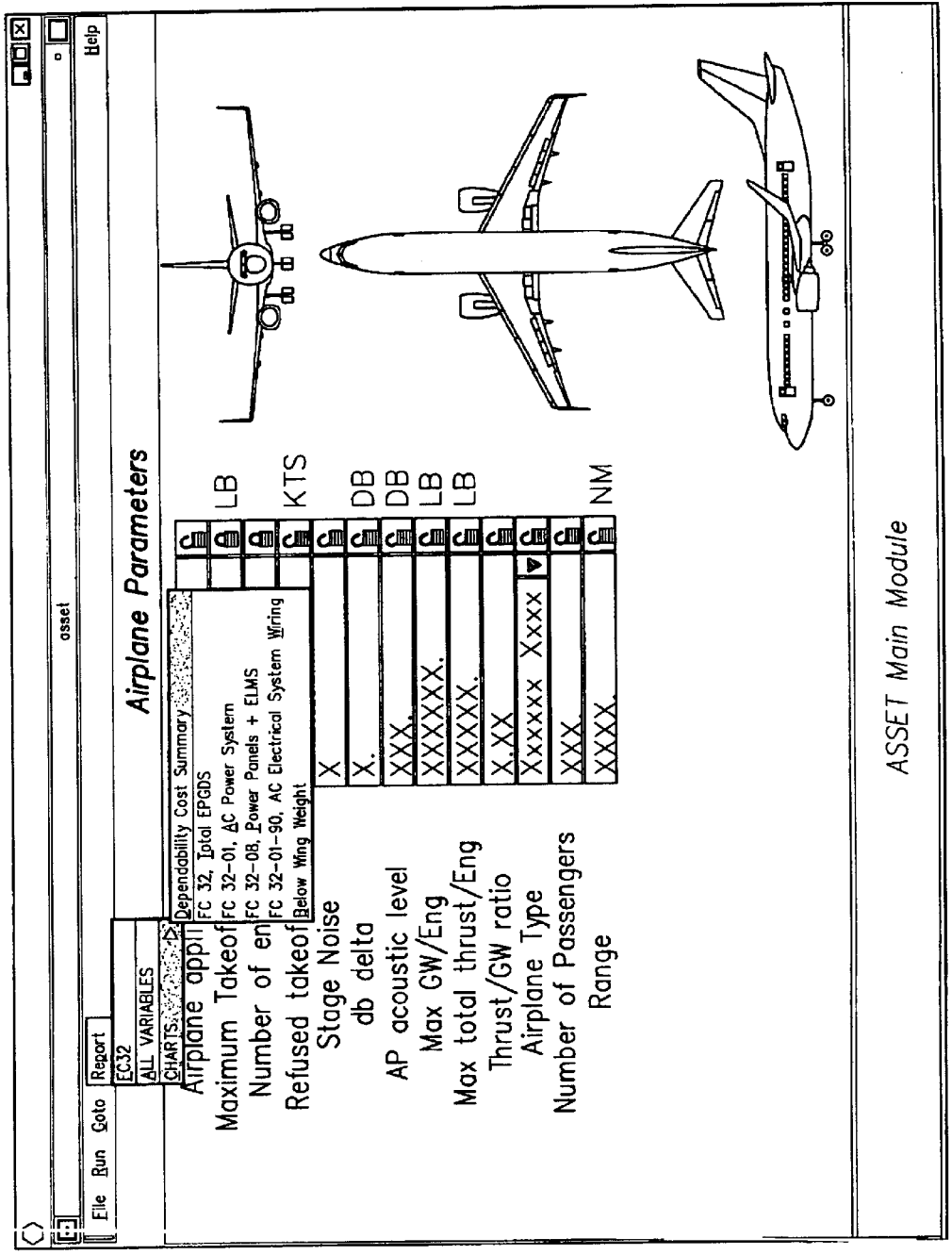
FIG. 75 illustrates the pull down menu associated with the Charts menu option.
Figure 76:
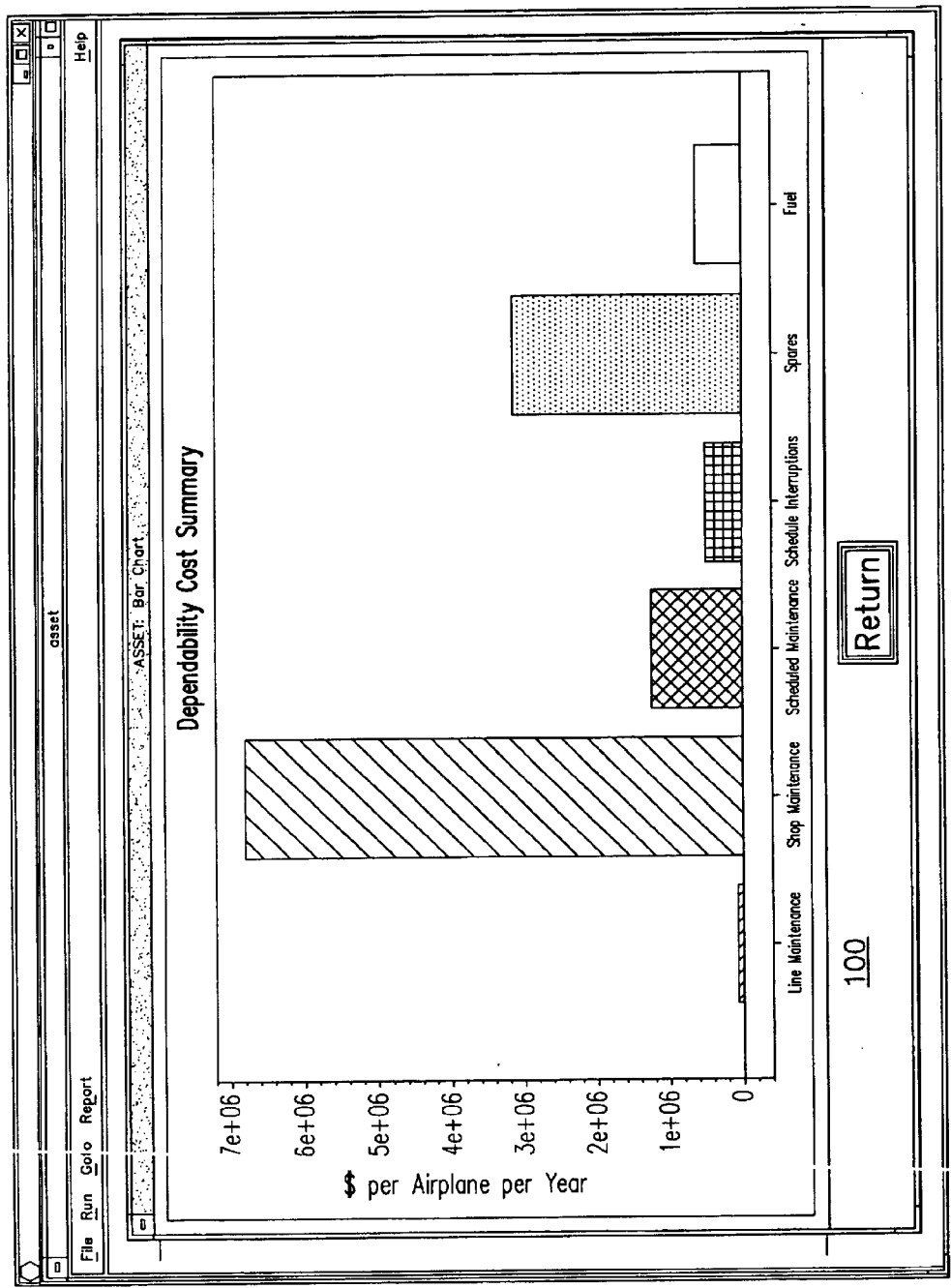
FIG. 76 illustrates the Dependability Cost Summary screen.
Figure 77:
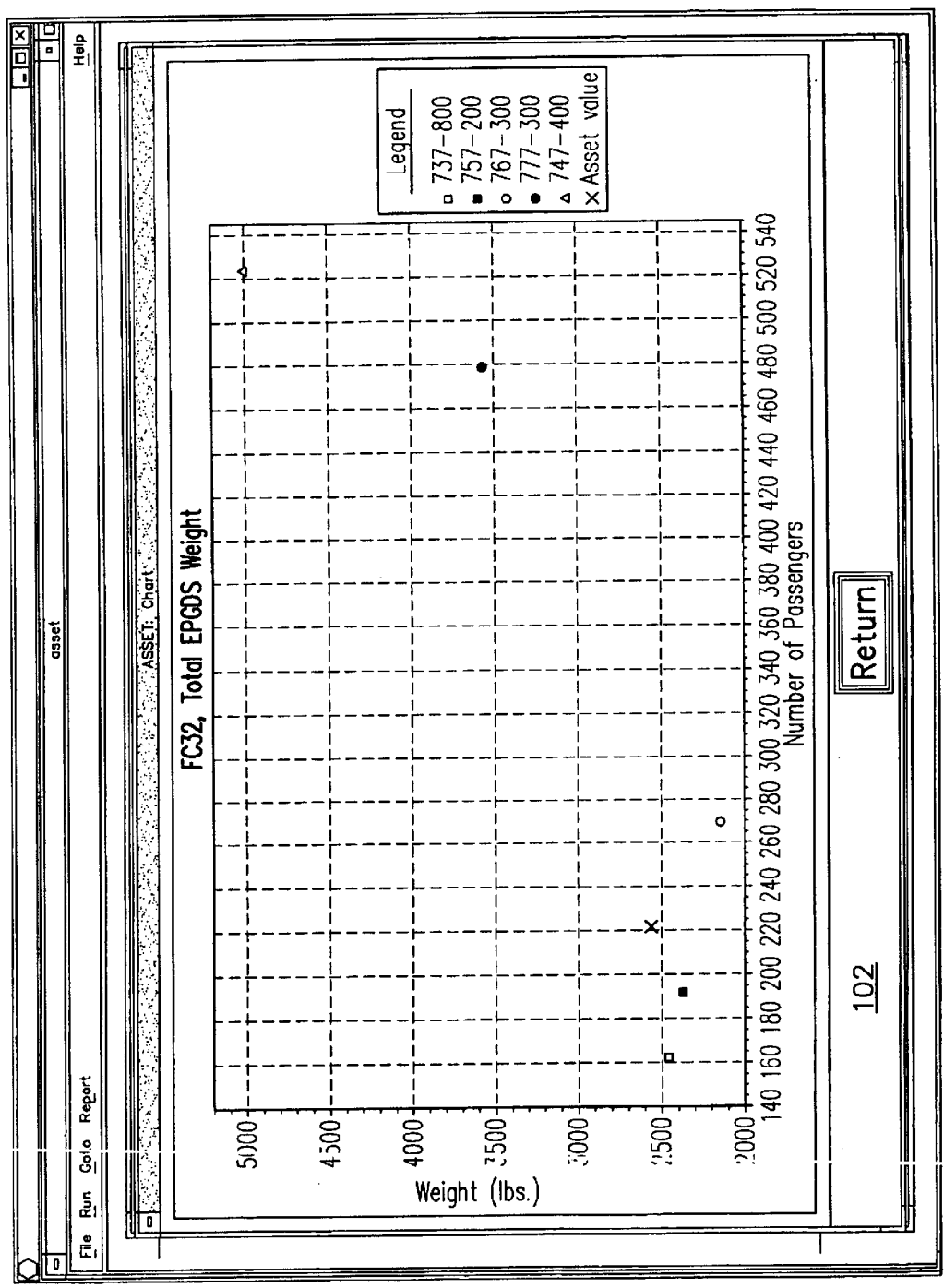
FIG. 77 illustrates the FC32, Total EPGDS Weight screen.
Figure 78:
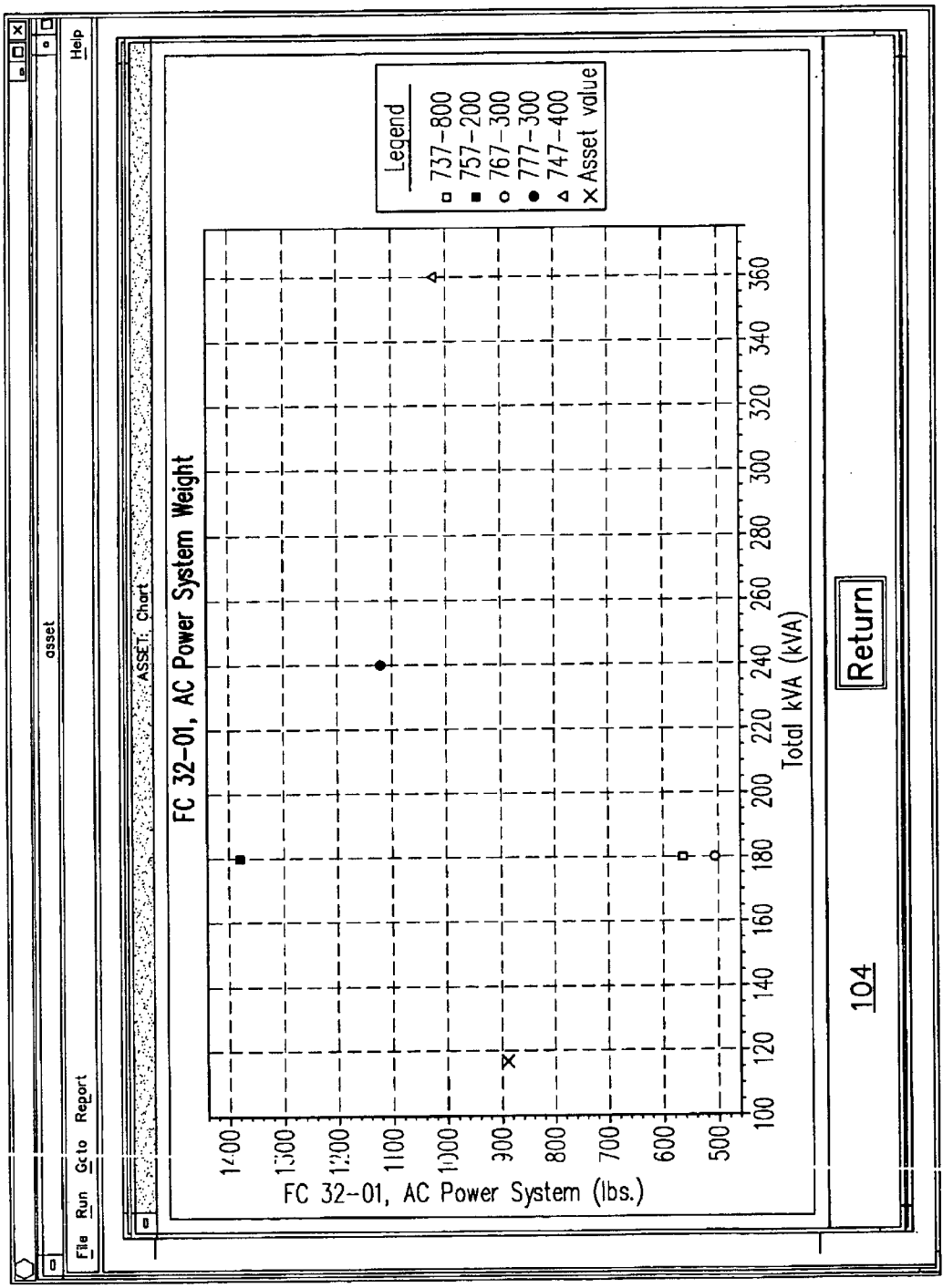
FIG. 78 illustrates the FC 32-01, AC Power System Weight Screen.
Figure 79:
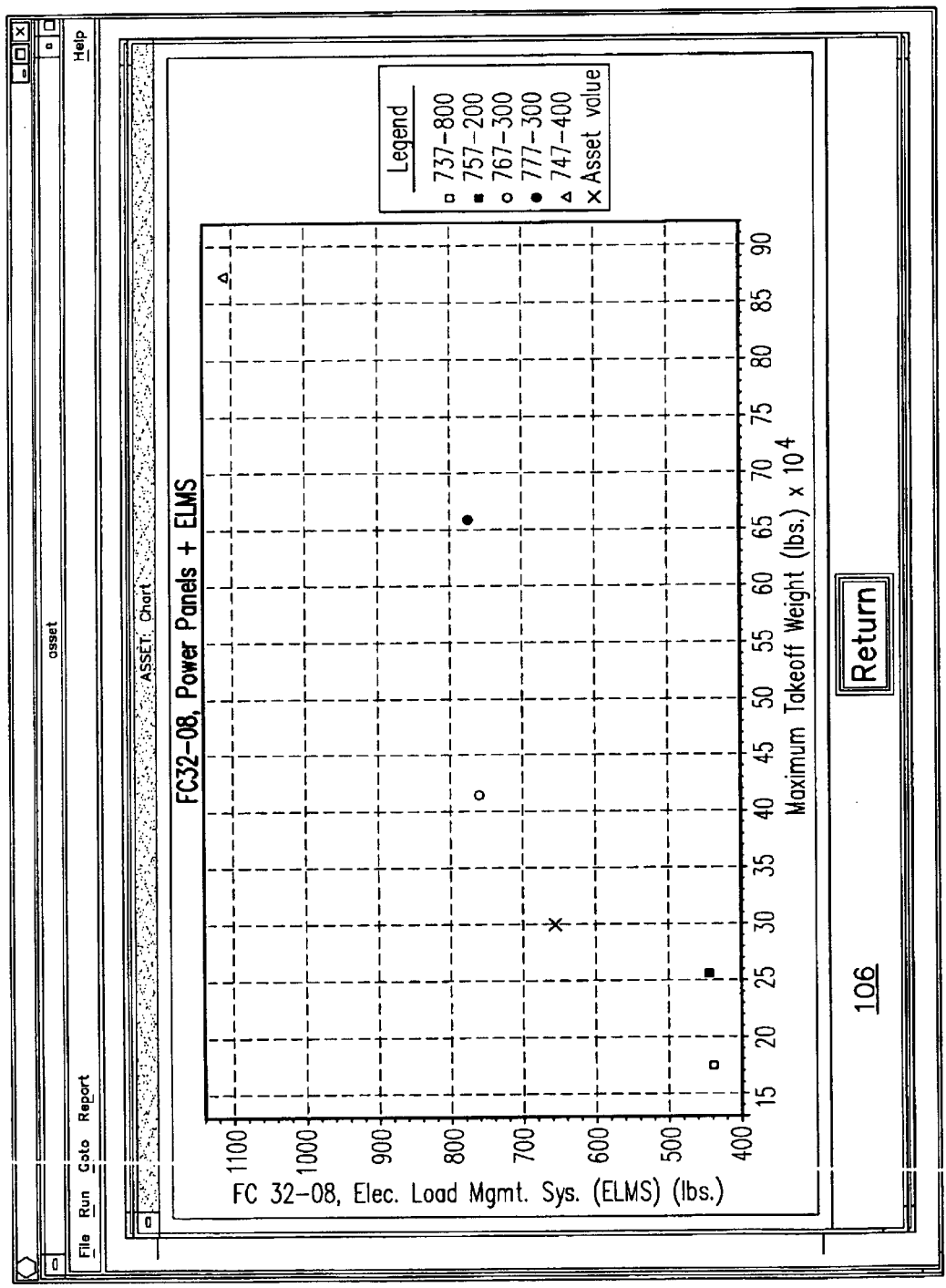
FIG. 79 illustrates the FC 32-08, Power Panels & ELMS screen.
Figure 80:
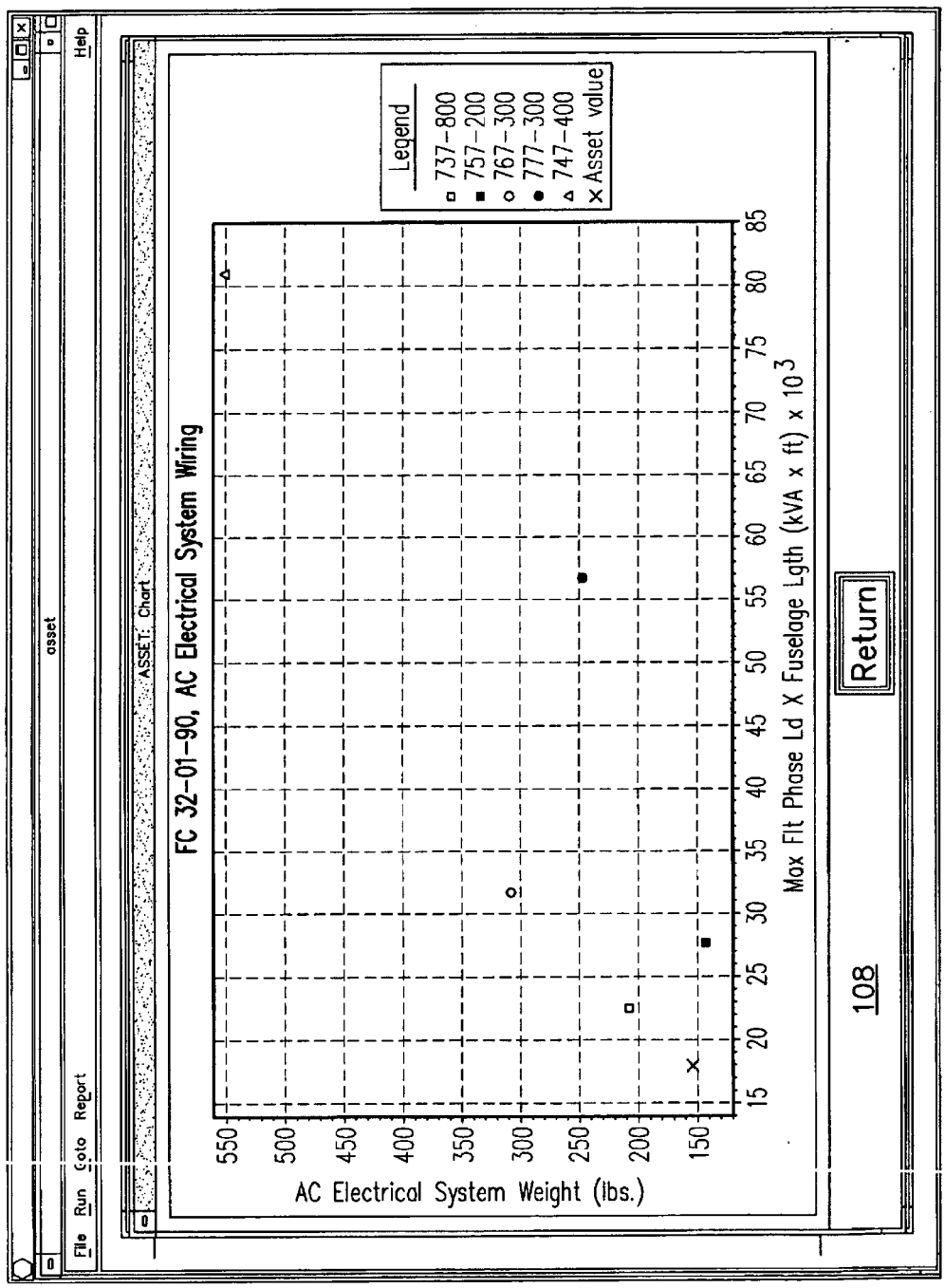
FIG. 80 illustrates the FC 32-01-90, AC Electrical System Wiring screen.
Figure 81:
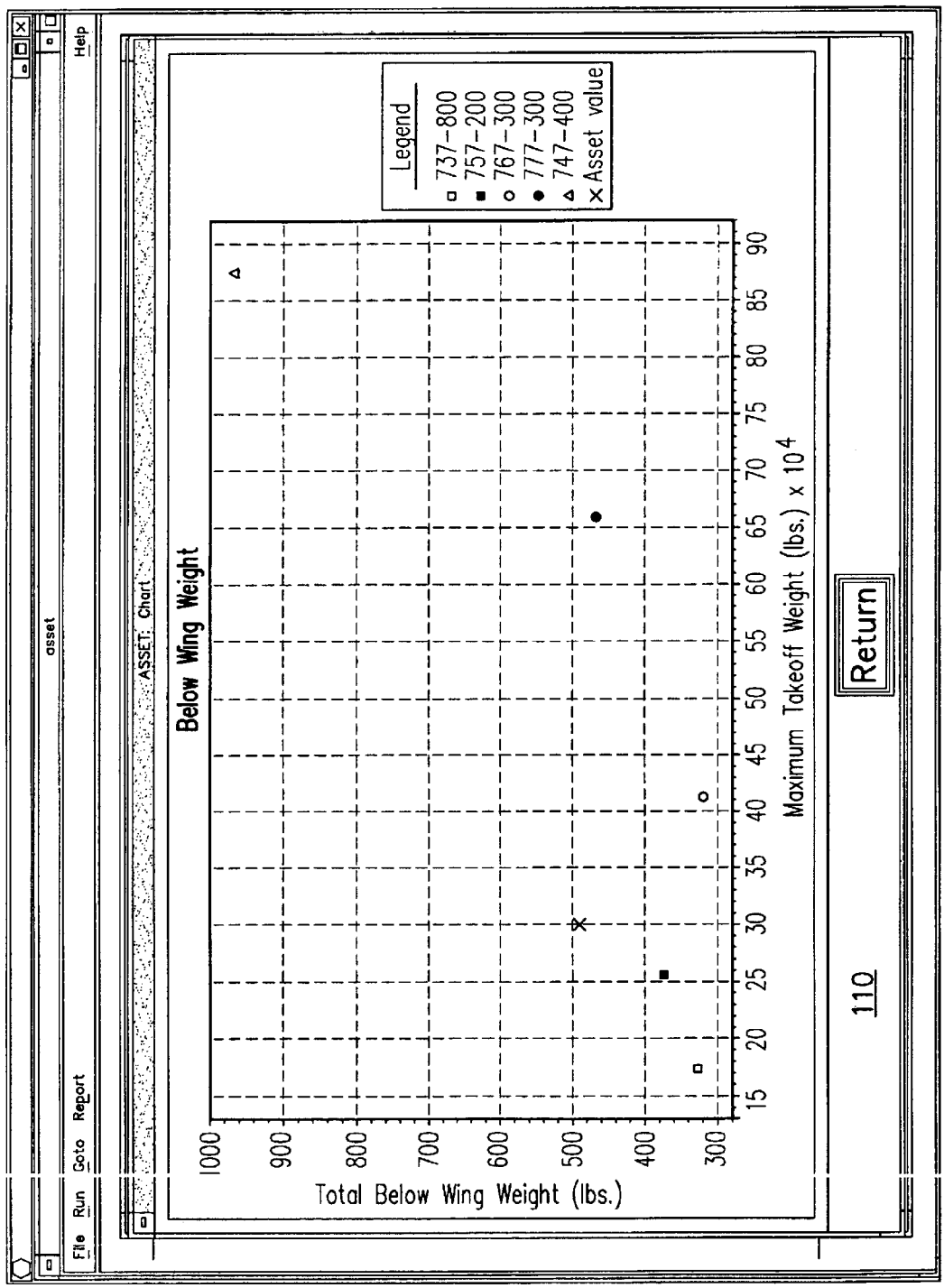
FIG. 81 illustrates the Below Wing Weight screen.

FIG. 72 illustrates the "Report" menu tab having been selected, which produces three report types available to the designer from a first pull down menu. The first report is an "FC 32" report shown in FIG. 73. This report contains all the components of the EPGDS sorted by component number and provides a component designation, quantity, unit and subtotal weight, and body station center of gravity. FIG. 74 shows the screen 95 associated with the "All Variables" menu option in FIG. 72. FIG. 75 illustrates the third menu option, "Charts" having been selected, which produces a second pull down menu with six screens available to the designer. The "Dependability Cost Summary" screen 100 (FIG. 76) illustrates graphs relating to various dependability factors calculated by the system 10. FIG. 77 illustrates the "FC 32 Total EPGDS Weight" screen 102. This screen 102 represents a graph of the total EPGDS weight for a given type of aircraft capable of accommodating a given number of passengers. FIG. 78 illustrates the "FC 32-01 AC Power System Weight" screen 104 which shows where the ASSET weight of the EPGDS falls on a two dimensional graph with relation to existing aircraft as a function of total kVA. FIG. 79 represents the "FC 32-08 Power Panels+ELMS" screen 106. Screen 106 shows where the ASSET weight of the FC 32-08 Power Panels+ELMS falls on a two dimensional graph with relation to existing aircraft as a function of MTOW. FIG. 80 illustrates the "FC 32-01-90 AC Electrical System Wiring" screen 108. Screen 108 shows where the ASSET weight of the FC 32-01-90 AC Electrical System Wiring falls on a two dimensional graph with relation to existing aircraft as a function of maximum flight phase loads times fuselage length. FIG. 81 illustrates the "Below Wing Weight" screen 110 which is a graph 108 shows where the ASSET weight of the below wing weight fails on a two dimensional graph with relation to existing aircraft as a function of MTOW.

Appendix D is provided in the accompanying Computer Program Listing Appendix and includes the formulas used in connection with the operations set forth in Appendix A. Appendix D is also hereby incorporated by reference.

The present invention thus forms a means by which a designer can better influence the design and weight characteristics of the EPGDS for an aircraft. The invention further allows the designer to modify selected variables of the aircraft and/or the EPGDS system and to re-calculate a wide ranging number of important attributes of the EPGDS system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A program for determining and evaluating attributes and components of a subsystem of an aircraft, the program comprising:

an airplane parameters module for allowing an individual to enter a plurality of parameters related to an aircraft with which the subsystem is to be used;

a configuration module for allowing said individual to enter a plurality of parameters relating to construction of said aircraft and electrical power and distribution system (EPGDS) parameters; and a system attributes module responsive to information from said configuration module for generating information relating to at least one of the group comprising dependability, costs, reliability and maintainability, of components of said EPGDS and for displaying said information on a display screen.

2. The program of claim 1, further comprising a loads module responsive to said parameters entered into said parameters module, for performing electrical loads analysis associated with components of said EPGDS and displaying information relating thereto on said display screen.

3. The program of claim 1, further comprising an architecture module responsive to information input to said airplane parameters module for determining a specific group of components for said EPGDS.

4. The program of claim 1, further comprising:
a load module responsive to said parameters entered into said parameters module, for performing electrical loads analysis associated with components of said EPGDS and providing the required alternating current (AC) and direct current (DC) load capacities for said EPGDS components, and for displaying information relating thereto on said display screen;
an architecture module responsive to information input to said airplane parameters module for determining specific components for said EPGDS and for displaying said specific components on said display screen; and
an architecture module responsive to information input to said airplane parameters module for determining a plurality of specific components for said EPGDS.

5. The program of claim 1, further comprising an electronic data dictionary for allowing said individual to review reference material concerning said information generated by said program.

6. The program of claim 1, further comprising:
a loads module responsive to said parameters entered into said parameters module, for performing electrical loads analysis associated with components of said EPGDS and providing the required alternating current (AC) and direct current (DC) load capacities for said EPGDS components, and for displaying information relating thereto on said display screen;
an architecture module, for sizing said components of said EPGDS and displaying information relating thereto on a said display screen; and
a weight summaries module responsive to said information generated by said load module for determining, summarizing and totaling the individual weights associated with said EPGDS components.

7. The program of claim 1, further comprising a distribution module for determining information relating to an electrical feeder configuration for said aircraft, and for displaying said information to said individual.

8. The program of claim 1, wherein said system attributes module calculates information concerning at least one factor of the group of 8 factors comprising:
dependability cost;
system acquisition costs;
fuel costs;
spares costs;
line maintenance costs;
shop maintenance costs;
scheduled maintenance costs; and
schedule interruption costs;
and wherein said system attributes module further provides a dependability cost summary for summarizing a cost of at least one of said 8 above-listed factors.

9. The program of claim 1, wherein said system attributes module predicts reliabilities for specific ones of said EPGDS components; and
wherein said predicted reliability is provided for at least one of the group comprising:
main power reliability;
backup power reliability;
standby power reliability; and
FCDC (flight control DC).

10. The program of claim 1, wherein said system attributes module predicts and displays maintainability for specific ones of said EPGDS components; and
wherein said maintainability comprises:
maintenance times including main time between unscheduled repair (MTBUR) at least one of said EPGDS components;
maintenance preparation times for a plurality of tasks associated with performing maintenance on said at least one EPGDS component; and
inherent availability of said at least one EPGDS component.

11. A system for determining and evaluating attributes and components of an electrical power distribution and generation (EPGDS) subsystem of an aircraft, the system comprising:
an airplane parameters module for allowing an individual to enter a plurality of parameters related to an aircraft with which the EPGDS subsystem is to be used;
a configuration module for allowing said individual to enter a plurality of parameters relating to a construction and configuration of said aircraft and EPGDS parameters;
a system attributes module responsive to information from said configuration module for generating information relating to at least one of the group comprising dependability, costs, reliability and maintainability, of components of said EPGDS and for displaying said information on display screen;
a loads module responsive to said parameters entered into said parameters module, for performing electrical loads analysis associated with components of said EPGDS and displaying information relating thereto on said display screen; and
an architecture module responsive to information input to said airplane parameters module for determining a plurality of specific components for said EPGDS.

12. The system of claim 11, further comprising:
an electronic data dictionary for allowing said individual to review reference material concerning said information generated by said program.

13. A method for determining and evaluating attributes and components of a subsystem of an aircraft, the method comprising the steps of:
providing a module for allowing an individual to enter a plurality of parameters related to an aircraft with which the subsystem is to be used;
from said parameters, calculating and displaying information relating to a plurality of attributes of said subsystem comprising one of the group of factors of reliability, dependability, costs and maintainability.

14. The method of claim 13, further comprising the step of:
providing said information to said individual in a plurality of fields of a screen displayed on a computer display screen; and
allowing said user to override selected portions of said information with user selected values; and
using said method to re-calculate said attributes of said system.

15. The method of claim 14, further comprising the step of allowing said user to lock-in selected portions of said information, whereafter said lock-in portions of information are not changed when said method is used to re-calculate said attributes of said system.

16. The method of claim 13, wherein said step of entering a plurality of parameters comprises the step of entering at least the number of engines of said aircraft.

17. The method of claim 13, wherein said step of entering a plurality of parameters comprises the step of entering at least the maximum takeoff weight (MTOW) of said aircraft.

18. The method of claim 13, further providing the step of using an electronic data dictionary accessible by said individual, to allow said individual to reference explanations and formulas relating to said information calculated by said method.

19. The method of claim 13, further comprising the step of allowing said individual to select from one of a plurality of electrical system architectures for said aircraft prior to using said method to calculate said information.

* * * * *

UNITED STATES PATENT AND TRADEMARK OFFICE
CERTIFICATE OF CORRECTION

PATENT NO. : 6,782,346 B2
DATED : August 24, 2004
INVENTOR(S) : Bond et al.

It is certified that error appears in the above-identified patent and that said Letters Patent is hereby corrected as shown below:

Column 1,
Line 37, delete second occurence of "aircraft".

Column 15,
Line 32, delete "an architecture module, for sizing said components of said EPGDS and displaying information relating thereto on a said display screen; and"
Line 40, insert the following:
-- an architecture module responsive to information input to said airplane parameters module for determining specific components for said EPGDS and for displaying said specific components on said display screen; and a generation module to informaton generated by said loads and architecture modules, for sizing said components of said EPGDS and displaying information relating thereto on said display screen; and --

Signed and Sealed this

Seventeenth Day of May, 2005

JON W. DUDAS
*Director of the United States Patent and Trademark Office*